(12) United States Patent
Sato et al.

(10) Patent No.: US 8,090,535 B2
(45) Date of Patent: Jan. 3, 2012

(54) AZIMUTH PROCESSING DEVICE, AZIMUTH PROCESSING METHOD, AZIMUTH PROCESSING PROGRAM, DIRECTION FINDING DEVICE, TILT OFFSET CORRECTING METHOD, AZIMUTH MEASURING METHOD, COMPASS SENSOR UNIT, AND PORTABLE ELECTRONIC DEVICE

(75) Inventors: Hideki Sato, Hamamatsu (JP); Kiyoshi Yamaki, Iwata (JP); Masayoshi Omura, Hamamatsu (JP); Chihiro Osuga, Hamamatsu (JP); Satoshi Nihashi, Hamamatsu (JP); Tetsuya Mabuchi, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 0 days.

(21) Appl. No.: 12/870,726

(22) Filed: Aug. 27, 2010

(65) Prior Publication Data
US 2010/0324862 A1 Dec. 23, 2010

Related U.S. Application Data

(62) Division of application No. 11/149,707, filed on Jun. 10, 2005, now Pat. No. 8,065,083.

(30) Foreign Application Priority Data

Jul. 23, 2004 (WO) .................. PCT/JP2004/010479
Aug. 10, 2004 (JP) ................................. 2004-233443
Apr. 22, 2005 (WO) .................. PCT/JP2005/007702

(51) Int. Cl.
*G01C 21/00* (2006.01)
(52) U.S. Cl. ......................... 701/224; 701/220; 701/225

(58) Field of Classification Search .................. 701/224, 701/220, 225; 702/150; 342/140; 73/178 R
See application file for complete search history.

(56) References Cited

U.S. PATENT DOCUMENTS

| 4,321,678 | A | * | 3/1982 | Krogmann | ..................... 701/220 |
| 4,470,119 | A | * | 9/1984 | Hasebe et al. | ................ 701/208 |
| 4,497,034 | A | * | 1/1985 | Kuno et al. | ..................... 702/92 |
| 4,660,161 | A | * | 4/1987 | Okada | ............................. 702/92 |
| 4,751,783 | A | * | 6/1988 | Ina et al. | ......................... 33/361 |
| 4,861,752 | A | * | 8/1989 | Leupold | ....................... 505/212 |
| 5,165,269 | A | * | 11/1992 | Nguyen | ........................ 73/1.76 |
| 5,419,631 | A | * | 5/1995 | Slater | ............................ 356/508 |
| 5,444,916 | A | * | 8/1995 | Fukushima et al. | ............ 33/361 |
| 5,737,226 | A |   | 4/1998 | Olson et al. | |

(Continued)

FOREIGN PATENT DOCUMENTS

EP 1 519 148 A1 3/2005

(Continued)

OTHER PUBLICATIONS

PCT International Search Report dated Oct. 25, 2005.

*Primary Examiner* — Khoi Tran
*Assistant Examiner* — Jorge Peche
(74) *Attorney, Agent, or Firm* — Dickstein Shapiro LLP

(57) ABSTRACT

An azimuth processing device is designed for outputting azimuth data based on measurement data sequentially output from a compass sensor. In the device, an accumulation section selectively accumulates substantially new pieces of the measurement data. An offset data updating section updates offset data of the compass sensor based on plural pieces of the measurement data accumulated by said accumulation section. An azimuth data output section outputs the azimuth data based on substantially newest measurement data and the offset data.

20 Claims, 34 Drawing Sheets

U.S. PATENT DOCUMENTS

| | | | |
|---|---|---|---|
| 5,878,370 A * | 3/1999 | Olson | 701/224 |
| 6,199,020 B1 * | 3/2001 | Ando | 702/41 |
| 6,401,036 B1 * | 6/2002 | Geier et al. | 701/214 |
| 6,448,908 B1 * | 9/2002 | Hijikata | 340/995.19 |
| 6,523,271 B2 * | 2/2003 | Kato | 33/355 R |
| 6,643,941 B2 * | 11/2003 | Parks et al. | 33/356 |
| 6,731,955 B2 * | 5/2004 | Hirano et al. | 455/562.1 |
| 6,922,647 B2 * | 7/2005 | Cho et al. | 702/92 |
| 6,996,420 B2 * | 2/2006 | Hirano et al. | 455/562.1 |
| 7,028,410 B2 * | 4/2006 | Sato et al. | 33/356 |
| 7,119,533 B2 * | 10/2006 | Tamura et al. | 324/202 |
| 7,177,779 B2 * | 2/2007 | Hikida et al. | 702/150 |
| 7,257,485 B2 * | 8/2007 | Sumizawa et al. | 701/209 |
| 7,340,362 B2 * | 3/2008 | Kitamura et al. | 702/95 |
| 2002/0099481 A1 * | 7/2002 | Mori | 701/23 |
| 2002/0103610 A1 * | 8/2002 | Bachmann et al. | 702/94 |
| 2003/0013507 A1 * | 1/2003 | Sato | 455/575 |
| 2003/0054776 A1 * | 3/2003 | Hirano et al. | 455/107 |
| 2003/0134665 A1 | 7/2003 | Kato et al. | |
| 2004/0070567 A1 * | 4/2004 | Longe et al. | 345/156 |
| 2004/0180672 A1 * | 9/2004 | Hirano et al. | 455/456.1 |
| 2005/0150122 A1 * | 7/2005 | Cho et al. | 33/356 |
| 2005/0223574 A1 * | 10/2005 | Fillatreau et al. | 33/356 |
| 2006/0031014 A1 * | 2/2006 | Sato et al. | 701/224 |
| 2006/0032064 A1 * | 2/2006 | Sato et al. | 33/356 |
| 2006/0079185 A1 * | 4/2006 | Hirano et al. | 455/63.4 |

FOREIGN PATENT DOCUMENTS

| | | |
|---|---|---|
| JP | 56-6169 | 1/1981 |
| JP | 63-153121 | 10/1988 |
| JP | 3-152412 | 6/1991 |
| JP | 8-105745 | 4/1996 |
| JP | 08-105745 | 4/1996 |
| JP | 9-81308 | 3/1997 |
| JP | 9-133530 | 5/1997 |
| JP | 09-133530 | 5/1997 |
| JP | 2003-156549 | 5/2003 |
| JP | 2003-294447 A1 | 10/2003 |
| JP | 2004-012416 | 1/2004 |
| JP | 2004-12416 | 1/2004 |
| WO | WO-2004/003476 A1 | 1/2004 |
| WO | WO 2004/003476 A1 | 1/2004 |
| WO | WO 2004003476 A1 * | 1/2004 |

* cited by examiner

AZIMUTH PROCESSING DEVICE, AZIMUTH PROCESSING METHOD, AZIMUTH PROCESSING PROGRAM, DIRECTION FINDING DEVICE, TILT OFFSET CORRECTING METHOD, AZIMUTH MEASURING METHOD, COMPASS SENSOR UNIT, AND PORTABLE ELECTRONIC DEVICE

CROSS REFERENCE TO RELATED APPLICATION

This application is a divisional of co-pending U.S. patent application Ser. No. 11/149,707, filed Jun. 10, 2005.

BACKGROUND OF THE INVENTION

1. Technical Field

The present invention relates to an azimuth processing device, an azimuth processing method, an azimuth processing program, a direction finding device, a tilt offset correcting method, azimuth measuring method, a compass sensor unit, and a portable electronic device. In particular, the present invention relates to estimating and updating of an offset of the compass sensor.

Priority is claimed on Japanese Patent Application Nos. PCT/JP2004-010479, filed Jul. 23, 2004; JP2004-233443, filed Aug. 10, 2004 and PCT/JP2005-007702, filed Apr. 22, 2005, the contents of which are incorporated herein by reference.

2. Background Art

Some recent portable information terminals, such as cellular phones and PDAs, have a function for displaying geographic information using GPS and a compass sensor. For example, a portable information terminal is known, which determines its current position using GPS, downloads map information around the current position from a server via a communication line, determines azimuth heading with a built-in compass sensor, and displays the map information on a screen in such a manner to orient the map heading to the actual azimuth heading. The compass sensor detects a magnetic field of the Earth to measure an azimuth angle, but the fact is that it detects a mixture of the Earth's geomagnetic field and noise magnetic fields leaked from a loudspeaker, a microphone, a metallic package for electronic parts, etc. mounted in the portable information terminal. Therefore, in order to determine the azimuth angle accurately, it is necessary to determine the noise magnetic fields (offset) other than the magnetic field of the Earth and correct measurement data from the compass sensor by the determined offset.

Patent Document 1 discloses a method of estimating and updating the offset of a compass sensor. An offset updating method disclosed in this publication is to acquire measurement data output from the compass sensor at intervals of 90 or 180 degrees while a user rotates the compass sensor more than 90 or 180 degrees about a specific axis so as to calculate the offset of the compass sensor based on the acquired measurement data. To calculate the offset of the compass sensor accurately, the user has to, for example, rotate on a horizontal plane the equipment with the compass sensor in it, or heavily shake it up and down and left and right, so that measurement data upon which the calculation is made will be output from the compass sensor. The operation for allowing the compass sensor to output measurement data necessary to update the offset of the compass sensor is called calibration. It is ideal that the calibration is performed by changing the attitude, or position, of the equipment to a large degree at a constant angular speed. Hereafter, the term "calibration" specifically means the steps of calculating an offset based on measurement data acquired from a compass sensor, and updating a previous offset of the compass sensor by the calculated new offset data.

However, the user might drop the equipment during the calibration. Further, even when the user completed calibration, accurate offset might not be able to be calculated from measurement data from the compass sensor accumulated during the calibration. Furthermore, the calibration procedure is hard to perform correctly without reading the manual or the like. Since the procedure is necessary only to update the offset of the compass sensor, it is burdensome for the user to follow. Accurate geographic information based on accurate azimuth data cannot be displayed unless the offset of the compass sensor is updated correctly.

Further, in order to find an accurate direction, it is desirable to consider the inclination of the geomagnetic sensor itself. Although a tilt sensor for measuring the inclination of the geomagnetic sensor is used, the sensitivity of the tilt sensor varies from chip to chip. Therefore, it requires much effort to check and correct sensitivity in a product line.

Patent Document 1: Japanese patent laid-open No. 2004-012416.

SUMMARY OF THE INVENTION

It is a first object of the present invention to provide an azimuth processing device, an azimuth processing method, an azimuth processing program, a direction finding device, and a portable electronic device, all of which use accurate offset.

It is a second object of the invention to provide a tilt offset correcting method, an azimuth measuring method, a compass sensor unit, and a portable electronic device, which can determine values of the sensitivity and offset of a tilt sensor, all necessary for accurate azimuth calculations, without any special measurement operation.

In order to attain the above first object, an azimuth processing device for outputting azimuth data based on measurement data sequentially output from a compass sensor, includes: accumulation means for selectively accumulating substantially new pieces of the measurement data; and offset data updating means for updating offset data of the compass sensor based on plural pieces of the measurement data accumulated by said accumulation means.

Since the measurement data are selectively accumulated, the accuracy of offset data updated based on the accumulated measurement data is improved. The offset data is data representing the above-mentioned offset, that is, indicating a deviation of the measurement data of the compass sensor. The azimuth processing device outputs azimuth data according to a difference between the measurement data and the offset data. Specifically, for example, in the case of a three-axis compass sensor for detecting the strength and direction of a magnetic field resolved along three axes orthogonal to one another, the relationship among the measurement data (x, y, z), the offset data $(x_0, y_0, z_0)$, and the azimuth data $(X, Y, Z)$ is as follows: $(X, Y, Z) = (x - x_0, y - y_0, z - z_0)$.

The azimuth processing device further includes azimuth data output means for outputting the azimuth data based on substantially newest measurement data and the offset data.

Since the offset data of the compass sensor is updated based on the substantially newest measurement data, and the azimuth data is output based on the measurement data and the updated offset data, the accuracy of the azimuth data is improved.

The accumulation means may compare the substantially newest measurement data with last accumulated measurement data, and selectively accumulate the substantially newest measurement data according to the comparison result.

Since the measurement data are accumulated selectively according to the result of comparison between the substantially newest measurement data and the last accumulated measurement data, the accuracy of offset data updated based on the accumulated measurement data is improved.

The accumulation means may selectively accumulate the substantially newest measurement data according to a distance between a position of the substantially newest measurement data in a compass space and another position of the last accumulated measurement data in the compass space.

Since the measurement data are selectively accumulated according to the distance between the positions of respective pieces of measurement data sequentially output from the compass sensor, they can be accumulated so that the positions of the measurement data will be scattered reasonably in the compass space. The more scattered the positions of the measurement data accumulated in the compass space, the more the accuracy of offset data updated based on the accumulated measurement data is improved. The term "compass space" means a vector space represented by output values of the compass sensor. For example, in the case of the above-mentioned three-axis compass sensor, the compass space means a vector space defining, as each coordinate on each axis, the position (in the three dimensional coordinate system) of an output value of each axis corresponding to the strength of an azimuth component of geomagnetism on each axis.

When variations in distances between positions of the accumulated plural pieces of the measurement data in the compass space and a position of an offset data candidate in a compass space calculated based on the measurement data accumulated by said accumulation means do not meet predetermined criteria, said accumulation means may delete at least part of the accumulated measurement data and the offset data will not be updated by the offset data candidate.

When the distances between the positions of the accumulated plural pieces of measurement data in the compass space and the positions of offset data candidates in the compass space calculated based on the accumulated measurement data vary to a large degree, there is a high possibility that the plural pieces of measurement data upon which the offset data candidates are based will use different true offsets as reference, or the measurement data will be affected by noise to a large degree. Therefore, in such a case, the measurement data are deleted and reaccumulated to improve the accuracy of offset data updated based on the accumulated measurement data.

When variations in positions of accumulated plural pieces of the measurement data in a compass space do not meet predetermined criteria, said accumulation means may delete at least part of the accumulated measurement data.

Specifically, for example, the index of representing the positional variations in the compass space includes the range of distribution, the density of distribution, and the uniformity of density distribution. If the true offset is fixed, the more scattered the positions of the measurement data in the compass space upon which the offset data is based, the more the accuracy of the offset data is improved. Therefore, when the variations in the positions of accumulated plural pieces of measurement data in the compass space do not meet the predetermined criteria, the measurement data are deleted and reaccumulated to improve the accuracy of offset data updated based on the accumulated measurement data.

The accumulation means may accumulate the substantially new measurement data for each segment of a compass space for updating the measurement data on a segment basis.

If the true offset is fixed, the more scattered the positions of the measurement data in the compass space upon which the offset data is based, the more the accuracy of the offset data is improved. Therefore, a predetermined number of measurement data are accumulated for each segment of the compass space while updating them on a segment basis, thereby improving the accuracy of offset data updated based on the accumulated measurement data.

When variations in distances between positions of the accumulated plural pieces of the measurement data in a compass space and a position of an offset data candidate in the compass space calculated based on the measurement data accumulated by said accumulation means do not meet predetermined criteria, said accumulation means may delete at least part of the accumulated measurement data and the offset data will not be updated by the offset data candidate.

When the distances between the positions of the accumulated plural pieces of measurement data in the compass space and the positions of offset data candidates in the compass space calculated based on the accumulated measurement data vary to a large degree, there is a high possibility that the plural pieces of measurement data upon which the offset data candidates are based will use different true offsets as reference, or the measurement data will be affected by noise to a large degree. Therefore, in such a case, the measurement data are deleted and reaccumulated to improve the accuracy of offset data updated based on the accumulated measurement data.

When variations in positions of the accumulated plural pieces of the measurement data in a compass space do not meet predetermined criteria, said accumulation means may delete at least part of the accumulated measurement data.

Specifically, for example, the index of representing the positional variations in the compass space includes the range of distribution, the density of distribution, and the uniformity of density distribution. If the true offset is fixed, the more scattered the positions of the measurement data in the compass space upon which the offset data is based, the more the accuracy of the offset data is improved. Therefore, when the variations in the positions of accumulated plural pieces of measurement data in the compass space do not meet the predetermined criteria, the measurement data are deleted and reaccumulated to improve the accuracy of offset data updated based on the accumulated measurement data.

In order to attain the above first object, an azimuth processing device for outputting azimuth data based on measurement data sequentially output from a compass sensor includes: first accumulation means for accumulating a predetermined number of the measurement data; offset data creating means for creating offset data of the compass sensor based on the accumulated measurement data after the predetermined number of the measurement data was accumulated by said first accumulation means; second accumulation means for accumulating new measurement data for each segment of the compass space for updating the measurement data on a segment basis after creation of the offset data; and offset data updating means for updating the created offset data based on the measurement data accumulated by said second accumulation means after the creation of the offset data.

If the true offset is fixed, the more scattered the positions of the measurement data in the compass space upon which the offset data is based, the more the accuracy of the offset data is improved. On the other hand, if the offset data is created based on the measurement data updated for each segment of the compass space, the offset data will be created based on an insufficient number of measurement data when the time to accumulate the measurement data is too short. To avoid this situation, the offset data is first created based on the measurement data accumulated irrespective of the segment of the compass space, and then created based on the measurement data updated for each segment of the compass space, thereby improving the accuracy of the offset data reliably.

The azimuth processing device may further include azimuth data output means for outputting the azimuth data based on substantially newest measurement data and the offset data.

In such a case, the offset data of the compass sensor is updated based on the substantially newest measurement data to output the azimuth data based on the measurement data and the updated offset data, thereby improving the accuracy of the azimuth data.

When variations in distances between positions of plural pieces of the measurement data in the compass space accumulated by said first accumulation means and position of an offset data candidate in the compass space calculated based on the measurement data accumulated by said first accumulation means do not meet predetermined criteria, said first accumulation means may delete at least part of the accumulated measurement data and the offset data will not be updated by the offset data candidate.

When the distances between the positions of the accumulated plural pieces of measurement data in the compass space and the positions of offset data candidates in the compass space calculated based on the accumulated measurement data vary to a large degree, there is a high possibility that the plural pieces of measurement data upon which the offset data candidates are based will use different true offsets as reference, or the measurement data will be affected by noise to a large degree. Therefore, in such a case, the measurement data are deleted and reaccumulated to improve the accuracy of offset data updated based on the accumulated measurement data.

When variations in positions of plural pieces of the measurement data in the compass space accumulated in said first accumulation means do not meet predetermined criteria, said first accumulation means may delete at least part of the accumulated measurement data.

Specifically, for example, the index of representing the positional variations in the compass space includes the range of distribution, the density of distribution, and the uniformity of density distribution. If the true offset is fixed, the more scattered the positions of the measurement data in the compass space upon which the offset data is based, the more the accuracy of the offset data is improved. Therefore, when the variations in the positions of accumulated plural pieces of measurement data in the compass space do not meet the predetermined criteria, the measurement data are deleted and reaccumulated to improve the accuracy of offset data updated based on the accumulated measurement data.

When variations in distances between positions of plural pieces of the measurement data in the compass space accumulated by said second accumulation means and a position of the offset data do not meet predetermined criteria, said second accumulation means may delete at least part of the measurement data accumulated in said second accumulation means.

When variations in positions of plural pieces of the measurement data in the compass space accumulated by said second accumulation means do not meet predetermined criteria, said second accumulation means may delete at least part of the measurement data accumulated, in said second accumulation means.

Specifically, for example, the index of representing the positional variations in the compass space includes the range of distribution, the density of distribution, and the uniformity of density distribution. If the true offset is fixed, the more scattered the positions of the measurement data in the compass space upon which the offset data is based, the more the accuracy of the offset data is improved. Therefore, when the variations in the positions of accumulated plural pieces of measurement data in the compass space do not meet the predetermined criteria, the measurement data are deleted and reaccumulated to improve the accuracy of offset data updated based on the accumulated measurement data.

The azimuth processing device may further include reset means for allowing said first accumulation means to reaccumulate the measurement data until said offset data creating means recreates the offset data when a distance between a position of the substantially newest measurement data in the compass space and a position of the offset data in the compass space exceeds a reference value.

When the distance between the position of the substantially newest measurement data in the compass space and the position of the offset data in the compass space is different to a large degree from the radius of a compass circle or compass sphere, there is a high possibility that the true offset changes to a large degree, the movement speed of the compass sensor will be so fast that each piece of measurement data output one at each measurement time will indicate a different azimuth angle, or the measurement data will be affected by a local magnetic change. Therefore, in such a case, the measurement data accumulated under such conditions are deleted and reaccumulated to improve the accuracy of offset data updated based on the accumulated measurement data.

In order to attain the above first object, a portable electronic device includes: a microphone; an operation unit for accepting communication operations including a call operation; communication means for transmitting an acoustic signal output from said microphone in response to the accepting of the call operation; a display unit coupled to said operation unit in such a manner that the display unit can move back and forth between a first position in which the display unit is folded over said operation unit and a second position in which the display unit is apart from said operation unit; a compass sensor sequentially outputting measurement data; offset data updating means for starting accumulation of the measurement data when said display unit moves from the first position to the second position so as to update an offset data of said compass sensor based on the accumulated measurement data; azimuth data output means for outputting azimuth data based on substantially newest measurement data and the updated offset data; and display control means for displaying geographic information on said display unit based on the azimuth data.

When originating a call under such a condition that the display unit is folded over the operation unit, the user separates the display unit from the operation unit to originate the call. During this sequence of operations, the portable electronic device varies its attitude or position to a large degree. In this case, if the accumulation of measurement data of the compass sensor is started in response to the movement of the display unit from the first position in which it is folded over the operation unit to the second position in which it is apart from the operation unit, the positions of plural pieces of measurement data to be accumulated vary to a large degree. Therefore, such a portable electronic device for updating the offset data of the compass sensor based on the measurement data accumulated in the above-mentioned manner does not require the user to perform special operations for calibration.

The display unit may incorporate therein the compass sensor.

When originating a call under such a condition that the display unit is folded over the operation unit, since the user separates the display unit from the operation unit, the display unit changes it attitude or position to a large degree compared with the operation unit. In general, the more scattered the positions of the measurement data in the compass space upon which the offset data is based, the more the accuracy of the offset data is improved. Therefore, the compass sensor is incorporated in the display unit to improve the accuracy of the offset data.

The offset data updating means may stop the accumulation of the measurement data upon completion of the movement of said display unit.

After completion of the accumulation of the measurement data, the hardware resources are released from the accumulation processing.

The offset data updating means may correct the offset data according to changes in magnetic field applied to said compass sensor due to a magnetic force leaked from at least either of said operation unit or said display unit during the movement of said display unit.

The measurement data of the compass sensor are susceptible to magnetic forces (magnetic field lines) leaked from the portable electronic device. Since the influence varies with changes in the attitude or position of the display unit, the offset data is corrected in consideration of the changes to improve the accuracy of the offset data.

In order to attain the above first object, a portable electronic device includes: a compass sensor sequentially outputting measurement data; an operation unit; a display unit coupled to said operation unit in such a manner that the display unit can move back and forth between a first position in which it is folded over said operation unit and a second position in which the display unit is apart from said operation unit; offset data updating means for starting accumulation of the measurement data when said display unit moves from the first position to the second position so as to update an offset data of said compass sensor based on the accumulated measurement data; and azimuth data output means for outputting azimuth data based on substantially newest measurement data and the offset data.

Upon completion of the operations on the portable electronic device, the user is likely to move the display unit apart from the operation unit so as to fold it over the operation unit for the purpose of putting it in a pocket or bag. Therefore, if the accumulation of the measurement data of the compass sensor is started in conjunction with the movement of the display unit from the second position in which it is apart from the operation unit to the first unit in which it is folded over the operation unit, the positions of the measurement data in the compass space will vary to a large degree. Therefore, such a portable electronic device for updating the offset data of the compass sensor based on the measurement data accumulated in the above-mentioned manner does not require the user to perform special operations for calibration.

The display unit may incorporate therein the compass sensor.

Upon completion of the operations on the portable electronic device, since the user folds the display unit over the operation unit, the attitude or position of the display unit is changed to a large degree compared with the operation unit. In general, the more scattered the positions of the measurement data in the compass space upon which the offset data is based, the more the accuracy of the offset data is improved. Therefore, the compass sensor is incorporated in the display unit to improve the accuracy of the offset data.

The offset data updating means may stop the accumulation of the measurement data upon completion of the movement of said display unit.

After completion of the accumulation of the measurement data, the hardware resources are released from the accumulation processing.

The offset data updating means may correct the offset data according to changes in magnetic field applied to said compass sensor due to a magnetic force leaked from at least either of said operation unit or said display unit during the movement of said display unit.

The measurement data of the compass sensor are susceptible to a magnetic force leaked from the portable electronic device. Since the influence varies with changes in the attitude or position of the display unit, the offset data is corrected in consideration of the changes to improve the accuracy of the offset data.

In order to attain the above first object, a portable electronic device includes: a compass sensor sequentially outputting measurement data; communication means; incoming call notification means for notifying a user of reception of an incoming call; offset data updating means for starting accumulation of the measurement data when said communication means receives the incoming call so as to update an offset data of said compass sensor based on the accumulated measurement data; and azimuth data output means for outputting azimuth data based on substantially newest measurement data and the updated offset data.

When the portable electronic device notifies the reception of the incoming call, the user is likely to take the portable electronic device from a pocket or bag. In such an action, the attitude or position of the portable electronic device changes to a large degree. Therefore, if the accumulation of the measurement data of the compass sensor is started in response to the reception of an acoustic signal, the position of the measurement data accumulated in the above manner mill vary to a large degree. Therefore, such a portable electronic device for updating the offset data of the compass sensor based on the measurement data accumulated in the above-mentioned manner does not require the user to perform special operations for calibration.

The portable electronic device may further include: an operation unit; and a display unit incorporating therein said compass sensor and being coupled to said operation unit in such a manner that the display unit can move back and forth between a first position in which the display unit is folded over said operation unit and a second position in which the display unit is apart from said operation unit.

When the portable electronic device receives an incoming call under such a condition that the display unit is folded over the operation unit, since the user separates the display unit from the operation unit, the display unit changes it attitude or position to a large degree compared with the operation unit. In general, the more scattered the positions of the measurement data in the compass space upon which the offset data is based, the more the accuracy of the offset data is improved. Therefore, the compass sensor is incorporated in the display unit to improve the accuracy of the offset data.

The offset data updating means may stop the accumulation of the measurement data upon completion of the movement of said display unit from the first position to the second position.

After completion of the accumulation of the measurement data, the allocation of the hardware resources to the other processing is increased.

The offset data updating means may correct the offset data according to changes in magnetic field applied to said compass sensor due to a magnetic force leaked from at least either of said operation unit or said display unit during the movement of said display unit.

The measurement data of the compass sensor are susceptible to a magnetic force leaked from the portable electronic device. Since the influence varies with changes in the attitude or position of the display unit, the offset data is corrected in consideration of the changes to improve the accuracy of the offset data.

In order to attain the above first object, a portable electronic device includes: a compass sensor sequentially outputting measurement data; an operation unit for accepting communication operations including a call operation; communication means for originating a call according to the call operation; offset data updating means for starting accumulation of the measurement data when said operation unit accepts the call operation so as to update an offset data of said compass sensor based on the accumulated measurement data; and azimuth data output means for outputting azimuth data based on substantially newest measurement data and the updated offset data.

After originating the call on the operation unit, the user is likely to bring the portable electronic device close to the user's head, or put it in a pocket of a bag or cloth. During such an operation, the portable electronic device changes its attitude or position to a large degree. If the accumulation of the measurement data for azimuth data is started in response to accepting the originating call, the positions of the accumulated plural pieces of measurement data in the compass space may vary to a large degree. Therefore, such a portable electronic device for updating the offset data of the compass sensor based on the measurement data accumulated in the above-mentioned manner does not require the user to perform special operations for calibration.

In order to attain the above first object, a portable electronic device includes: an operation unit; a display unit having a screen and being coupled to said operation unit in such a manner that the display unit can swing about an axis line generally perpendicular to the screen from a first position in which a backside of the screen is folded over said operation unit and a second position in which the display unit is apart from said operation unit; a compass sensor incorporated in said display unit and sequentially outputting measurement data; offset data updating means for accumulating the measurement data when said display unit swings from the first position to the second position so as to update an offset data of said compass sensor based on the accumulated measurement data; and azimuth data output means for outputting azimuth data based on substantially newest measurement data and the updated offset data.

When the display unit incorporates the compass sensor, the positions of the measurement data in the compass space accumulated when the display unit swings about an axis line almost perpendicular to the screen vary to a large degree. Therefore, such a portable electronic device for updating the offset data of the compass sensor based on the measurement data accumulated in the above-mentioned manner does not require the user to perform special operations for calibration.

In order to attain the above first object, a portable electronic device includes: an operation unit; a display unit having a screen and being coupled to said operation unit in such a manner that the display unit can swing about an axis line generally perpendicular to the screen from a first position in which a backside of the screen is folded over said operation unit and a second position in which the display unit is apart from said operation unit; a compass sensor incorporated in said display unit and sequentially outputting measurement data; offset data updating means for accumulating the measurement data when said display unit swings from the second position to the first position so as to update an offset data of said compass sensor based on the accumulated measurement data; and azimuth data output means for outputting azimuth data based on substantially newest measurement data and an offset data.

When the display unit incorporates the compass sensor, the positions of the measurement data in the compass space accumulated when the display unit swings about an axis line almost perpendicular to the screen vary to a large degree. Therefore, such a portable electronic device for updating the offset data of the compass sensor based on the measurement data accumulated in the above-mentioned manner does not require the user to perform special operations for calibration.

The offset data updating means may correct the offset data according to changes in magnetic field applied to said compass sensor due to a magnetic force leaked from at least either of said operation unit or said display unit when said display unit swings.

The measurement data of the compass sensor are susceptible to a magnetic force leaked from the portable electronic device. Since the influence varies with changes in the attitude or position of the display unit, the offset data is corrected in consideration of the changes to improve the accuracy of the offset data.

In order to attain the above first object, a portable electronic device includes: a compass sensor sequentially outputting measurement data; an exterior package having a display screen; a plurality of light sources arranged discretely on two or more sides of said exterior package; light-emission control means for turning on the plurality of light sources in sequence; offset data updating means for accumulating the measurement data when said light sources are turned on in sequence so as to update an offset data of said compass sensor based on the accumulated measurement data; and azimuth data output means for outputting azimuth data based on substantially newest measurement data and the updated offset data.

When turning on the light sources scattered on the exterior package, the attention of the user is attracted in the order of emission. In other words, when the light sources scattered on the exterior package are turned on in sequence, the user is likely to move the position of the portable electronic device so that the user can visually follow points lighted in sequence by bring the lighted point side in front of the user. Therefore, when the light sources provided on two or more sides of the exterior package are turned on in sequence, the compass sensor changing its attitude or position together with the exterior package is likely to output measurement data the positions of which vary in the compass space. In other words, the positions of the measurement data of the compass sensor changing their attitude or position together with the movement of the exterior package during turning on in sequence the light sources scattered on the two or more sides of the exterior package vary to a large degree. Therefore, such a portable electronic device for updating the offset data of the compass sensor based on the measurement data accumulated during this period can accumulate measurement data necessary to update the offset data without making the user strongly aware of the calibration procedure.

In order to attain the above first object, a portable electronic device includes: a compass sensor sequentially outputting measurement data; an exterior package having screens on two or more sides thereof; target display control means for displaying a target on the screens and moving the target across the two or more sides of said exterior package; offset data updating means for accumulating the measurement data during the movement of the target so as to update an offset data of said compass sensor based on the accumulated measurement data; and azimuth data output means for outputting azimuth data based on substantially newest measurement data and the updated offset data.

When the target is displayed and moved across the two or more sides of the exterior package, the user is likely to change the attitude or position of the portable electronic device so that the user can visually follow the target by bring the screen with the target on it in front of the user. Therefore, when the target is moved across the two or more sides of the exterior package, the positions of the measurement data of the compass sensor changing their attitude or position together with the movement of the exterior package during the movement of the target across the two or more sides of the exterior package vary to a large degree. Therefore, such a portable electronic device for updating the offset data of the compass sensor based on the measurement data accumulated during this period can accumulate measurement data necessary to update the offset data without making the user strongly aware of the calibration procedure.

In order to attain the above first object, a portable electronic device includes: a compass sensor sequentially outputting measurement data; an exterior package having a screen; offset data updating means for accumulating the measurement data so as to update an offset data of said compass sensor based on the accumulated measurement data; operation guidance control means for indicating a guidance on the screen to operate said compass sensor to change its positions during the accumulation of the measurement data; and azimuth data output means for outputting azimuth data based on substantially newest measurement data and the updated offset data.

Showing the guidance to operate the compass sensor to change its attitude or position according to the measurement data, that is, according to the attitude or position of the compass sensor makes it easy for the user to understand the procedure necessary to update the offset data.

The offset data updating means may determine whether each piece of the measurement data is accepted or rejected so as to update the offset data based on the measurement data each of which is accumulated only when the measurement data is determined to be accepted, and said device further comprises notification means operative when the measurement data are rejected, for notifying a user that the measurement data are rejected.

The more the number of plural pieces of measurement data upon which the offset data is based, or the more scattered the positions of the measurement data in the compass space, the more accurately the offset data is updated. Therefore, if the offset data is updated only when the plural pieces of measurement data upon which the offset data is based meet specific criteria, the offset data can be updated accurately. Further, when the plural pieces of measurement data upon which the offset data is based do not meet the specific criteria, the portable electronic device lets the user know that they are rejected. Such a portable electronic device can encourage the user to reperform the calibration procedure.

The portable electronic device may further include another notification means operative when the measurement data are accepted, for notifying the user that the measurement data are accepted.

Since the portable electronic device lets the user know that the measurement data accumulated for updating the offset are accepted, the user can check on the reliability of the geographic information.

In order to achieve the first object of the invention, in the azimuth processing device, the compass sensor may comprise a plurality of magnetic sensors each being capable of detecting a magnitude of the magnetic field in one axis direction. The offset data updating means may calculate a ratio of sensitivities of the plurality of the magnetic sensors and the offset data related to the ratio of the sensitivities based on the plural pieces of the measurement data accumulated in the accumulating means.

In order to achieve the second object of the invention, a tilt offset correcting method comprises: a tilt data measuring step of inputting data from a tilt sensor to measure tilt data; a tilt offset calculating step of calculating an offset value and sensitivity data of the tilt sensor based on plural pieces of the measured tilt data; and a tilt offset updating step of updating a previously stored offset value of the tilt sensor to the offset value calculated in the preceding step.

Work for sensitivity correction can be reduced by computing the sensitivity of the tilt sensor based on the tilt data.

Preferably, the tilt offset correcting method further comprises: a tilt data storage determining step of determining whether to store the tilt data; a tilt offset validity judging step of judging whether the calculated offset value is valid or not; and a tilt data correcting step of correcting the tilt data measured in the tilt data measuring step according to the valid offset value and the sensitivity data.

Preferably, the tilt offset correcting method further includes: a magnetic field data measuring step of inputting data from a geomagnetic sensor to measure magnetic field data; a magnetic offset calculating step of calculating an offset value of the geomagnetic sensor based on the measured magnetic field data; and a magnetic offset updating step of updating a previously stored offset value of the geomagnetic sensor to the offset value calculated in the preceding step, wherein the validity of the offset value of the tilt sensor is judged in the tilt offset validity judging step based on last judgment result of validity of the offset value of the magnetic sensor.

In order to achieve the second object of the invention, an azimuth measuring method comprises: a magnetic data measuring step of inputting data from a geomagnetic sensor to measure magnetic field data; a magnetic field data storage determining step of determining whether to store the magnetic field data; a magnetic offset calculating step of calculating an offset value of the geomagnetic sensor based on the stored magnetic field data; a magnetic offset validity judging step of judging whether the calculated offset value is valid or not; a magnetic offset updating step of updating a previously stored offset value to the offset value judged to be valid in the preceding step; a tilt data measuring step of inputting data from a tilt sensor to measure tilt data; a tilt data storage determining step of determining whether to store the tilt data; a tilt offset calculating step of calculating an offset value and sensitivity data of the tilt sensor based on plural pieces of the stored tilt data; a tilt offset validity judging step of judging whether the calculated offset value of the tilt sensor is valid or not; a tilt offset updating step of updating a previously stored offset value of the tilt sensor to the offset value judged to be valid in the preceding step; and an azimuth measuring step of measuring an azimuth based on an offset value calculated from the offset value updated in the magnetic offset updating step and the offset value updated in the tilt offset updating step.

Work for sensitivity correction can be reduced by measuring the azimuth while compensating the sensitivity of the tilt sensor as well as calibration of the geomagnetic sensor and the tilt sensor.

In order to achieve the second object of the invention, a compass sensor unit comprises: a three-axis geomagnetic sensor; three-dimensional magnetic field measuring means for generating magnetic field data based on output of the three-axis geomagnetic sensor; magnetic field data storage determining means for determining whether to store the magnetic field data input from the three-dimensional geomagnetic sensor; magnetic offset calculating means for calculating an offset value of the three-axis geomagnetic sensor based on the stored magnetic field data; magnetic offset validity judging means for judging the calculated offset value to be valid; magnetic offset storing means for updating a previously stored offset value of the magnetic sensor to the offset value judged to be valid and storing the updated offset value; magnetic field data correcting means for correcting the magnetic field data measured by the three-dimensional magnetic field measuring means based on the updated offset value; a three-axis tilt sensor; three-dimensional tilt measuring means for generating tilt data based on output of the three-axis tilt sensor; tilt data storage determining means for determining whether to store the tilt data input from the three-dimensional tilt measuring means; tilt offset calculating means for calculating an offset value and sensitivity data of the three-axis tilt sensor based on plural pieces of the stored tilt data; tilt offset validity judging means for judging the calculated offset value of the three-axis tilt sensor to be valid; tilt offset storing means for updating a previously stored offset value of the three-axis tilt sensor to the offset value of the three-axis tilt sensor judged to be valid and storing the updated offset value; and tilt data correcting means for correcting the tilt data based on the updated offset value and the sensitivity data of the three-axis tilt sensor.

Work for sensitivity correction can be reduced by measuring the azimuth while compensating the sensitivity of the tilt sensor as well as calibration of the geomagnetic sensor and the tilt sensor.

Preferably, the tilt offset validity judging means compares the offset value calculated from the output of the three-axis tilt sensor with the offset value calculated from the output of the three-axis geomagnetic sensor to judge the validity of the offset value of the three-axis tilt sensor.

In order to achieve the second object of the invention, a compass sensor unit comprises: a three-axis geomagnetic sensor; three-dimensional magnetic field measuring means for generating magnetic field data based on output of the three-axis geomagnetic sensor; magnetic field data storage determining means for determining whether to store the magnetic field data input from the three-dimensional magnetic field measuring means; magnetic offset calculating means for calculating an offset value of the three-axis geomagnetic sensor based on the stored magnetic field data; magnetic offset validity judging means for judging the calculated offset value to be valid; magnetic offset storing means for updating a previously stored offset value to the offset value judged to be valid and storing the updated offset value; a three-axis tilt sensor; three-dimensional tilt measuring means for generating tilt data based on output of the three-axis tilt sensor; tilt data storage determining means for determining whether to store the tilt data input from the three-dimensional tilt measuring means; tilt offset calculating means for calculating an offset value and sensitivity data of the three-axis tilt sensor based on plural pieces of the stored tilt data; tilt offset validity judging means for judging the calculated offset value of the three-axis tilt sensor to be valid; tilt offset storing means for updating a previously stored offset value of the three-axis tilt sensor to the offset value of the three-axis tilt sensor judged to be valid and storing the updated offset value; and azimuth measuring means for measuring an azimuth based on an offset value calculated from the offset value updated by the magnetic offset storing means and the offset value updated by the tilt offset storing means.

Work for sensitivity correction can be reduced by measuring the azimuth while compensating the sensitivity of the tilt sensor as well as calibration of the geomagnetic sensor and the tilt sensor.

In order to achieve the second object of the invention, a portable electronic device includes the compass sensor unit as stated above.

Each feature of the plurality of means according to the present invention is implemented by a hardware resource(s) the function of which is identified by its configuration, or by a hardware resource(s) the function of which is identified by a program, or by a combination of them. Each feature of the plurality of means is not limited to that implemented by a hardware resource(s) physically independent of another.

The present invention can be identified in the application not only as a device, but also as a program, a recording medium with the program recorded on it, and a method.

DETAILED DESCRIPTION OF THE INVENTION

Figure 1:
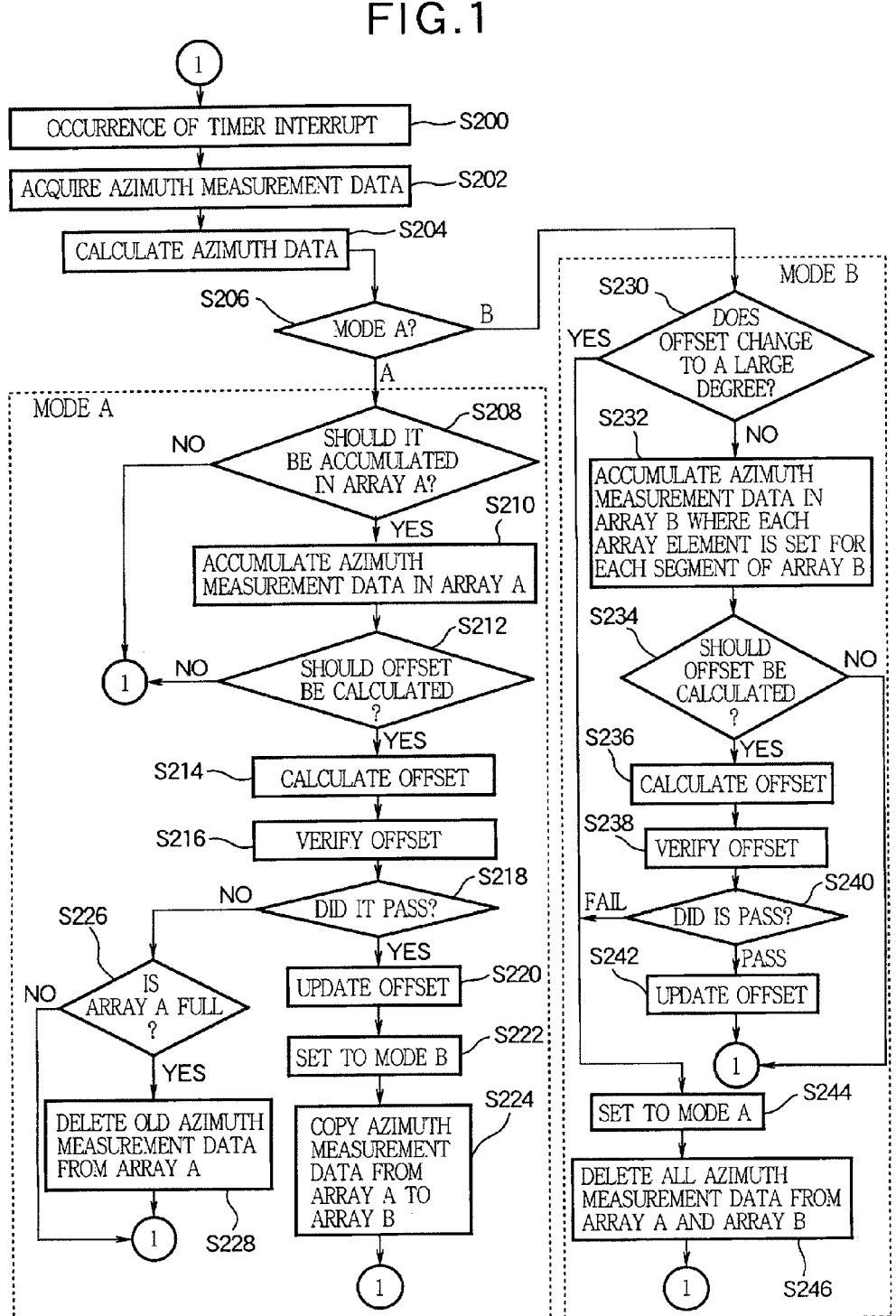
FIG. 1 is a flowchart showing an azimuth processing method according to a first embodiment of the present invention.

The present invention will now be described based on preferred embodiments. Structural elements given the same reference numerals correspond to each other throughout first to tenth embodiments.

First Embodiment

Figure 2:
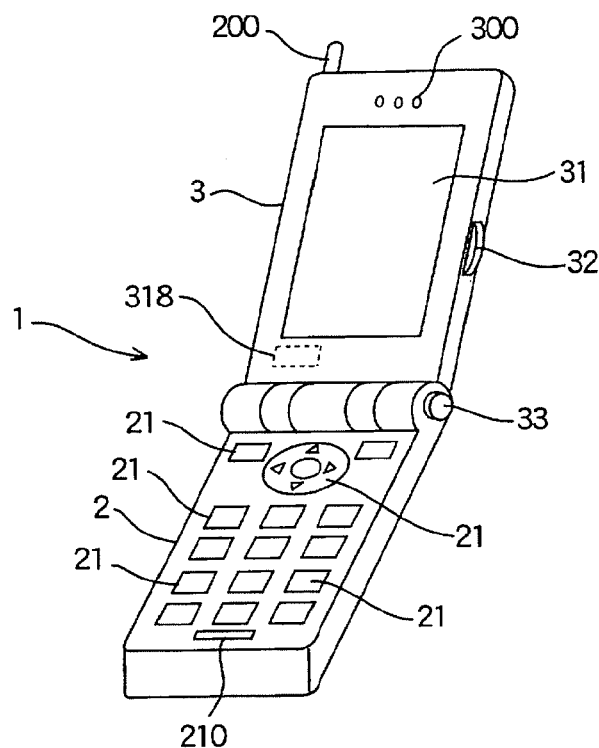
FIG. 2 is a perspective view showing the appearance of a telephone set according to the first embodiment of the present invention.
Figure 3:
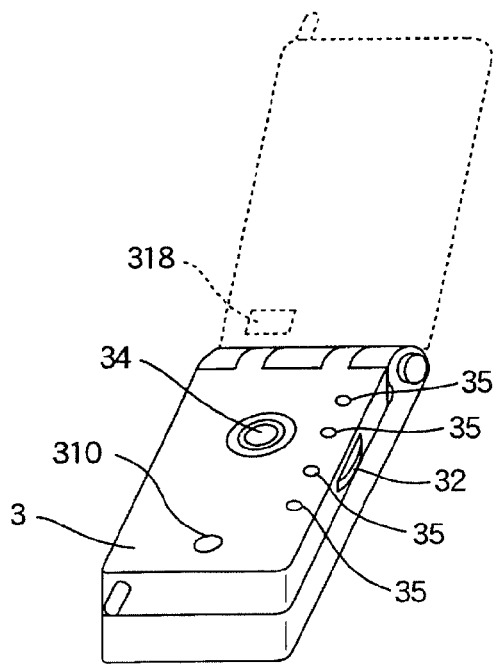
FIG. 3 is a perspective view showing the appearance of the telephone set according to the first embodiment of the present invention.

FIGS. 2 and 3 are external views showing a telephone 1 as a portable electronic device according to a first embodiment of the present invention. The telephone 1 is a portable, compact telephone having a wireless phone-call function and a function for displaying a map around its current position. The telephone 1 consists predominantly of an operation unit 2 with multiple keys 21, and a display unit 3 with a screen 31. The display unit 3 is coupled swingably to the operation unit 2. FIG. 3 shows such a state that the display unit 3 is folded over the operation unit 2. In this state, the keys 21 on the operation unit 2 are covered by the display unit 3, while the screen 31 on the display unit 3 is covered by the operation unit 2. When a button 33 is pressed in such a state that the display unit 3 is folded over the operation unit 2, the elastic force of a spring, not shown, causes the display unit 3 to swing up from the operation unit 2.

Figure 4:
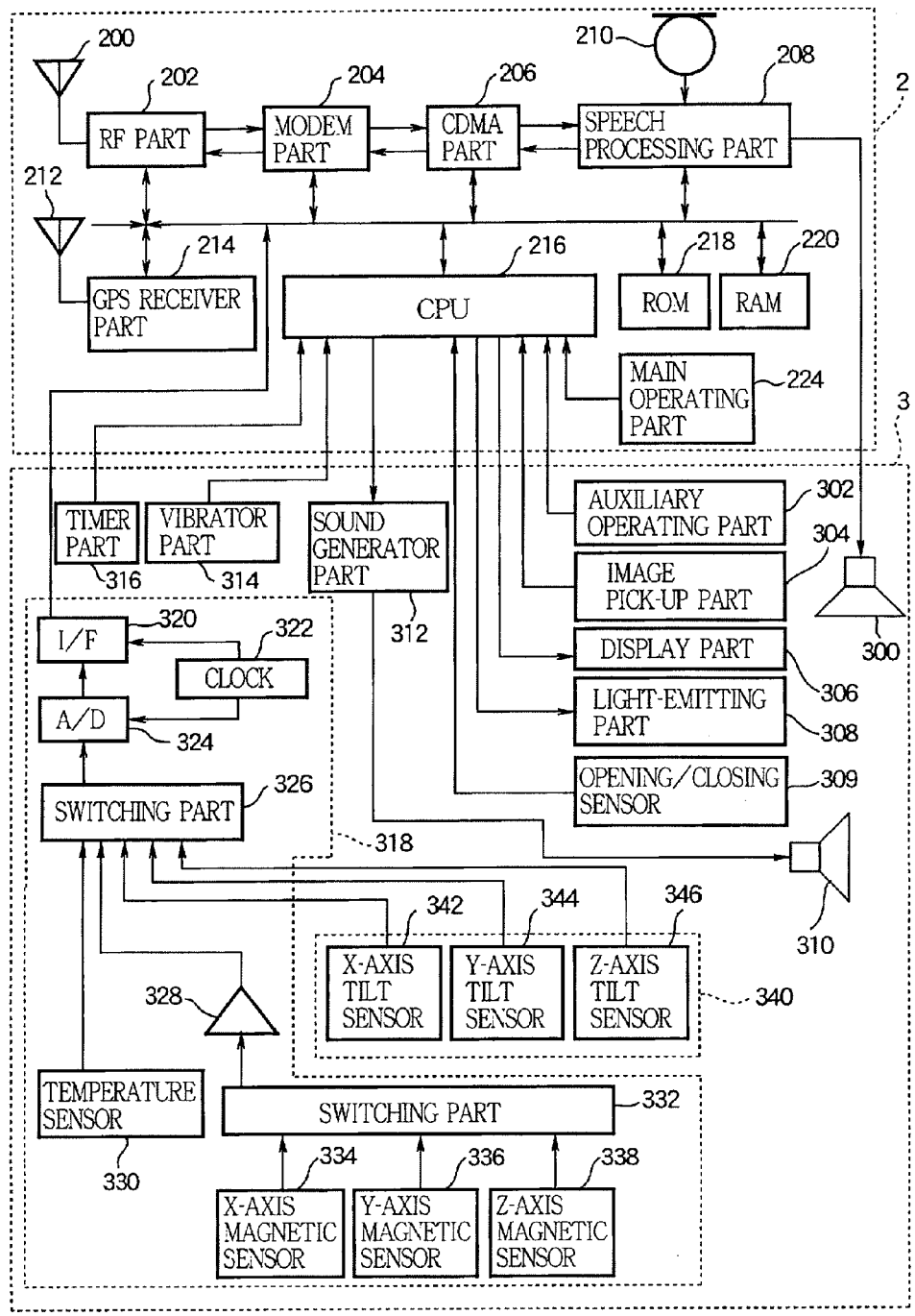
FIG. 4 is a block diagram showing the hardware structure of the telephone set according to the first embodiment of the present invention.

FIG. 4 is a block diagram showing the hardware structure of the telephone 1.

An RF part 202 as part of communication means has a duplexer, an amplifier, a filter, etc., which pass a received signal through a receiver-side circuit and a transmit signal through an antenna. Upon reception, a modem part 204 as part of the communication means uses a demodulator to demodulate the received signal. Then it uses an A/D converter to convert the demodulated signal into a digital signal and output the digital signal to a CDMA part 206 as a baseband signal. Upon transmission, the modem part 204 uses a D/A converter to convert a baseband signal from the CDMA part 206 into an analog signal. Then it uses a modulator to modulate the analog signal and output the modulated analog signal to the RF part 202 as a transmit signal.

The CDMA part 206 as part of the communication means includes a circuit for performing spreading or despreading by adding a spread code to a signal, a circuit for separating or combining a control signal for communication between a base station and the telephone 1 from or with a speech signal. Upon reception, the CDMA part 206 despreads the baseband signal from the modem part 04, and then separates the despread signal into the control signal and the speech signal. Upon transmission, the CDMA part 206 combines the control signal with the speech signal from a speech processing part 208, and then spreads the combined signal. After that, the CDMA part 206 outputs the spread signal to the modem part 204 as a baseband signal.

The speech processing part 208 as part of the communication means has a D/A converter, an A/D converter, and a speech compression circuit for compressing a digital signal representing uttered voice. Upon reception, the speech processing part 208 uses the D/A converter to convert the speech signal from the CDMA part 206 into an analog signal. Then it outputs the analog signal to a voice speaker 300 as a received speech signal. Upon transmission, the speech processing part 208 uses the A/D converter to convert an electric signal representing uttered voice from a microphone 210 into a digital signal. Then it uses the speech compression circuit to compress the digital signal to generate a speech signal.

The microphone 210 is provided in the operation unit 2. The microphone 210 converts voice uttered by a user into an electric signal.

A GPS receiver part 214 has an amplifier, a frequency converter, an A/D converter, a circuit for creating position data based on a GPS signal received at an antenna 212, etc. The position data is data capable of uniquely identifying the current position of the telephone 1 on Earth. The GPS receiver part 214 uses the amplifier to amplify the GPS signal, and the frequency converter to convert the frequency of the amplified GPS signal to a predetermined frequency. Then, the GPS receiver part 214 uses the A/D converter to convert an analog signal from the frequency converter into a digital signal to create the position data from the digital signal.

A CPU 216 is connected, through an I/O interface, not shown, with peripheral devices such as a main operating part 224, an auxiliary operating part 302, an image pick-up part 304, a display part 306, and a light-emitting part 308. The CPU 216 loads, into a RAM 220, various computer programs stored in a ROM 218, and executes the programs to control the entire operation of the telephone 1.

The main operating part 224 is provided in the operation unit 2, and is equipped with the various keys 21. When any key 21 is pressed, the main operating part 224 outputs a predetermined signal to the CPU 216 to accept a user's operation.

The voice speaker 300 is provided in the display unit 3. The voice speaker 300 radiates into the air a sound wave corresponding to a received speech signal from the speech processing part 208 to produce received voice.

The auxiliary operating part 302 is provided in the display unit 3, and is equipped with a dial switch 32. When the user rotates the dial switch 32, the auxiliary operating part 302 outputs a predetermined signal to the CPU 216 to accept a user's operation.

The image pick-up part 304 is provided in the display unit 3, and is equipped with not only a lens 34, but also an area image sensor, an A/D converter, and an image processor, which are not shown. The lens 34 is provided on the backside of the screen 31; it has an optical axis perpendicular to the screen 31 to form an image of an object on the optical axis on the area image sensor.

The display part 306 is composed of the screen 31 as a liquid-crystal display panel, a display circuit, a frame memory, etc.

The light-emitting part 308 as part of annunciator means is provided in the display unit 3, and is equipped with a plurality of light sources 35 (see FIG. 3) such as LEDs. The light sources 35 are provided on the backside of the screen 31; they emit light in response to a receive annunciator signal from the CPU 216.

An opening/closing sensor 309 detects a fully closed state, a fully open state, and an intermediate state of the display unit 3. Thus, the opening/closing sensor 309 can detect the timing of starting the opening of the display unit 3 from the fully closed state, and the timing of starting the closing of the display unit 3 from the fully open state.

An alarm speaker 310 as part of the annunciator means is provided in the display unit 3. The alarm speaker 310 radiates into the air a sound wave corresponding to an alarm signal from a sound generator part 312 to produce a ring tone that lets the user know the arrival of a call or e-mail.

A vibrator part 314 as part of the annunciator means includes an actuator for generating vibration. The vibrator part 314 vibrates in response to an incoming alarm signal from the CPU 216 to let the user know the arrival of a call or e-mail.

A timer part 316 includes a real-time clock, an oscillator, etc. to output time data to the CPU 216. For example, the time data represents year, day, hour, minute, second, day of the week, etc.

A compass sensor module 318 is provided in the display unit 3. The compass sensor module 318 includes three-axis magnetic sensors 334, 336, and 338 for detecting the magnitude and direction of geomagnetism (magnetic field of the Earth) resolved along three axes orthogonal to one another, a thermistor or band gap reference type temperature sensor 330, an interface with a controller 40, etc. The magnetic sensors 334, 336, and 338 are magnetoresistive sensors, each having a magnetoresistive element and a coil for applying a bias magnetic field to the magnetoresistive element. A switching part 332 outputs any one of signals from the magnetic sensors 334, 336, and 338 as a magnetic sensor signal. A switching part 326 outputs any one of the magnetic sensor signal amplified by an amplifier 328, an output signal from the temperature sensor 330, and output signals from tilt sensors 342, 344, and 346. The output signal from the switching part 326 is sampled at an A/D converter 324 based on a clock signal from an oscillator 322. An interface part 320 outputs a digital signal from the A/D converter 324 to the controller 40 as measurement data. As a result, the compass sensor module 318 outputs measurement data corresponding to any one of the output signals from the magnetic sensors 334, 336, and 338, the output signal from the temperature sensor 330, and the output signals from the tilt sensors 342, 344, and 346 mounted in an attitude sensor module 340. The switching part 326 and the switching part 332 may selectively output any of the output signals based on control instructions from the controller 40, or selectively output the signals in predetermined order at predetermined time intervals.

The attitude sensor module 340 is connected to the switching part 326 of the compass sensor module 318, and is equipped with the three-axis tilt sensors 342, 344, and 346 for detecting the magnitude and direction of gravity resolved along three axes orthogonal to one another. Each of the tilt sensors 342, 344, and 346 has a piezoelectric gyro, etc. An analog output signal from the attitude sensor module 340 is input into the compass sensor module 318.

Figure 5:
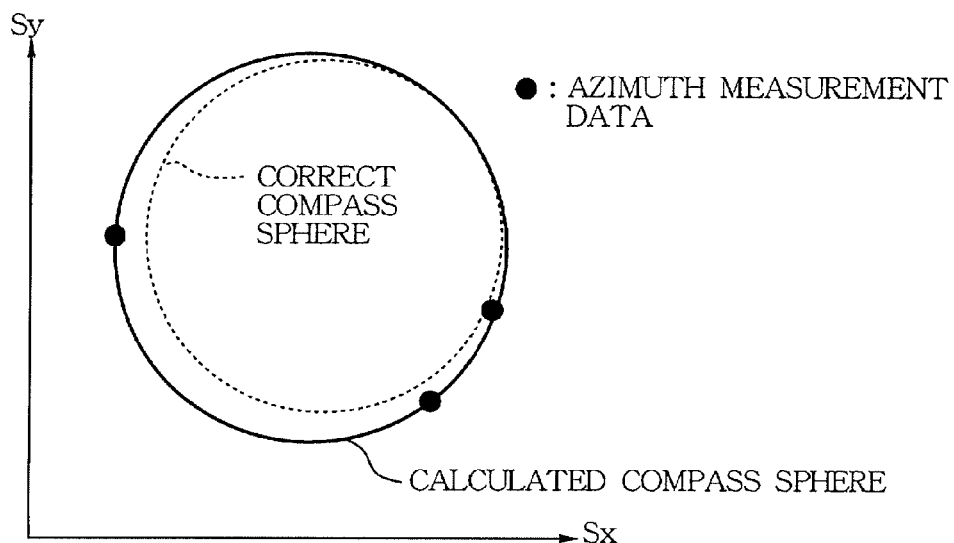
FIG. 5 is a schematic illustration according to the first embodiment of the present invention.
Figure 6:
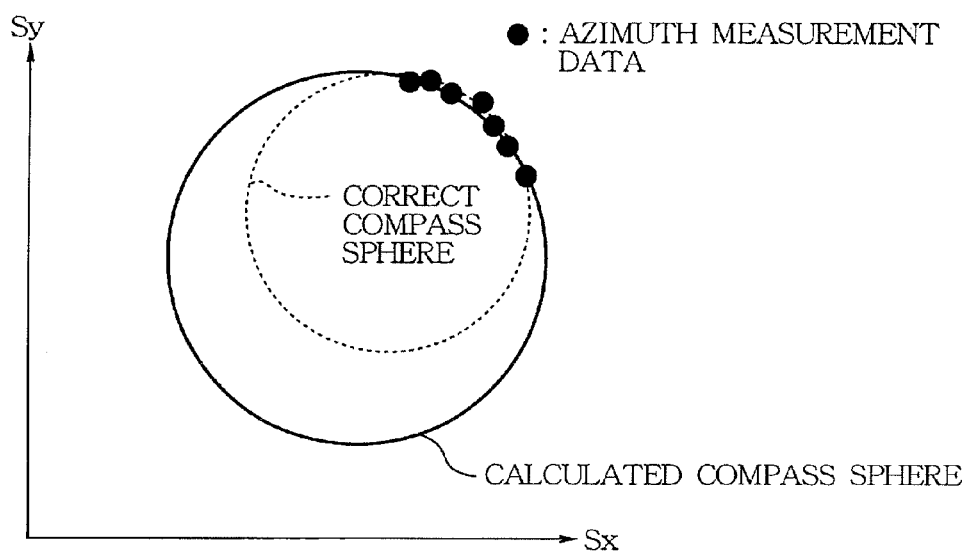
FIG. 6 is a schematic illustration according to the first embodiment of the present invention.
Figure 7:
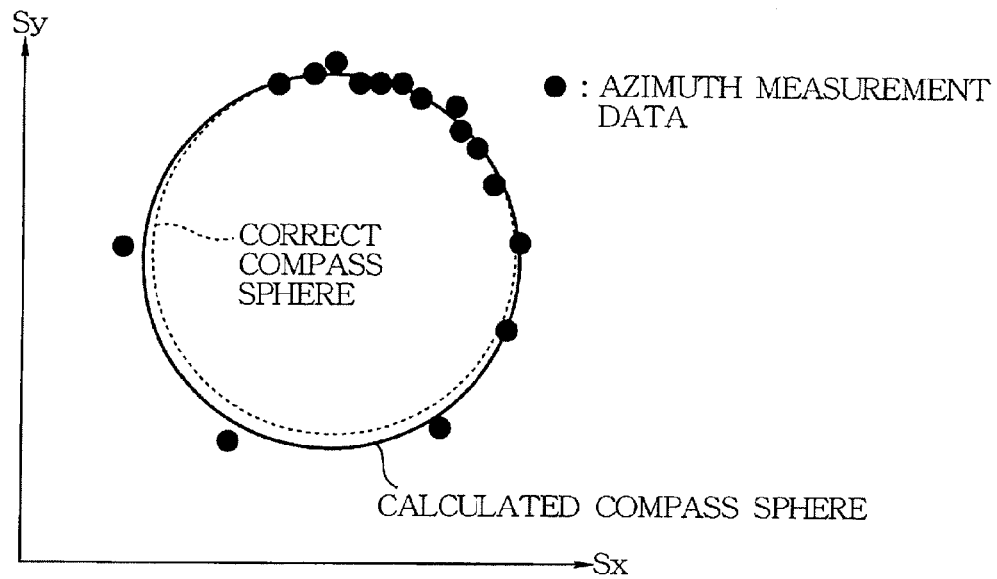
FIG. 7 is a schematic illustration according to the first embodiment of the present invention.

FIGS. 5, 6, and 7 are schematic illustrations for explaining the relationship between a compass sphere represented by offset data calculated from azimuth measurement data and a correct compass sphere. The compass sphere is a sphere which is centered at a point in a compass space corresponding to the offset of the compass sensor, and the radius of which corresponds to the strength of geomagnetism. More specifically, the compass sphere is defined for a geomagnetic sensor which has a magnetic sensitivity in directions of three axes X, Y and Z, and which outputs three dimensional data. The compass sphere is defined by plotting the three dimensional data successively outputted from the geomagnetic sensor in a three dimensional coordinate space while the geomagnetic sensor is rotated in a given geomagnetic field. Thus, a deviation of the center point of the compass sphere from the origin point of the three dimensional coordinate space represents the offset of the geomagnetic sensor, and the radius of the compass sphere represents a magnitude of the geomagnetic field sensed by the geomagnetic sensor. Instead of the compass sphere, FIGS. 5, 6, and 7 show compass circles that are projections of the compass sphere on the x-y plane.

As shown in FIG. 5, a small number of pieces of azimuth measurement data result in low accuracy of the calculated compass sphere. As shown in FIG. 6, even if the number of pieces of azimuth measurement data is large, a local distribution of the azimuth measurement data also results in low accuracy of the calculated compass sphere. It is desirable that the azimuth measurement data are distributed in the range of 90 degrees, or greater, around each center of the three compass circles that are projections of the correct compass sphere on the x-y coordinate plane, y-z coordinate plane, and z-x coordinate plane, respectively. As shown in FIG. 7, even if pieces of azimuth measurement data are large in number and are widely distributed, an uneven distribution of the azimuth measurement data along the circumference of each compass circle results in low accuracy of the calculated compass sphere as well. In other words, accurate azimuth offset data can be calculated by gathering a large number of pieces of azimuth measurement data distributed widely and uniformly along the circumference of each compass circle. The following specifically describes an algorithm for calculating azimuth offset data based on this principle. The algorithm is described using a compass sphere because of the use of azimuth measurement data from the three-axis compass sensor module 318. However, if a two-axis compass sensor is used to gather azimuth measurement data, the algorithm can be interpreted by replacing the compass sphere with a compass circle.

(Mode A)

Figure 8:
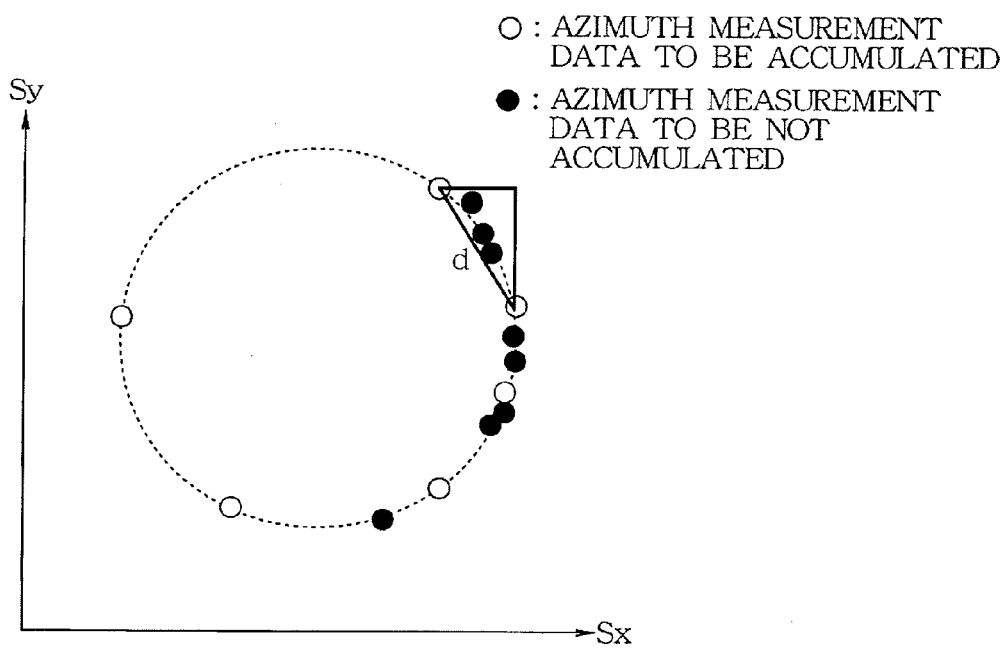
FIG. 8 is a schematic illustration according to the first embodiment of the present invention.

As shown in FIG. 8, offset updating mode A is such that the newest azimuth measurement data is accumulated only when distance d between a position within a compass space represented by azimuth measurement data accumulated immediately before the newest azimuth measurement data (hereinafter simply called the position of azimuth measurement data) and the position of the newest azimuth measurement data output from an azimuth measuring part 66 is a predetermined value or larger (see step S208 to be described).

In the mode A, azimuth offset data is not calculated until the number of pieces of azimuth measurement data becomes a predetermined number or larger (for example, 25) (see step S212 to be described).

Figure 9:
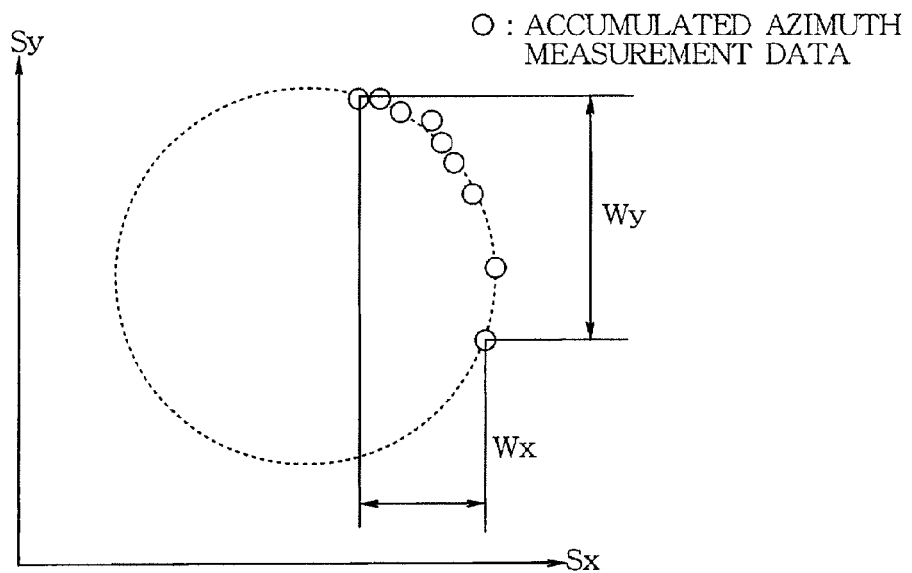
FIG. 9 is a schematic illustration according to the first embodiment of the present invention.

Then, in the mode A, azimuth offset data as offset data candidates are calculated based on a predetermined number or more of pieces of azimuth measurement data, but the calculated azimuth offset data are verified and only the calculation result that passes acceptability criteria is adopted (see steps S218 and S220 to be described). The following is the acceptability criteria:

Acceptability criterion 1: A difference between the maximum and minimum coordinate values on each axis (Wx, Wy, Wz; see FIG. 9) represented by the accumulated azimuth measurement data must be larger than the radius of the compass sphere calculated. Note that the calculated azimuth offset data may be accepted, even if the z-coordinate data does not meet the criterion, as long as the x- and y-coordinate data meet it. For example, if the z-coordinate data does not meet the criterion, only the offset values for the x-axis magnetic sensor 334 and the y-axis magnetic sensor 336 may be updated.

Figure 10:
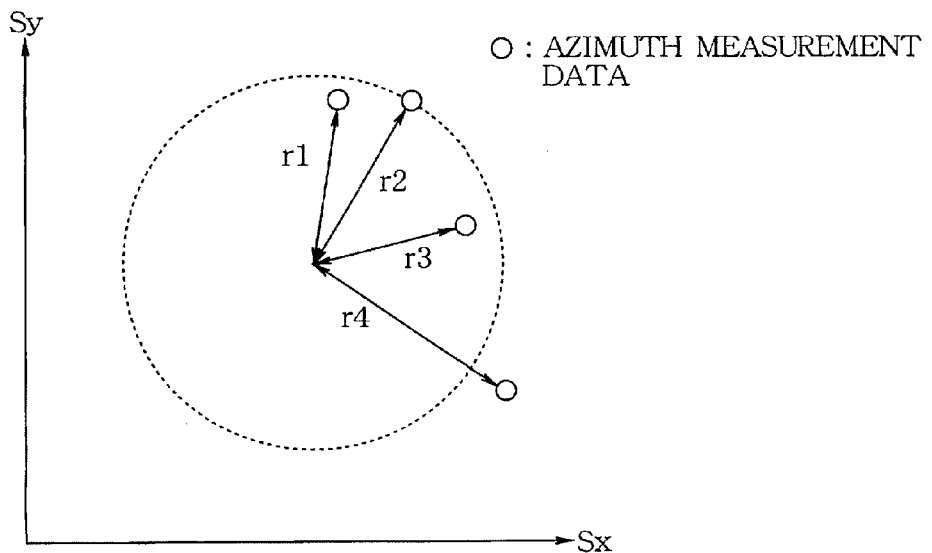
FIG. 10 is a schematic illustration according to the first embodiment of the present invention.

Acceptability criterion 2: Variance or variations in distance (r, see FIG. 10) which is defined in the given coordinate system from the center of the calculated compass sphere to the positions of the accumulated pieces of azimuth measurement data, must be less than a predetermined value. For example, if all the distances are one-fifth or less of the radius of the calculated compass sphere, the offset data is quasi-accepted, while if they are one-tenth or less, it is accepted. Note that the calculated azimuth offset data may be accepted, even if the z-coordinate data does not meet the criterion, as long as the x- and y-coordinate data meet it.

After completion of updating the azimuth offset data in the mode A, offset data updating shifts to mode B.

(Mode B)

Figure 11:
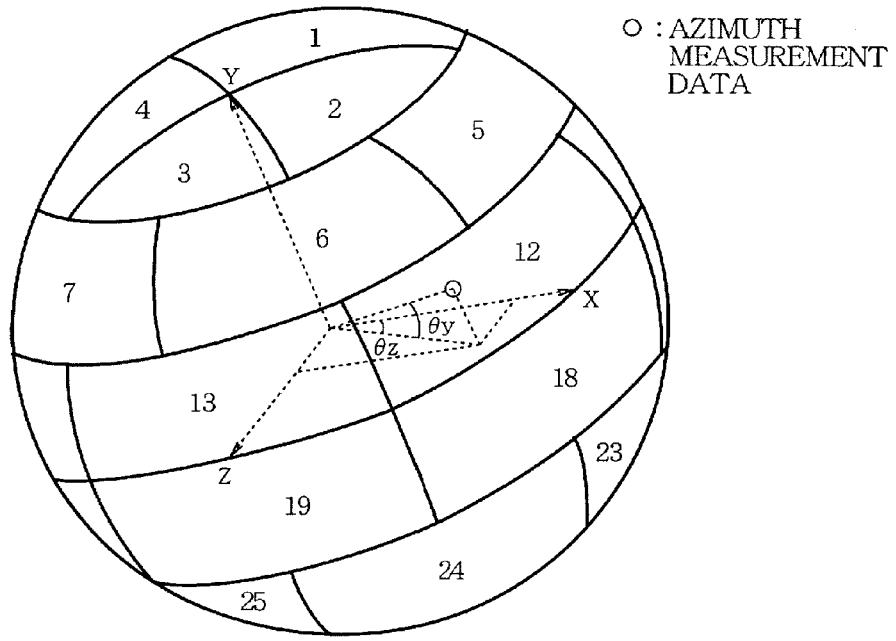
FIG. 11 is a schematic illustration according to the first embodiment of the present invention.

As shown in FIG. 11, the mode B is such that the compass sphere is divided into segments to update and accumulate a predetermined number of azimuth measurement data (e.g., one) for each segment. For example, the segmentation can be set, as shown in FIG. 11, according to the intersection point of the normal of the position of each azimuth measurement data to the x-z plane, the angle ($\theta z$) between the x axis and a line segment connecting the intersection point and the center of the calculated compass sphere, and the angle ($\theta y$) between the x-z plane and a line segment connecting the position of the azimuth measurement data and the center of the compass sphere. If any old azimuth measurement data has already been accumulated for a segment to which the newest azimuth measurement data belongs, the newest azimuth measurement data is written over the old azimuth measurement data (see S232 to be described). Note that two or more pieces of azimuth measurement data may be accumulated for each segment.

In the mode B, the accuracy of the calculated azimuth offset data is also verified by the same acceptability criteria as in the mode A, and only the calculation result that passes the criteria is adopted (see steps S238 and S240 to be described). On the other hand, if it does not meet the acceptability criteria, the azimuth processing mode shifts to the mode A (see step S244 to be described).

Figure 12:
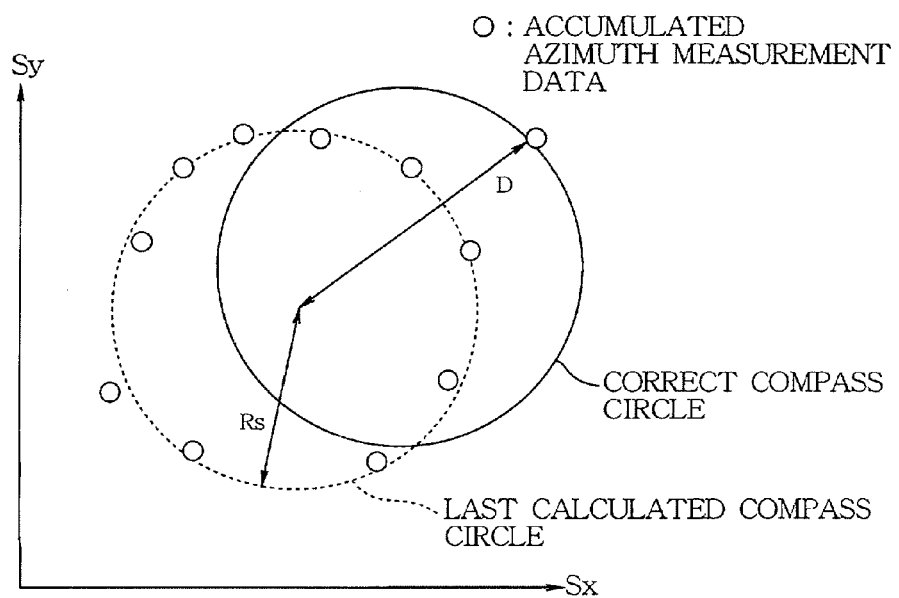
FIG. 12 is a schematic illustration according to the first embodiment of the present invention.

In the mode B, if the azimuth offset data changes to a large degree, the distance (D) from the center of the compass sphere corresponding to the last calculated azimuth offset data to the position of the newest azimuth measurement data will become much larger than the radius (Rs) of the compass sphere corresponding to the last calculated azimuth offset data (see FIG. 12). Further, since the compass sensor module 318 outputs azimuth measurement data for each axis one after another in a time-sharing manner, the same phenomenon occurs when the user moves the telephone 1 too fast. The same phenomenon also occurs when the magnetic field applied to the telephone 1 changes to a large degree in a short time. In these cases, if the azimuth offset data is calculated based on the azimuth measurement data accumulated in the past, the calculated offset data could contain a high degree of inaccuracy. Therefore, once such a situation occurs in the mode B, the azimuth processing shifts to the mode A (see steps S230, S244, and S246 to be described).

When the mode A and the mode B are used in conjunction with each other, all newest pieces of azimuth measurement data output from the azimuth measuring part 66 to be described later may be accumulated in the mode A during a certain period of time so that the azimuth offset data will be calculated based on all the accumulated pieces of azimuth measurement data.

Figure 13:
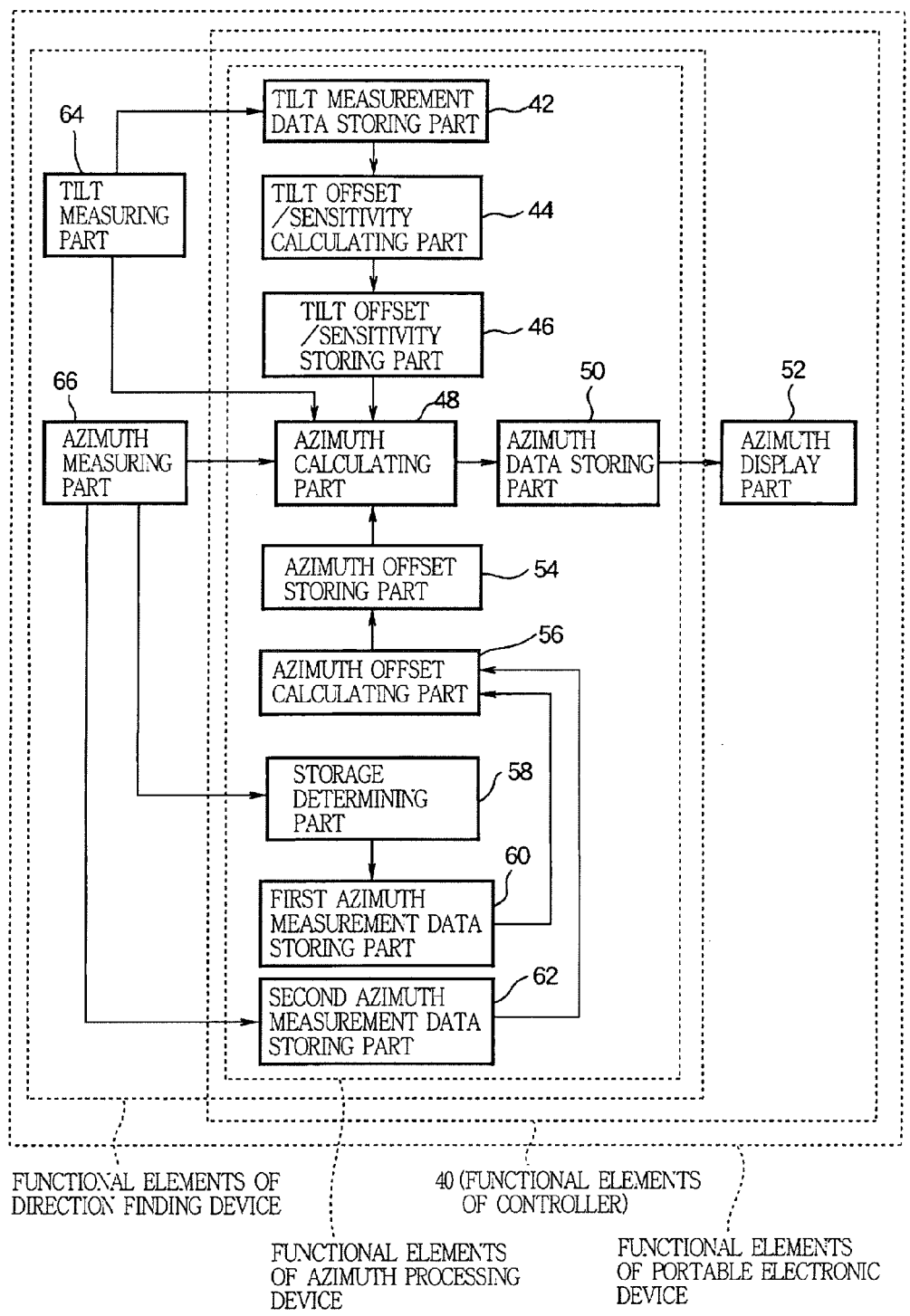
FIG. 13 is a block diagram showing functional elements according to the first embodiment of the present invention.

FIG. 13 is a block diagram showing functional elements of an azimuth processing device, a direction finding device, and a portable electronic device.

The azimuth measuring part 66 includes the compass sensor module 318; it outputs three-dimensional azimuth measurement data corresponding to respective output values of the x-axis magnetic sensor 334, the y-axis magnetic sensor 336, and z-axis magnetic sensor 338 according to the attitude of the telephone 1 and geomagnetism.

The controller 40 includes the CPU 216, the ROM 218, the RAM 220, and a geographic information display program executed by the CPU 216.

An azimuth calculating part 48 as azimuth data output means is implemented via the geographic information display program to output azimuth data indicating an azimuth heading based on the azimuth measurement data, the azimuth offset data, the tilt measurement data, and the tilt offset data.

Figure 14:
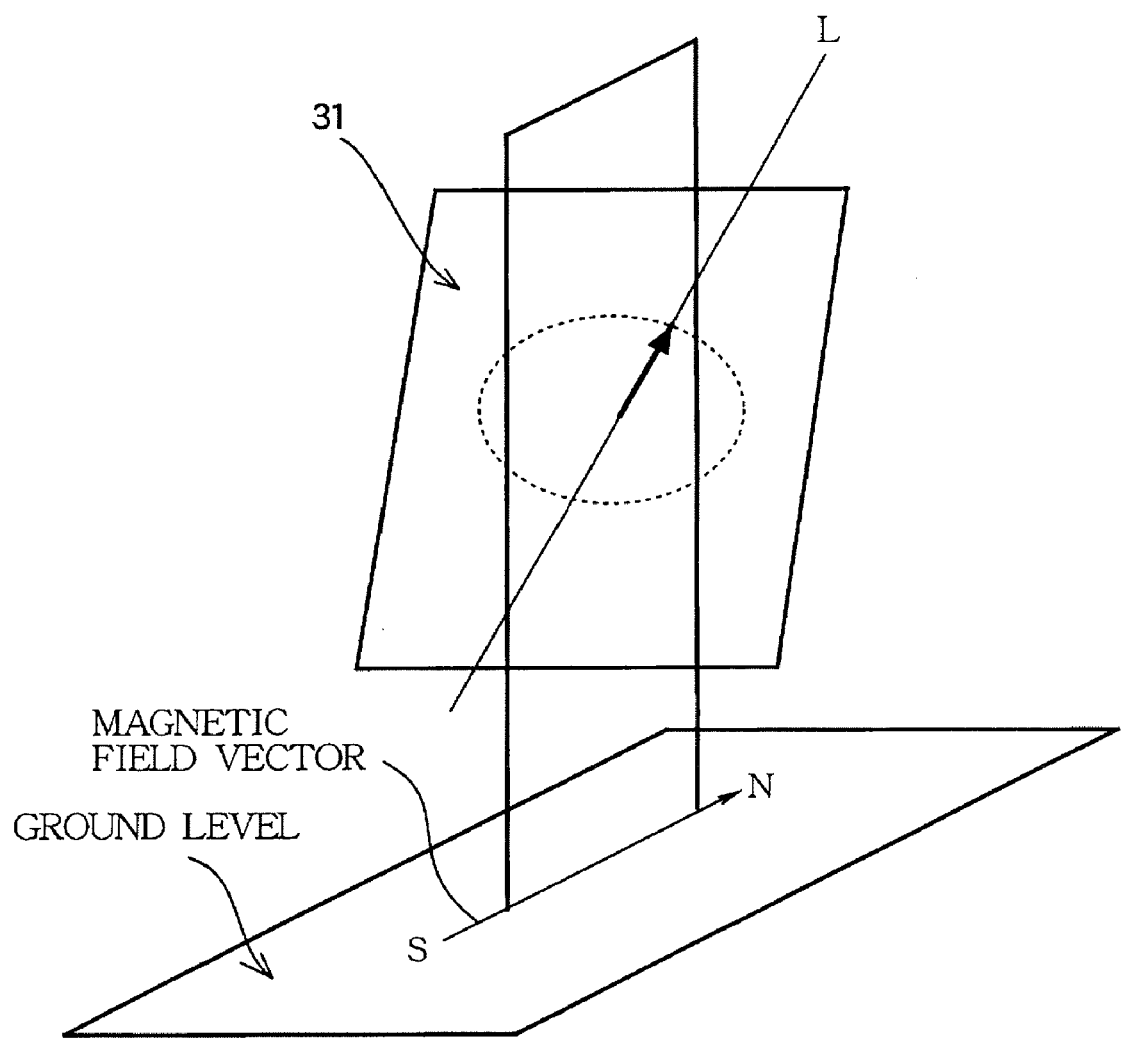
FIG. 14 is a schematic illustration according to the first embodiment of the present invention.

The azimuth calculating part 48 may also correct the azimuth data by referring to temperature measurement data output from the temperature sensor 330. As shown in FIG. 14, azimuth data indicates the northward direction of a straight line L contained in both the screen 31 and a plane parallel to a magnetic vector representing the direction and strength of the magnetic field (geomagnetism) and perpendicular to the ground level. In the azimuth offset updating processing mode A, the azimuth calculating part 48 calculates azimuth data based on the azimuth offset data set at the time of the last execution of the geographic information display program until a predetermined pieces of azimuth measurement data are stored. In the mode A, the predetermined pieces of azimuth measurement data are accumulated, and azimuth offset data is calculated based on the accumulated pieces of azimuth measurement data. After updating the azimuth offset data in the mode A, the azimuth calculating part 48 calculates azimuth data while updating the azimuth offset data in the azimuth offset updating processing mode B.

An azimuth data storing part 50 is implemented via the geographic information display program to store azimuth data in a predetermined area of the RAM 220. A azimuth display part 52 as geographic display control means is implemented via the geographic information display program to display geographic information on the screen 31 based on the azimuth data and position data. For example, the azimuth display part 52 displays a map around the current position in the north-up direction, or in the direction of the heading of the telephone 1, on the screen 31 as geographic information.

A storage determining part 58 as part of first accumulation means is implemented via the geographic information display program to determine whether to store the newest azimuth measurement data in the mode A.

A first azimuth measurement data storing part 60 as part of the first accumulation means is also implemented via the geographic information display program to store azimuth measurement data, determined by the storage determining part 58 to be accumulated in the mode A, into the predetermined area of the RAM 220 until the number of stored pieces of azimuth measurement data reaches the predetermined number.

A second azimuth measurement data storing part 62 as second accumulation means is also implemented via the geographic information display program to store azimuth measurement data for each segment in the compass space into each area of the RAM 220. In other words, it updates the azimuth measurement data on a segment basis so that the newest pieces of azimuth measurement data will be stored one by one on a segment basis. Note that, as mentioned above, the number of azimuth measurement data stored in each area may be two or more.

An azimuth offset calculating part 56 is implemented via the geographic information display program to calculate azimuth offset data based on the accumulated pieces of azimuth measurement data. An example of a set of equations for calculating azimuth offset data is shown below. Note here that any other set of equations can be used to calculate azimuth offset data. For example, if azimuth offset data is calculated based on azimuth measurement data from a two-axis compass sensor, the equations can be modified according to the two-dimensional azimuth measurement data.

$$A_x^2(x - XOs)^2 + A_y^2(y - YOs)^2 + (z - ZOs)^2 = Rs^2 \quad \text{[Equation 1]}$$

$$\varepsilon = \sum \{A_x^2(x_i - XOs)^2 + A_y^2(y_i - YOs)^2 + (z_i - ZOs)^2 - Rs^2\}^2$$
$$= \sum \{z_i^2 + A_x^2 x_i^2 + A_y^2 y_i^2 - 2A_x^2 x_i XOs - 2A_y^2 y_i YOs - 2z_i ZOs + (A_x^2 XOs^2 + A_y^2 YOs^2 + ZOs^2) - Rs^2\}^2$$

$$\begin{aligned} a_i &= z_i^2 \\ b_i &= x_i^2 \\ c_i &= y_i^2 \\ d_i &= -2x_i \\ e_i &= -2y_i \\ f_i &= -2z_i \end{aligned} \quad \text{[Equation 2]}$$

$$\left.\begin{aligned} B &= A_x^2 \\ C &= A_y^2 \\ D &= A_x^2 XOs \\ E &= A_y^2 YOs, \; F = ZOs \\ G &= (A_x^2 XOs^2 + A_y^2 YOs^2 + ZOs^2) - Rs^2 \end{aligned}\right\} \quad (1)$$

$$\varepsilon = \sum (a_i + b_i B + c_i C + d_i D + e_i E + f_i F + G)^2$$

$$\begin{cases} \dfrac{\partial \varepsilon}{\partial B} = 2\sum (a_i + b_i B + c_i C + d_i D + e_i E + f_i F + G)b_i = 0 \\ \dfrac{\partial \varepsilon}{\partial C} = 2\sum (a_i + b_i B + c_i C + d_i D + e_i E + f_i F + G)c_i = 0 \\ \dfrac{\partial \varepsilon}{\partial D} = 2\sum (a_i + b_i B + c_i C + d_i D + e_i E + f_i F + G)d_i = 0 \\ \dfrac{\partial \varepsilon}{\partial E} = 2\sum (a_i + b_i B + c_i C + d_i D + e_i E + f_i F + G)e_i = 0 \\ \dfrac{\partial \varepsilon}{\partial F} = 2\sum (a_i + b_i B + c_i C + d_i D + e_i E + f_i F + G)f_i = 0 \\ \dfrac{\partial \varepsilon}{\partial G} = 2\sum (a_i + b_i B + c_i C + d_i D + e_i E + f_i F + G) = 0 \end{cases}$$

$$\begin{bmatrix} [bb] & [bc] & [bd] & [be] & [bf] & [b] \\ [bc] & [cc] & [cd] & [ce] & [cf] & [c] \\ [bd] & [cd] & [dd] & [de] & [df] & [d] \\ [be] & [ce] & [de] & [ee] & [ef] & [e] \\ [bf] & [cf] & [df] & [ef] & [ff] & [f] \\ [b] & [c] & [d] & [e] & [f] & N \end{bmatrix} \begin{bmatrix} B \\ C \\ D \\ E \\ F \\ G \end{bmatrix} = \begin{bmatrix} -[ab] \\ -[ac] \\ -[ad] \\ -[ae] \\ -[af] \\ -[a] \end{bmatrix}$$

Here, $$[m] = \sum_{i=1}^{N} m_i, \quad \text{[Equation 3]}$$

$$[mn] = \sum_{i=1}^{N} m_i n_i$$

Note that:

the position of measurement data in the compass space is $(x_i, y_i, z_i)$, where $i = 1, \ldots, N$, the position of azimuth offset data in the compass space is $(XOs, YOs, ZOs)$, the radius of the compass sphere is $Rs$, the sensitive ratio of the z-axis magnetic sensor 338 to the x-axis magnetic sensor 334 is $Ax$, and the sensitive ratio of the z-axis magnetic sensor 338 to the y-axis magnetic sensor 336 is $Ay$.

By solving the above-mentioned simultaneous equations, B, C, D, E, F, and G are determined. Further, Ax, Ay, XO, YO, and Rs are determined from (1).

An azimuth offset storing part 54 as azimuth offset updating means is implemented via the geographic information display program to verify the azimuth offset data. Then, when the azimuth offset data calculated by the azimuth offset calculating part 56 meets the acceptability criteria, it is written over the azimuth offset data stored in a predetermined area of the RAM 220.

A tilt measuring part 64 includes the attitude sensor module 340 and the compass sensor module 318; it outputs three-dimensional tilt measurement data corresponding to respective output values of the x-axis tilt sensor 342, the y-axis tilt sensor 344, and z-axis tilt sensor 346. The tilt measurement data represents the magnitude and direction of gravity.

A tilt measurement data storing part 42 is implemented via the geographic information display program to store tilt measurement data for each segment of a gravity sphere into each area of the RAM 220. In other words, it updates the tilt measurement data on an area basis so that the newest pieces of tilt measurement data will be stored one by one on an area basis. Note that the number of pieces of tilt measurement data stored in each area may be two or more. The gravity sphere is a sphere defined in a vector space represented by three-dimensional tilt measurement data corresponding to the respective output values of the x-axis tilt sensor 342, the y-axis tilt sensor 344, and z-axis tilt sensor 346. The center of the gravity sphere corresponds to the offset of the attitude sensor module 340. The gravity sphere used for setting the segments is defined based on the newest offset and sensitivity.

A tilt offset/sensitivity calculating part 44 is implemented via the geographic information display program to calculate, based on the tilt measurement data, the tilt offsets and sensitivities of the x-axis tilt sensor 342, the y-axis tilt sensor 344, and the z-axis tilt sensor 346, respectively. A tilt offset/sensitivity storing part 46 is implemented via the geographic information display program to verify the tilt offsets and sensitivities. Then, when the tilt offsets and sensitivities meet the acceptability criteria, the tilt offsets and sensitivities of the x-axis tilt sensor 342, the y-axis tilt sensor 344, and the z-axis tilt sensor 346 calculated by the tilt offset/sensitivity calculating part 44 are stored in predetermined areas of the RAM 220.

The above-mentioned storage determining part 58, first azimuth measurement data storing part 60, second azimuth measurement data storing part 62, azimuth offset calculating part 56, azimuth calculating part 48, azimuth data storing part 50, azimuth display part 52, tilt measurement data storing part 42, tilt offset/sensitivity calculating part 44, and tilt offset/sensitivity storing part 46 could also be implemented by logical circuits the functions of which are identified by hardware alone without execution of any computer program.

Figure 15:
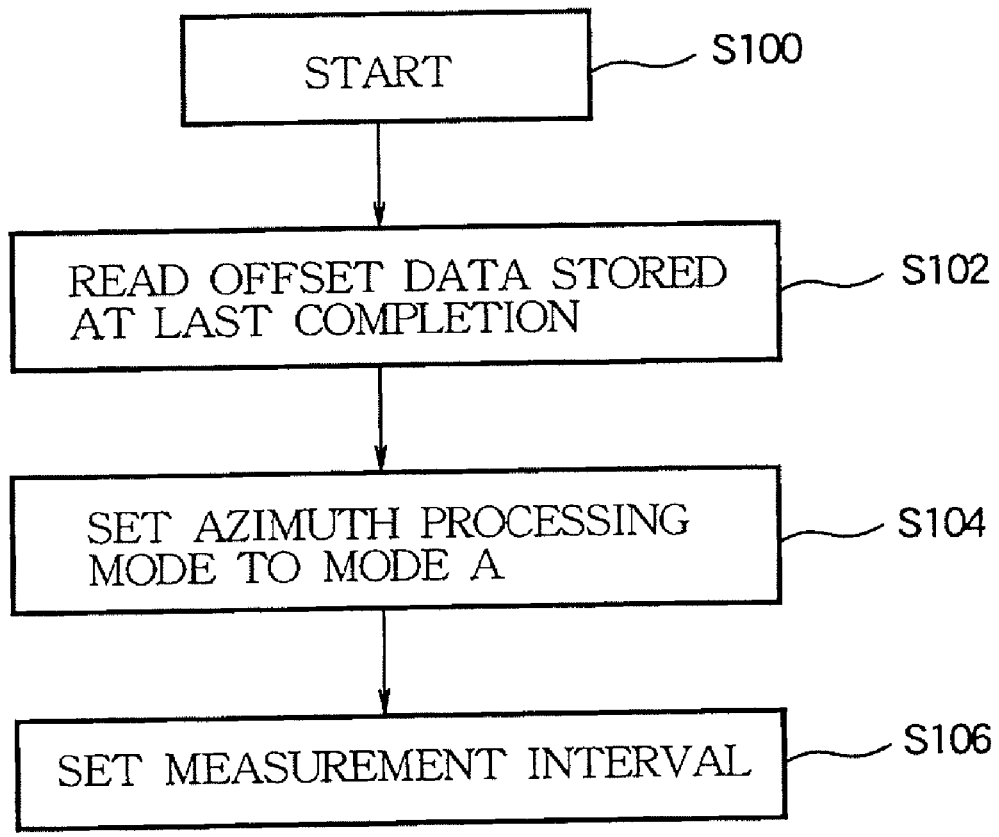
FIG. 15 is a flowchart showing the azimuth processing method according to the first embodiment of the present invention.

FIGS. 15 and 1 are flowcharts showing a specific azimuth processing method performed by the controller 40 using the above-mentioned algorithm.

When the main operating part 224 accepts a user request to display geographic information, the controller 40 runs the geographic information display program to start the following azimuth offset updating processing (S100). After the start of the geographic information display program, the azimuth offset updating processing is repeatedly performed until the user exits from the geographic information display program.

At first, the controller 40 reads from a nonvolatile memory the last azimuth offset data stored in the predetermined area of the RAM 220 by the azimuth offset storing part 54 just before the completion of the last execution of the geographic information display program (S102). The azimuth calculating part 48 calculates azimuth data using the azimuth offset data stored at this stage until the azimuth offset data is updated in the mode A.

In step S104, the controller 40 sets the mode A for azimuth processing. In other words, the controller 40 calculates azimuth offset data in the mode A just after accepting a geographic information display request from the user.

In step S106, the controller 40 sets an interval to read azimuth measurement data. Specifically, it sets a timer.

Upon completion of the above-mentioned initialization procedure, the controller 40 repeatedly performs processing shown in FIG. 1 (starting at step S200) at time intervals set in step S106.

In step S202, the azimuth calculating part 48 and the storage determining part 58 or the second azimuth measurement data storing part 62 acquire azimuth measurement data output from the azimuth measuring part 66. As a result, the azimuth calculating part 48 and the storage determining part 58 or the second azimuth measurement data storing part 62 acquire the substantially newest azimuth measurement data every timer interval set for the timer. The storage determining part 58 acquires it in the mode A, while the second azimuth measurement data storing part 62 acquires it in the mode B.

In step S204, the azimuth calculating part 48 calculates azimuth data based on the azimuth measurement data, the azimuth offset data, the tilt measurement data, the tilt offset data, and the tilt sensitivity data.

In step S206, the controller 40 determines the current mode.

(Mode A)

When the controller 40 determines in step S206 that the current azimuth processing mode is the mode A, the storage determining part 58 determines whether to store the azimuth measurement data acquired in step S202 (S208). The storage determining part 58 determines that the newest azimuth measurement data should be stored, as mentioned above, only when the distance defined in the given coordinate system between the position of the last stored azimuth measurement data and the position of the newest azimuth measurement data output from the azimuth measuring part 66 is a predetermined value or more.

In step S210, the first azimuth measurement data storing part 58 stores the newest azimuth measurement data to be accumulated in an array A allocated in the RAM 220.

In step S212, the azimuth offset calculating part 56 determines whether to calculate azimuth offset data based on the accumulated azimuth measurement data. As mentioned above, the azimuth offset calculating part 56 counts the number of pieces of azimuth measurement data accumulated in the array A, and determines that azimuth offset data should be calculated when the number of pieces is a predetermined number (e.g., 25) or more.

In step S214, the azimuth offset calculating part 56 calculates azimuth offset data based on the azimuth measurement data accumulated in the array A. The above-mentioned equations are used for this calculation.

In step S216, the azimuth offset storing part 54 verifies the azimuth offset data calculated in step S214 by checking if it meets the acceptability criteria 1 and 2. If it meets the acceptability criteria 1 and 2, the azimuth offset storing part 54 stores the azimuth offset data in a predetermined area of the RAM 220, and updates the azimuth offset data (steps 5218 and S220).

In step S222, the controller 40 sets the mode B for the azimuth offset updating process.

In step S224, the second azimuth measurement data storing part 62 moves the azimuth measurement data accumulated in the array A in the mode A to an array B for storing azimuth measurement data in the mode B. Each of array elements in the array B is set for each of the segments of the compass sphere mentioned above. Therefore, in step S224, each array element in the array B is identified as being corresponding to each azimuth measurement data based on the position of the azimuth measurement data accumulated in the array A so that each azimuth measurement data will be stored in each corresponding array element of the array B. If two or more pieces of azimuth measurement data are stored in the array A corresponding to a specific array element of the array B, either of the pieces will be stored in the array B.

When it is determined in step S218 that the azimuth offset data is rejected because it does not meet the acceptability criteria, the first azimuth measurement data storing part 60 determines whether a predetermined number (e.g., 30) of pieces of azimuth measurement data are stored in the array A in which the azimuth measurement data used for calculating the azimuth offset data are stored (step S226). If the predetermined number of pieces of azimuth measurement data are stored in the array A, a predetermined number (e.g., the oldest one) of pieces of azimuth measurement data are deleted in order of occurrence. Note that when it is determined that the azimuth offset data is rejected, the first azimuth measurement data storing part 60 may delete all the pieces of azimuth measurement data in the array A.

(Mode B)

When it is determined in step S206 that the azimuth offset updating processing mode is the mode B, the controller 40 determines whether the azimuth offset has changed to a large degree (step S230). Specifically, the controller 40 determines that the azimuth offset has changed to a large degree when the distance (D) from the center of the compass sphere corresponding to the azimuth offset data to the position of the newest azimuth measurement data is considerably larger than the radius (Rs) of the compass sphere corresponding to the azimuth offset data.

When the azimuth offset has changed to a large degree, the controller 40 sets the mode A for the azimuth offset updating processing (S244), and deletes all the pieces of azimuth measurement data accumulated in the array A and the array B (S246).

On the other hand, when the azimuth offset has not changed so much, the second azimuth measurement data storing part 62 accumulates newest pieces of azimuth measurement data in the array B of which each array element is set for each of the above-mentioned segments of the compass sphere. At the time when new azimuth measurement data is to be stored in a particular array element, if old azimuth measurement data has been already stored in the particular array element, the second azimuth measurement data storing part 62 replaces the old azimuth measurement data by the new azimuth measurement data.

In step S234, the azimuth offset calculating part 56 determines whether it is necessary to calculate azimuth offset data. Specifically, when the array elements to store new azimuth measurement data in step S232 are empty, the azimuth offset calculating part 56 determines that the azimuth offset data should be calculated. When the array elements to store azimuth measurement data hold no azimuth measurement data, if the newest azimuth measurement data is added to recalculate the azimuth offset data, the azimuth offset data will be calculated based on the data larger in number and wider in distribution than those used in the last calculation, thereby allowing for improvement in accuracy of azimuth offset data.

In addition, even when determining that no new azimuth data should be stored in step S232, if a predetermined number of times (e.g., 100 times) the array B has been continuously updated, the azimuth offset calculating part 56 determines that azimuth offset data should be recalculated.

In step S236, the azimuth offset calculating part 56 calculates azimuth offset data based on azimuth measurement data stored in the array B. Equations used for this calculation are the same as the above-mentioned equations for the mode A.

In step S238, the azimuth offset storing part 54 verifies the azimuth offset data calculated in step S236. The verification is performed by the same method as in step S216 for the mode A.

When determining that the azimuth offset data passes the acceptability criteria, the azimuth offset storing part 54 stores the azimuth offset data in the predetermined area of the RAM 220, and updates the azimuth offset data (steps S240 and S242).

On the other hand, when the azimuth offset storing part 54 determines that the azimuth offset data fails the acceptability criteria, the controller 40 sets the mode A for the azimuth processing mode (step S244), and deletes all the pieces of azimuth measurement data in the array A and the array B (step S246).

Figure 16:
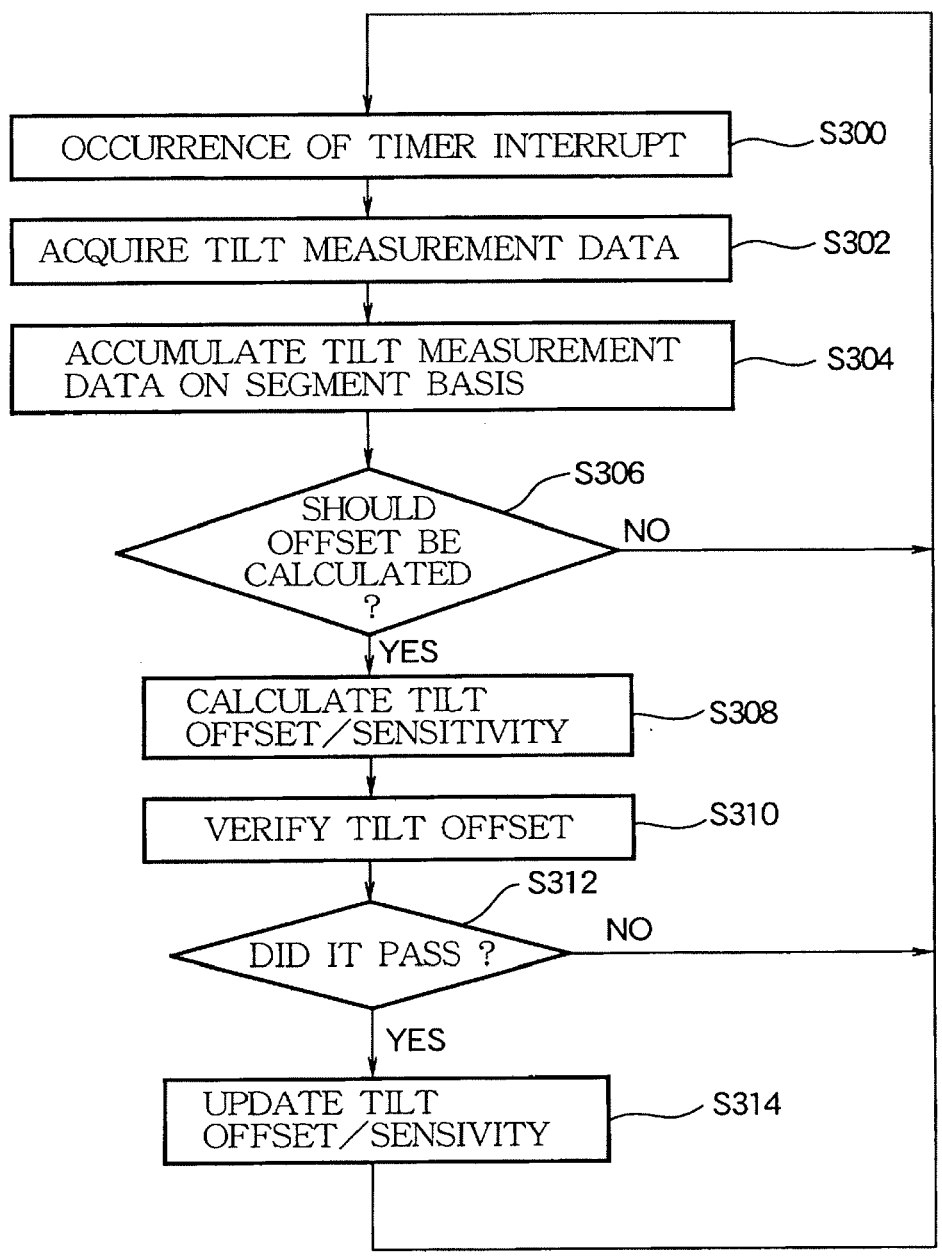
FIG. 16 is a flowchart according to the first embodiment of the present invention.

FIG. 16 is a flowchart showing a tilt processing method by the controller 40. A sequence of operations shown in FIG. 16 is performed repeatedly at set time intervals.

When an interrupt occurs at time intervals set in step S106 (S300), the tilt measurement data storing part 42 reads in step S302 the newest tilt measurement data from the tilt measuring part 64.

In step S304, the tilt measurement data storing part 42 accumulates tilt measurement data in an array, of which the array elements are set for respective segments, in the same manner as in the processing for accumulating azimuth measurement data in the mode B for each segment of the compass sphere.

In step S306, the tilt offset/sensitivity calculating part 44 determines whether to calculate tilt offset data and tilt sensitivity data based on the accumulated tilt measurement data. Criteria are the same as the recalculation criteria in the mode B. In other words, when new tilt measurement data is read into an empty segment, the tilt offset/sensitivity calculating part 44 determines that recalculation is needed. Also, when updating of the array continues for a predetermined number of times (e.g., 100 times), the tilt offset/sensitivity calculating part 44 determines that recalculation is needed. The updating of the array means that new measurement data is read into an array element which has been already written with the measurement data.

In step S308, the tilt offset/sensitivity calculating part 44 calculates tilt offset data and tilt sensitivity data representing the sensitivity of the attitude sensor module 340 in the same manner as the azimuth offset calculating method mentioned above in the azimuth processing.

In step S310, the tilt offset/sensitivity storing part 46 verifies the tilt offset data and the tilt sensitivity data calculated in step S308 by a method according to the method of step S216 in the mode A.

When determining that the tilt offset data and the tilt sensitivity data pass the criteria, the tilt offset/sensitivity storing part 46 stores those data in predetermined areas of the RAM 220, and updates those data (steps S312 and S314). After that, when calculating azimuth data (see step S204), the azimuth calculating part 48 calculates it based on the updated tilt offset data and tilt sensitivity data.

According to the above-mentioned first embodiment, since the azimuth offset data is continuously updated based on the newest azimuth measurement data during the execution of the geographic information display program, accurate geographic information can be displayed based on accurate azimuth data.

Also, according to the first embodiment, azimuth measurement data upon which the azimuth offset data is calculated are accumulated selectively to secure accurate azimuth offset data, so that azimuth measurement data necessary to calculate accurate azimuth offset data can be accumulated efficiently regardless of how the user handles the telephone 1. Further, since the azimuth measurement data continue to be accumulated selectively while the controller 40 executes the geographic information display program, the user can accumulate the azimuth measurement data without much concern for procedures necessary to accumulate them. Thus, the first embodiment of the present invention makes it easy to handle the compass sensor module 318.

In the first embodiment, the azimuth processing method using the three-axis compass sensor module 318 and the three-axis attitude sensor module 340 is described, but the azimuth data may be calculated using a two-axis compass sensor module, or using the compass sensor module alone without the attitude sensor module. Further, the azimuth data may be calculated by fixing the offset value of the attitude sensor module. Furthermore, the telephone 1 may be formed by integrating the display unit 3 with the operation unit 2. In addition, the compass sensor module 318 may be incorporated in the operation unit 2.

Second Embodiment

The following describes a second embodiment. In the second embodiment, the controller 40 starts accumulation of azimuth measurement data necessary to calculate azimuth data in synchronization with the user's action to swing up the display unit 3 from the operation unit 2, that is, to open the display unit 3. In the first embodiment, the controller 40 starts accumulation of azimuth measurement data upon starting of the geographic information display program to update azimuth offset data and azimuth data in parallel. On the other hand, in the second embodiment, it starts accumulation of azimuth measurement data when the opening/closing sensor 309 detects the start of opening of the display unit 3.

Figure 17:
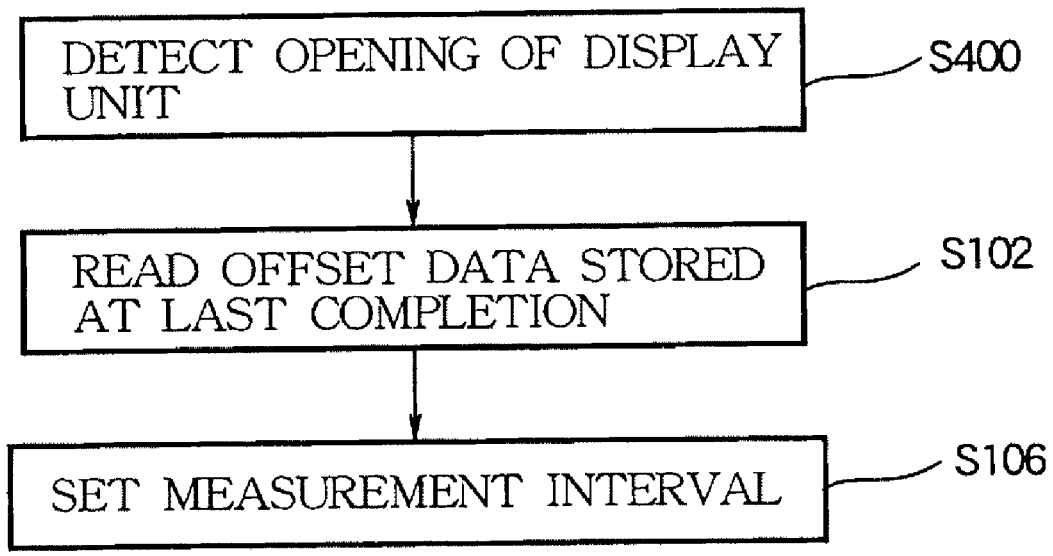
FIG. 17 is a flowchart showing an azimuth processing method according to a second embodiment of the present invention.
Figure 18:
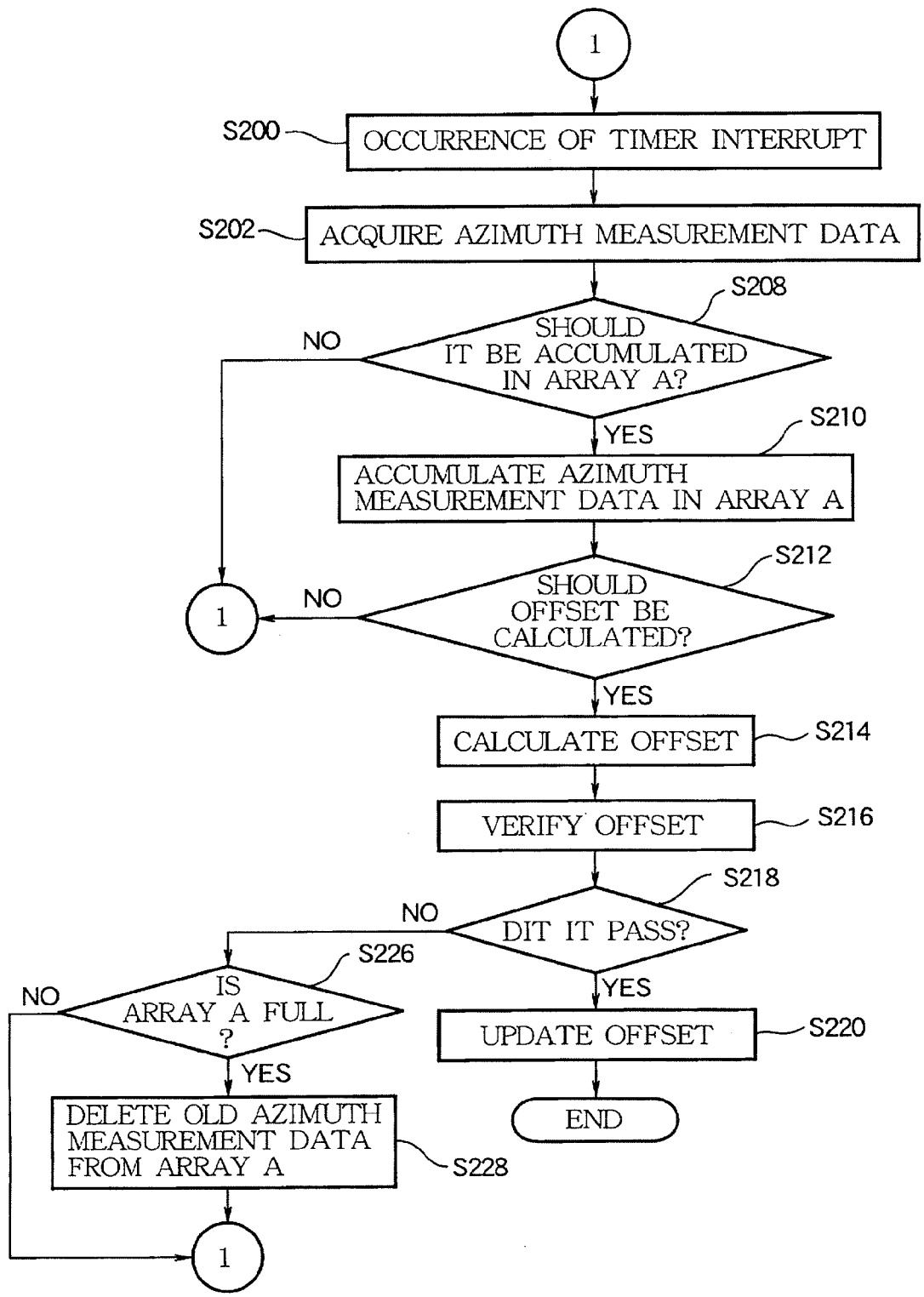
FIG. 18 is a flowchart showing the azimuth processing method according to the second embodiment of the present invention.

FIGS. 17 and 18 are flowcharts showing an azimuth processing method according to the second embodiment of the present invention. Substantially the same processing steps as those in the first embodiment are given the same numerals, and the description thereof is omitted.

When the opening/closing sensor 309 detects the start of opening of the display unit 3, an interrupt occurs to let the controller 40 start the azimuth offset updating processing (step S400).

Then, when accumulating the predetermined number of azimuth measurement data in the mode A azimuth processing described in the first embodiment, the controller 40 calculates azimuth offset data based on the accumulated azimuth measurement data to update the azimuth offset data (step S220). After that, the azimuth processing is ended. The azimuth processing is performed just after the user starts opening the display unit 3 until the geographic information display program is started. Therefore, the controller 40 does not perform the azimuth data calculating processing (see S204 in the first embodiment).

The controller 40 may perform the azimuth offset data updating processing in the mode B following that in the mode A, or only the azimuth offset data updating processing in the mode B. When the azimuth offset data updating processing is performed in the mode B, azimuth measurement data may be stored in all the array elements of the array B so that the azimuth offset data updating processing will be ended when the azimuth offset data is updated based on those azimuth measurement data.

The controller 40 may also accumulate all pieces of azimuth measurement data output from the azimuth measuring part 66 in a predetermined period of time so that azimuth offset data will be calculated based on the accumulated azimuth measurement data. In other words, the controller 40 may calculate azimuth offset data based on a completely different algorithm from that in the first embodiment.

Further, the controller 40 may perform the azimuth offset data updating processing in the mode A and the mode B as described in the first embodiment, or in the mode B alone during the execution of the geographic information display program, or may not perform the azimuth offset data updating processing during the execution of the geographic information display program.

After opening the display unit 3, the user is likely to move the telephone 1 to a large degree, such as to bring the voice speaker 300 to his or her ear or closing the display unit 3 again. In such an action, the telephone 1 changes its attitude or position in a complicated manner. Further, since the compass sensor module 318 incorporated in the display unit 3 changes its attitude or position with closing of the display unit 3, the change in its attitude becomes more complicated. Note here that the compass sensor module 318 may be incorporated in the operation unit 2.

According to the second embodiment of the present invention, since the controller 40 starts accumulation of azimuth measurement data with the start of opening the display unit 3, azimuth measurement data distributed widely in the compass space can be accumulated in a short time. It allows the controller 40 to accumulate azimuth measurement data necessary to update the azimuth offset data accurately in a short time. Further, since the controller 40 starts accumulation of azimuth measurement data with the start of opening the display unit 3, the user can accumulate the azimuth measurement data without much concern for procedures necessary to accumulate them. Thus, the second embodiment of the present invention makes it easy to handle the compass sensor module 318.

Third Embodiment

After closing the display unit 3, the user is likely to put the telephone 1 in a pocket, on a desk, or in a bag. In such an action, the telephone 1 changes its attitude or position in a complicated manner. Further, since the compass sensor module 318 incorporated in the display unit 3 changes its attitude or position with closing of the display unit 3, the change in its attitude becomes more complicated.

Therefore, the controller 40 may start accumulation of azimuth measurement data necessary to calculate azimuth data in conjunction with the movement of the display unit 3 closer to the operation unit 2, that is, closing of the display unit 3. In other words, it may perform processing for detecting the start of closing of the display unit 3 instead of the processing step S400 in the second embodiment.

Fourth Embodiment

Figure 19:
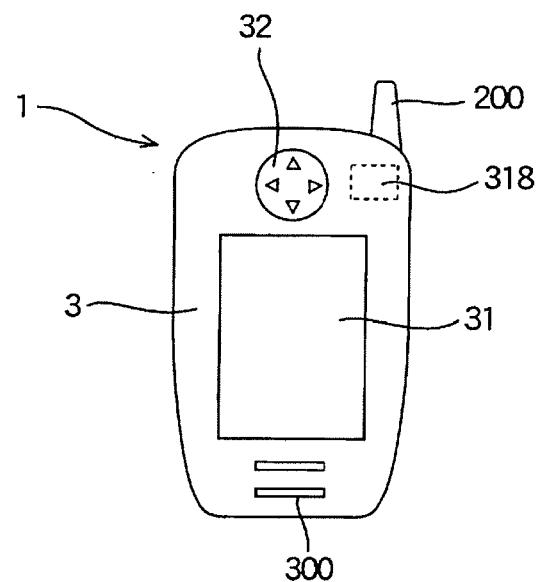
FIG. 19 is a plan view showing the appearance of a telephone set according to a fourth embodiment of the present invention.
Figure 20:
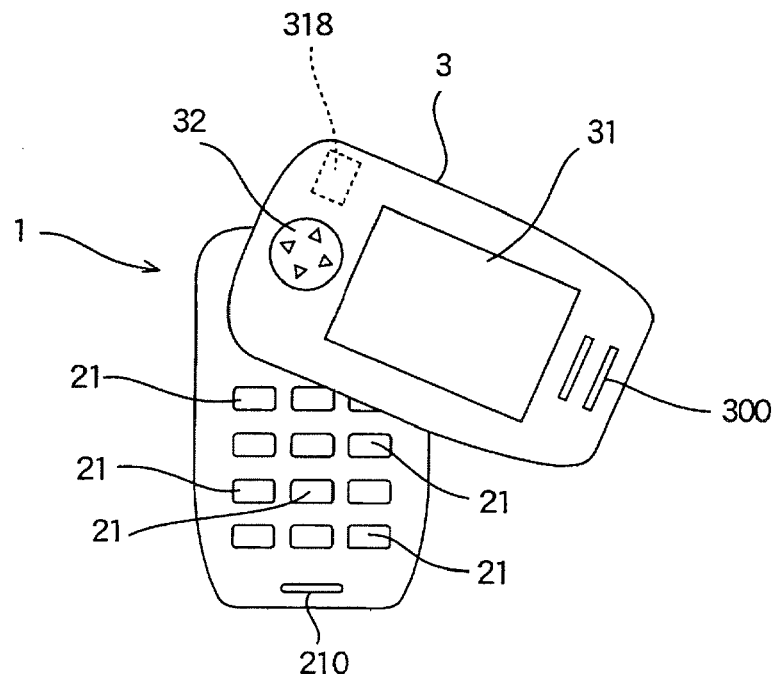
FIG. 20 is a plan view showing the appearance of the telephone set according to the fourth embodiment of the present invention.
Figure 21:
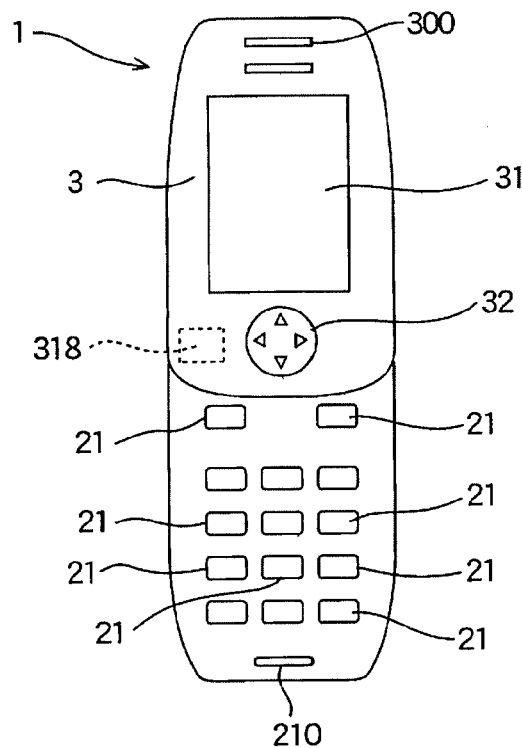
FIG. 21 is a plan view showing the appearance of the telephone set according to the fourth embodiment of the present invention.

FIGS. 19, 20, and 21 are plan views showing the appearance of the telephone 1 according to a fourth embodiment of the present invention. The hardware structure except its exterior package is the same as that in the first embodiment, and the description thereof is omitted.

In the telephone 1 of the fourth embodiment, the display unit 3 is coupled to the operation unit 2 swingably about an axis almost perpendicular to the screen 31. The angular swinging range of the display unit 3 is 180 degrees. The compass sensor module 318 incorporated in the display unit 3 swings together with the display unit 3 with respect to the operation unit 2 in the range of 180 degrees.

Figure 22:
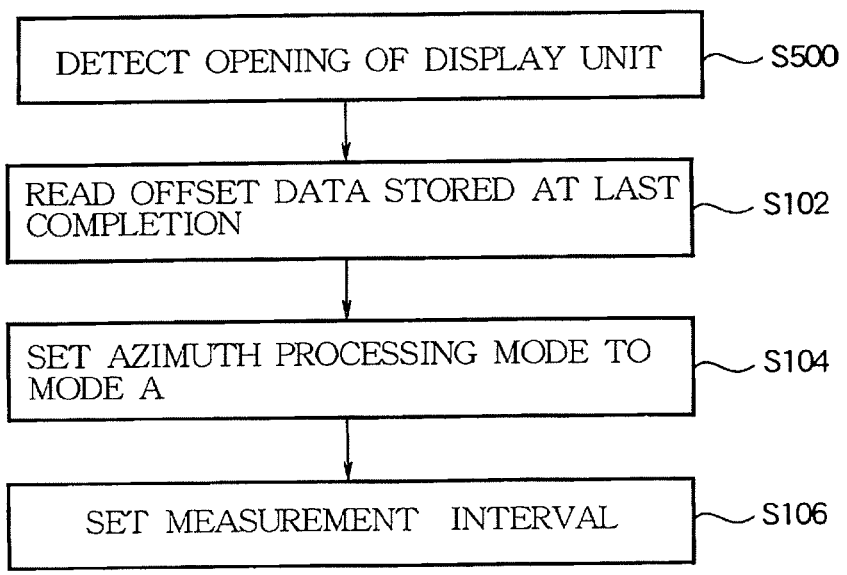
FIG. 22 is a flowchart showing an azimuth processing method according to the fourth embodiment of the present invention.
Figure 23:
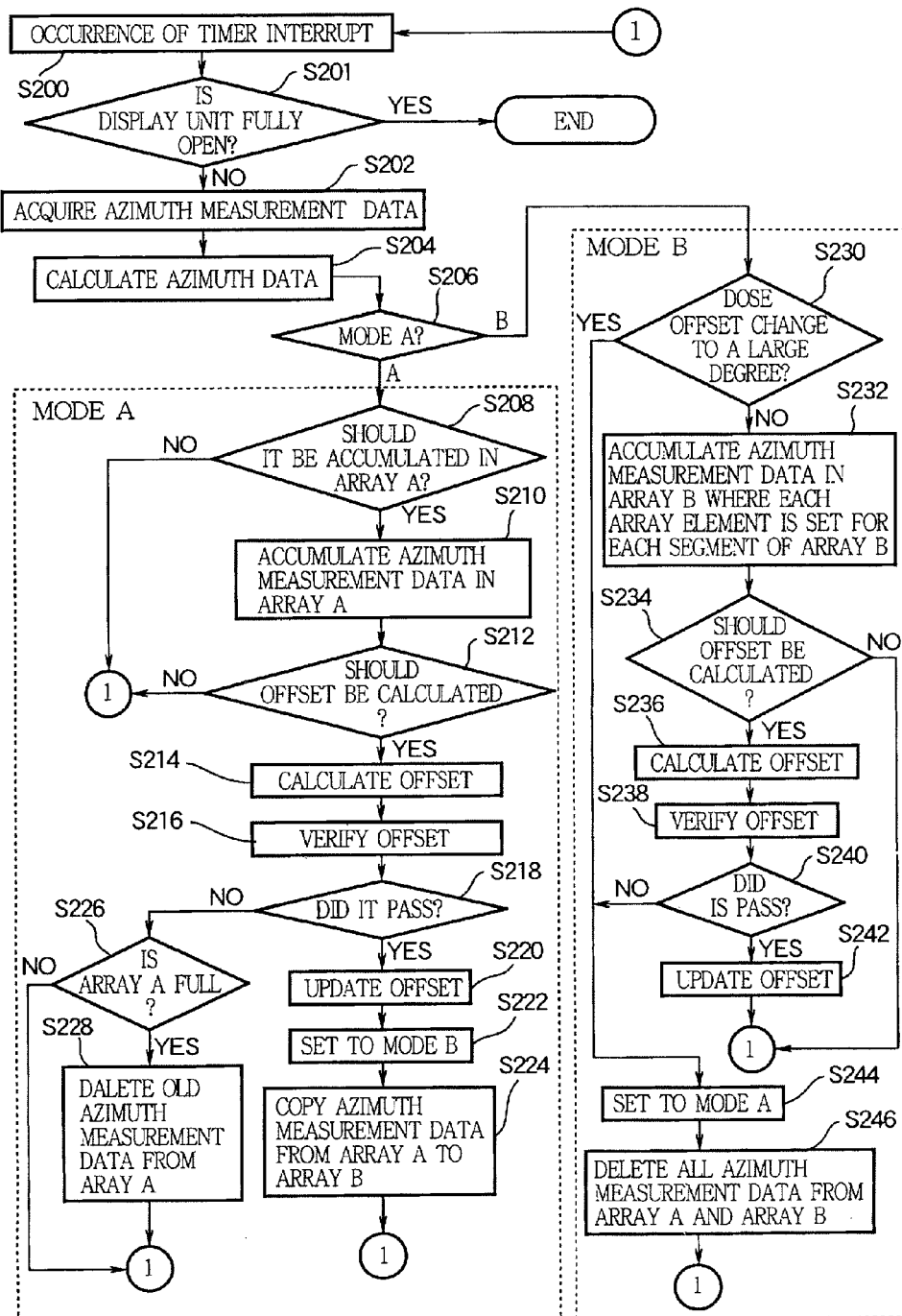
FIG. 23 is a flowchart showing the azimuth processing method according to the fourth embodiment of the present invention.

FIGS. 22 and 23 are flowcharts showing an azimuth processing method according to the fourth embodiment of the present invention. Substantially the same processing steps as those in the first embodiment are given the same numerals, and the description thereof is omitted.

When the opening/closing sensor 309 detects the start of opening of the display unit 3, the controller 40 starts the azimuth offset updating processing (step S500). Opening of the display unit 3 means a transition from such a state that the display unit 3 is folded over the operation unit 2 to such a state that they stand apart from each other.

Then, when the opening/closing sensor 309 detects that the display unit 3 swings up to the fully open state, the controller 40 ends the azimuth offset updating processing (step S201).

The controller 40 may accumulate azimuth measurement data during closing of the display unit 3 so that azimuth offset data will be calculated based on the accumulated azimuth measurement data.

The controller 40 may also accumulate all pieces of azimuth measurement data output from the azimuth measuring part 66 during opening and closing of the display unit 3 so that azimuth offset data will be calculated based on the accumulated azimuth measurement data. In other words, the controller 40 may calculate azimuth offset data based on a completely different algorithm from that in the first embodiment.

According to the above-mentioned fourth embodiment of the present invention, the azimuth offset data updating processing is performed during opening or closing of the display unit 3, and is ended upon completion of the opening or closing of the display unit 3, thereby allowing a reduction in power consumption. Further, the compass sensor module 318 rotates 180 degrees together with the display unit 3 during the opening or closing of the display unit 3. Thus, according to the fourth embodiment of the present invention, azimuth measurement data necessary to update the azimuth offset data accurately can be accumulated reliably.

Fifth Embodiment

The above-mentioned second, third, and fourth embodiments describe how the controller 40 accumulates azimuth measurement data in a period of time during which the display unit 3 changes its attitude or position with respect to the operation unit 2. In general, when the relative position between the compass sensor module 318 and permanent magnets equipped in the voice speaker 300, the alarm speaker 310, and the like changes, azimuth measurement data from the compass sensor module 318 vary even if there is no change in geomagnetism. Therefore, it is desirable that, when the controller 40 accumulates azimuth measurement data for updating the azimuth offset in a period of time during which the display unit 3 changes its attitude or position with respect to the operation unit 2, the azimuth offset should be corrected in view of changes in relative position between the permanent magnets and the compass sensor module 318 in the telephone 1.

The position between the sources of leakage magnetic fields, such as permanent magnets equipped in the voice speaker 300, the alarm speaker 310, and the like, and the compass sensor module 318 in the fully open or closed state of the display unit 3 can be identified from its structural design. It depends on the coupling structure of the display unit 3 and the operation unit 2 how the display unit 3 opens.

Therefore, the trajectory of points indicating the positions of azimuth measurement data during opening the display unit 3 can be uniquely identified from the strength of magnetization by the sources of leakage magnetic fields, the attitude of the compass sensor module 318 when the display unit 3 is in the fully open or closed state, and the strength of geomagnetism. The attitude of the compass sensor module 318 in the fully open or closed state and the strength of geomagnetism can be identified if the azimuth offset is identified in the fully open or closed state. The strength of magnetization by the sources of leakage magnetic fields during opening the display unit 3 can be identified by data sampling. Therefore, the azimuth offset can be corrected in view of the relative position between the permanent magnets and the compass sensor module 318 in the telephone 1.

Sixth Embodiment

When an incoming call or e-mail is notified to the user by the sound generator part 312 producing a ring tone from the alarm speaker 310, the vibrator part 314 vibrating, or the light-emitting part 308 emitting light from corresponding one of the light sources 35, the user is likely to take up the telephone 1 from the bag, pocket, or desk, and moves it to a large degree, such as to bring it to his or her ear or to see the screen 31. In such an action, the telephone 1 changes its attitude or position in a complicated manner. Therefore, the controller 40 may start accumulation of azimuth measurement data necessary to update the azimuth offset data in response to the incoming call or e-mail. In other words, it may perform processing for detecting the arrival of a call or e-mail through the CDMA part 206 instead of the processing step S400 in the second embodiment.

In the case of updating the azimuth offset data in response to the arrival of a call or e-mail, the compass sensor module 318 may be incorporated in the operation unit 2. Further, the display unit 3 may be integrated with the operation unit 2. Furthermore, the azimuth offset data updating processing may be performed in the mode B following the mode A, or the mode B alone. When the azimuth offset data updating processing is performed in the mode B, azimuth measurement data may be stored in all the array elements of the array B so that the azimuth offset data updating processing will be ended when the azimuth offset data is updated based on those azimuth measurement data.

Seventh Embodiment

After originating a call or e-mail, the user is likely to move the telephone 1 to a large degree, such as to bring the microphone 210 to his or her mouth, and then put the telephone 1 back in a bag or pocket, or on a desk. In such an action, the telephone 1 changes its attitude or position in a complicated manner. Therefore, the controller 40 may start accumulation of azimuth measurement data necessary to update the azimuth offset data in response to the outgoing call or e-mail originated by the user. In other words, it may perform processing for detecting the origination of a call or e-mail accepted by the main operating part 224 or the auxiliary operating part 302 instead of the processing step S400 in the second embodiment.

In the case of updating the azimuth offset data in response to the origination of a call or e-mail, the compass sensor module 318 may be incorporated in the operation unit 2. Further, the display unit 3 may be integrated with the operation unit 2. Furthermore, the azimuth offset data updating processing may be performed in the mode B following the mode A, or the mode B alone. When the azimuth offset data updating processing is performed in the mode B, azimuth measurement data may be stored in all the array elements of the array B so that the azimuth offset data updating processing will be ended when the azimuth offset data is updated based on those azimuth measurement data.

Eighth Embodiment

Figure 24:
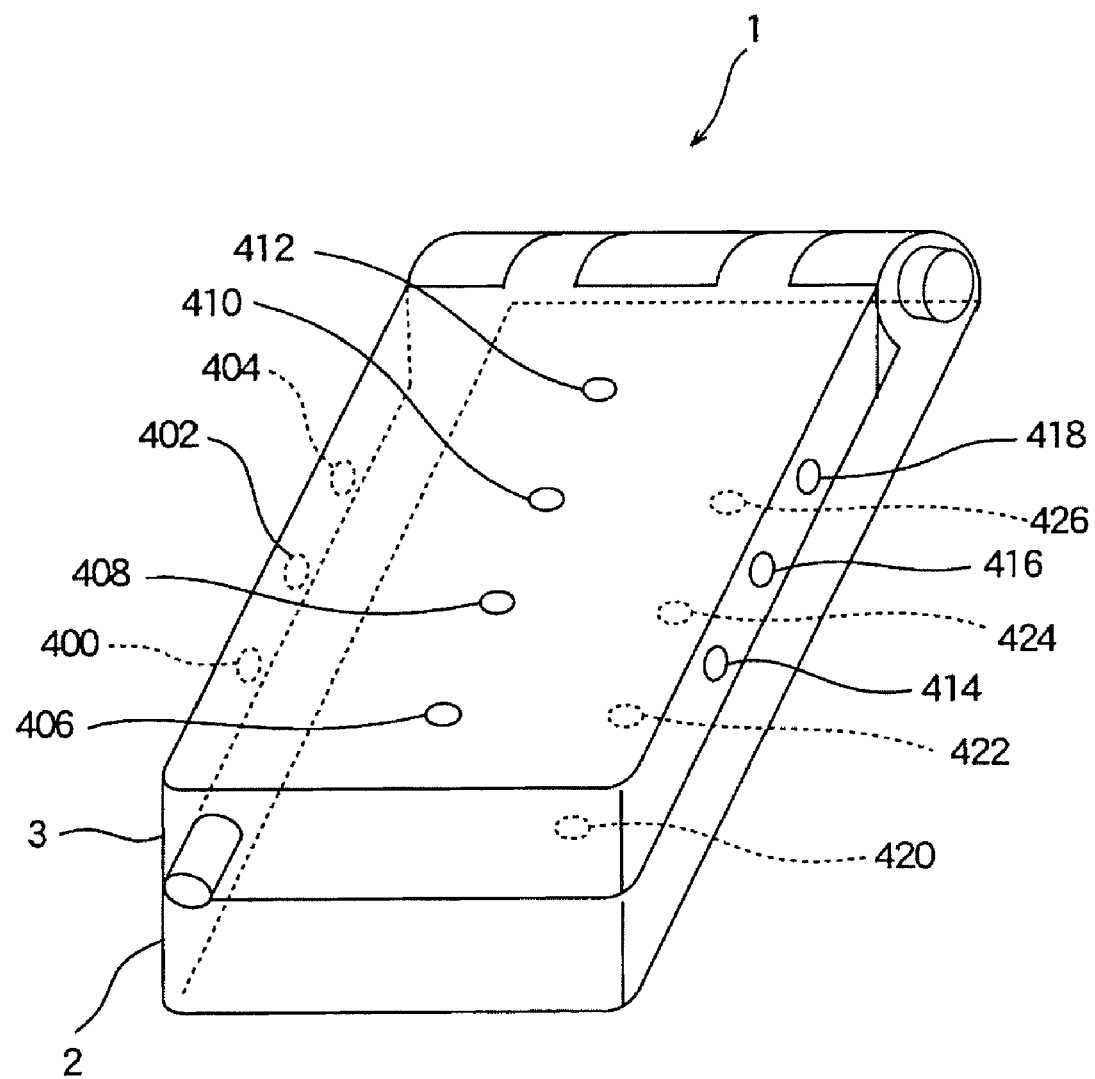
FIG. 24 is a perspective view showing the appearance of a telephone set, according to an eighth embodiment of the present invention.

FIG. 24 is a perspective view showing the appearance of the telephone 1 according to an eighth embodiment of the present invention. The hardware structure except its exterior package is the same as that in the first embodiment, and the description thereof is omitted. Light sources 400 to 426 are scattered throughout the exterior package of the telephone 1, and when any of them is turned on, the user's attention is drawn to the lighted point. The user is likely to bring the target in front of him or her to see it. In this regard, when the light sources 400 to 426 are scattered on two or more sides and the controller 40 selects any of the light sources 400 to 426 to be turned on with time so that the user's eyes will move along with the movement of lighted points, the user is likely to change the attitude of the telephone 1. Thus, azimuth measurement data necessary to update the azimuth offset data can be accumulated while the user is changing the attitude of the telephone 1 to a large degree, thereby calculating accurate azimuth offset data. In other words, the controller 40 performs the azimuth offset updating processing while appropriately selecting light sources to be turned on with time for the purpose of guiding the user's actions so that it can accumulate azimuth measurement data upon which accurate azimuth offset data is calculated. The following describes an azimuth offset updating method using this principle.

Figure 25:
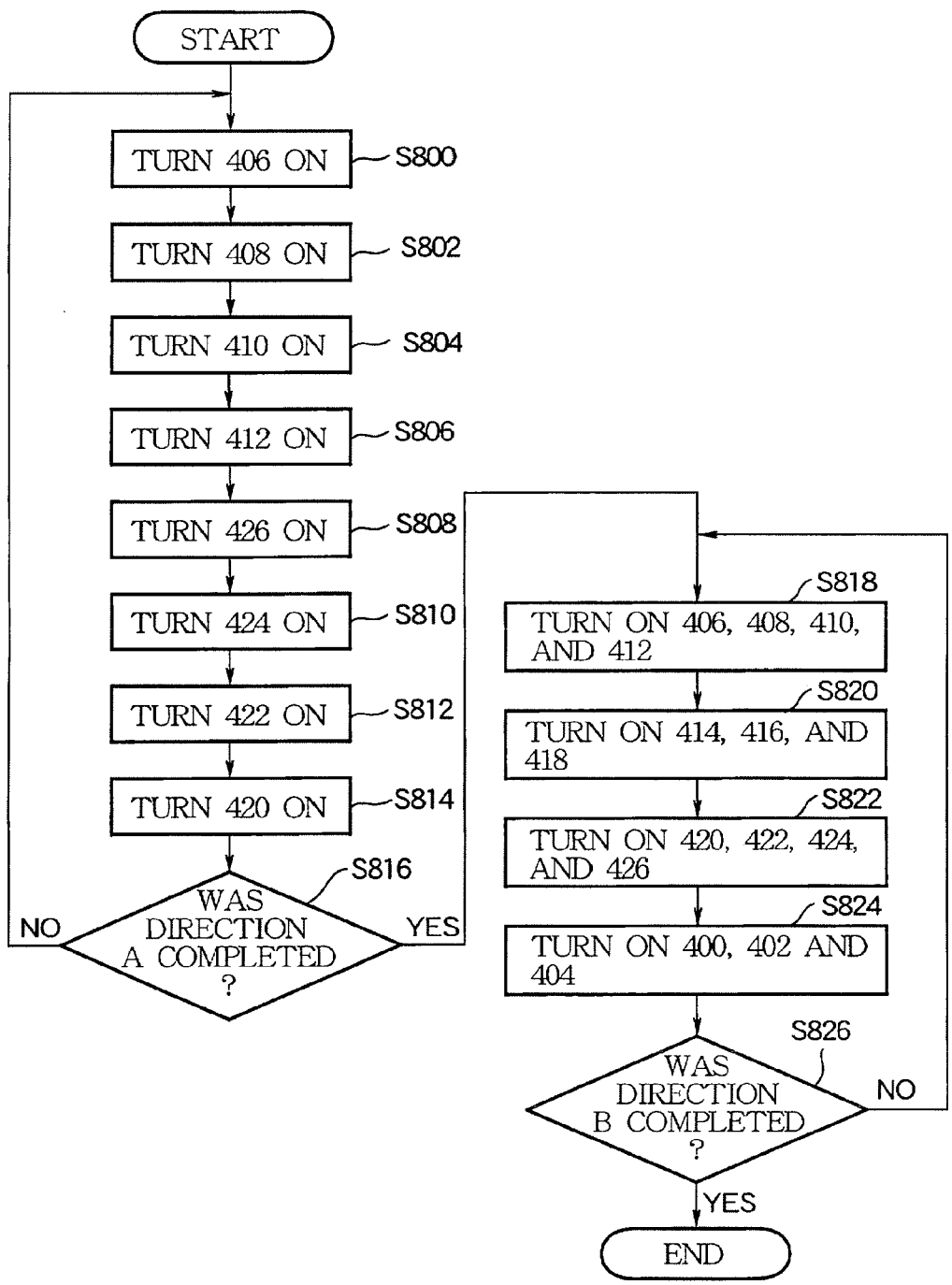
FIG. 25 is a flowchart showing an azimuth offset updating method according to the eighth embodiment of the present invention.

FIG. 25 is a flowchart for explaining an azimuth offset updating processing according to the eighth embodiment of the present invention. In this embodiment, the controller 40 as light-emitting control means performs guidance processing as shown in FIG. 25 in parallel with the above-mentioned azimuth offset data updating processing in the mode A and the mode B. It allows the controller 40 to update the azimuth offset data accurately and reliably.

The controller 40 may start the guidance processing whenever the telephone 1 is on standby. For example, the controller 40 may start the guidance processing just after recharging.

Figure 26:
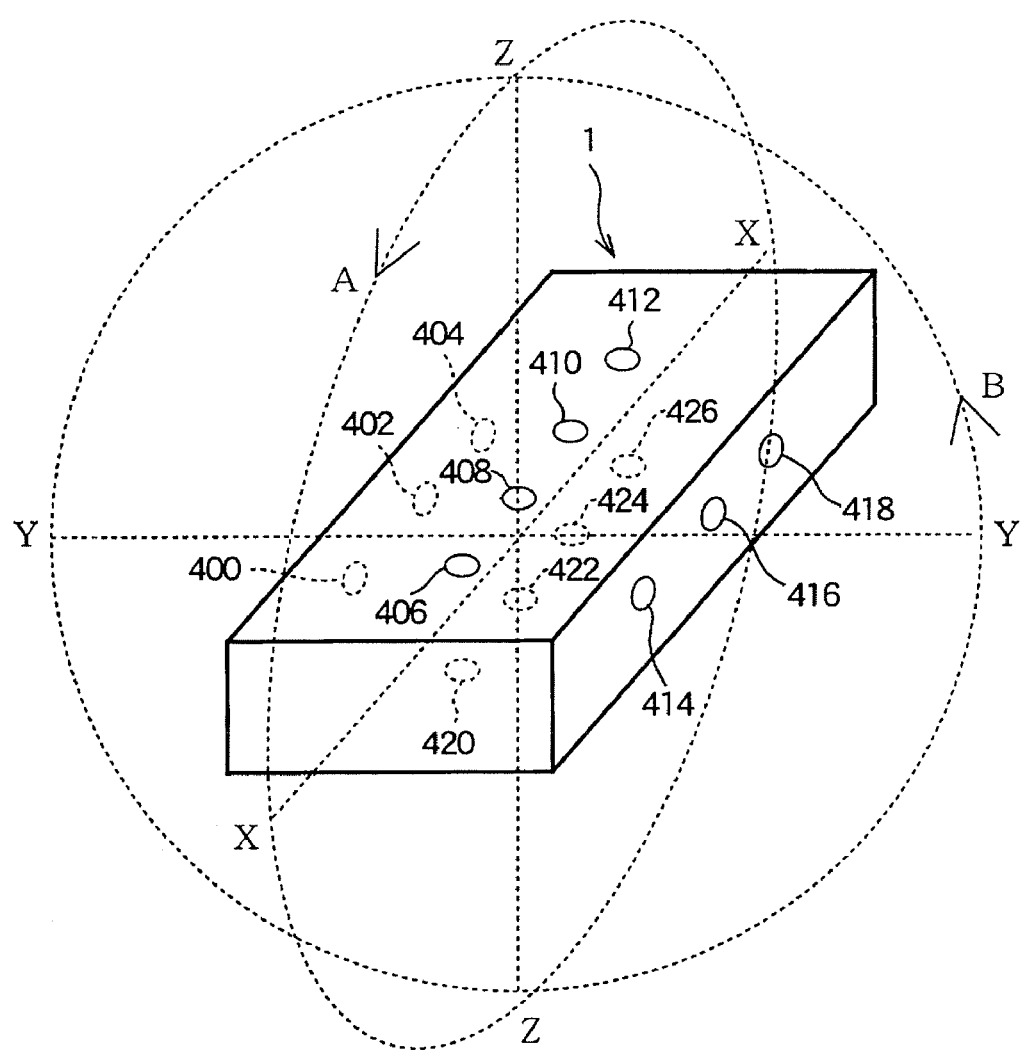
FIG. 26 is a schematic illustration according to the eighth embodiment of the present invention.

In steps S800 to step S814, the controller 40 guides the user to rotate the telephone 1 360 degrees in the direction of A in FIG. 26. In other words, the controller 40 first turns on the light sources 406, 408, 410, and 412, provided in a line on a first exterior package side, in this order at predetermined intervals. Next, it turns on the light sources 426, 424, 422, and 420 in this order at predetermined intervals, the light sources provided in a line on a second exterior package side corresponding to the backside of the first exterior package side. The order of turning on the light sources 406, 408, 410, 412, 426, 424, 422, and 420 corresponds to the order of arrangement on the exterior package.

In step S816, the controller 40 determines whether to end the processing for guiding the user to rotate the telephone 1 in the direction of A shown in FIG. 26. For example, a criterion for ending the guidance processing may be such that the number of repetitions from step S800 to S814 is a predetermined number or more, or it may be the range of distribution of the positions of azimuth measurement data or the positions of tilt measurement data.

In steps S818 to step S824, the controller 40 guides the user to rotate the telephone 1 360 degrees in the direction of B in FIG. 26. In other words, the controller 40 first turns on the light sources 406, 408, 410, and 412, provided on the first exterior package side, at the same time for a predetermined period of time. Next, it turns on the light sources 414, 416, and 418 at the same time for a predetermined period of time, the light sources provided on a third exterior package side bordering the first exterior package side in the direction perpendicular to the alignment of the light sources 406, 408, 410, and 412. Next, it turns on the light sources 420, 422, 424, and 426 at the same time for a predetermined period of time, the light sources provided on the second exterior package side corresponding to the backside of the first exterior package side. Next, it turns the light sources 400, 402, and 404 at the same time for a predetermined period of time, the light sources provided on a fourth exterior package side corresponding to the backside of the third exterior package side.

In step S826, the controller 40 determines whether to end the processing for guiding the user to rotate the telephone 1 in the direction of B shown in FIG. 26. For example, a criterion for ending the guidance processing may be such that the number of repetitions from step S818 to S824 is a predetermined number or more, or it may be the range of distribution of the positions of azimuth measurement data or the positions of tilt measurement data.

Figure 27:
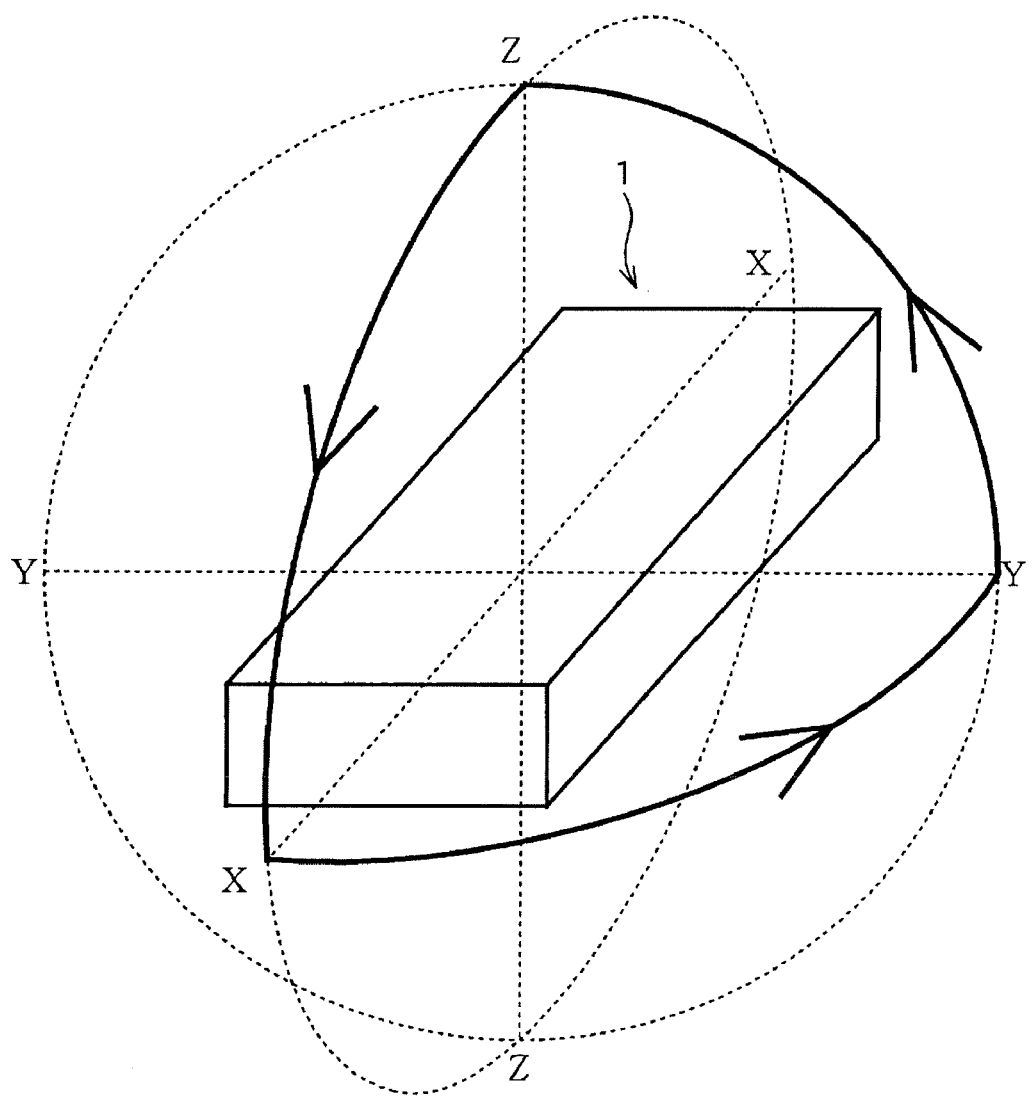
FIG. 27 is a schematic illustration according to the eighth embodiment of the present invention.
Figure 28:
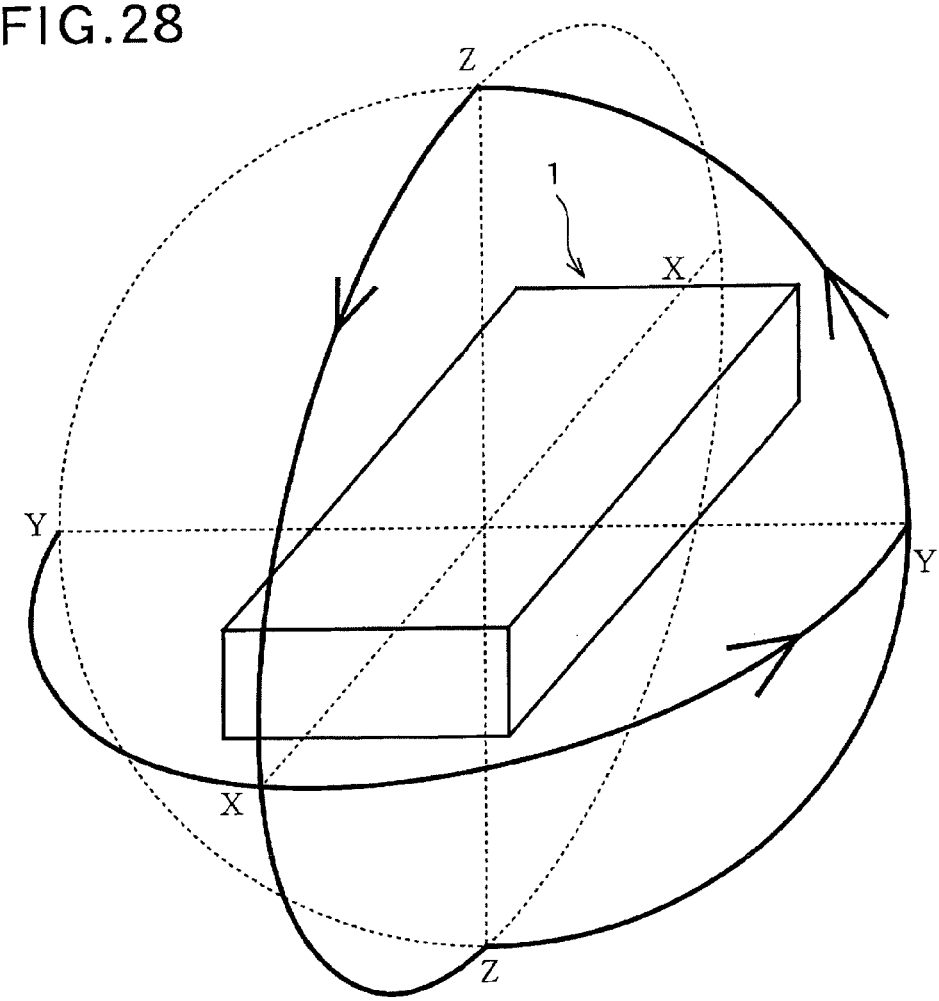
FIG. 28 is a schematic illustration according to the eighth embodiment of the present invention.

In this embodiment, the guidance processing for guiding the user to rotate the telephone 1 360 degrees about the two axes orthogonal to each other is described, but it is a design matter how to guide user's operations and is selectable as appropriate. For example, as shown in FIG. 27, the user may be guided to rotate the telephone 1 90 degrees about three axes orthogonal to one another, or as shown in FIG. 28, to rotate the telephone 1 180 degrees about three axes orthogonal to one another. Note that even when the controller 40 controls the light-emitting part 308 while performing the above-mentioned azimuth offset data updating processing in the mode A and the mode B, the calibration procedure does not affect the accuracy of the azimuth offset data substantially. Further, the azimuth offset updating processing performed in parallel with the guidance processing is not limited to that in the mode A and the mode B. For example, azimuth offset data updating processing without selecting azimuth measurement data to be accumulated may be performed.

According to the above-mentioned eighth embodiment of the present invention, the controller 40 can accumulate azimuth measurement data necessary to update the azimuth offset data without making the user strongly aware of the calibration procedure.

Ninth Embodiment

Figure 29:
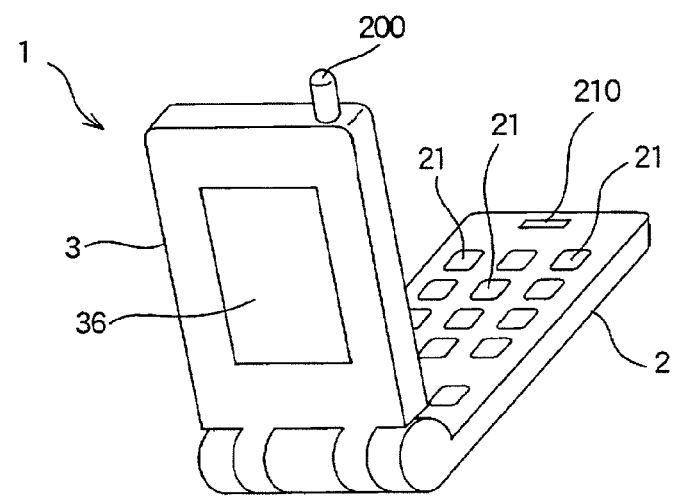
FIG. 29 is a perspective view showing the appearance of a telephone set according to a ninth embodiment of the present invention.

FIG. 29 is a perspective view showing the exterior package of the telephone 1 according to a ninth embodiment of the present invention. In the telephone 1 of the ninth embodiment, the exterior package side of the display unit 3 that faces the operation unit 2 is the same as that shown in FIG. 2. A screen 36 is provided on the backside of the screen 31 of the display unit 3. The screen 36 is a liquid-crystal display panel driven by the display part 306 (see FIG. 4). The controller 40 as target display control means controls the display part 306 to perform guidance processing for displaying a target on the screen 31 and the screen 36 while performing the above-mentioned azimuth offset updating processing. The azimuth offset updating processing performed in parallel with the guidance processing is not limited to that in the mode A and the mode B. For example, azimuth offset data updating processing without selecting azimuth measurement data to be accumulated may be performed.

Figure 30:
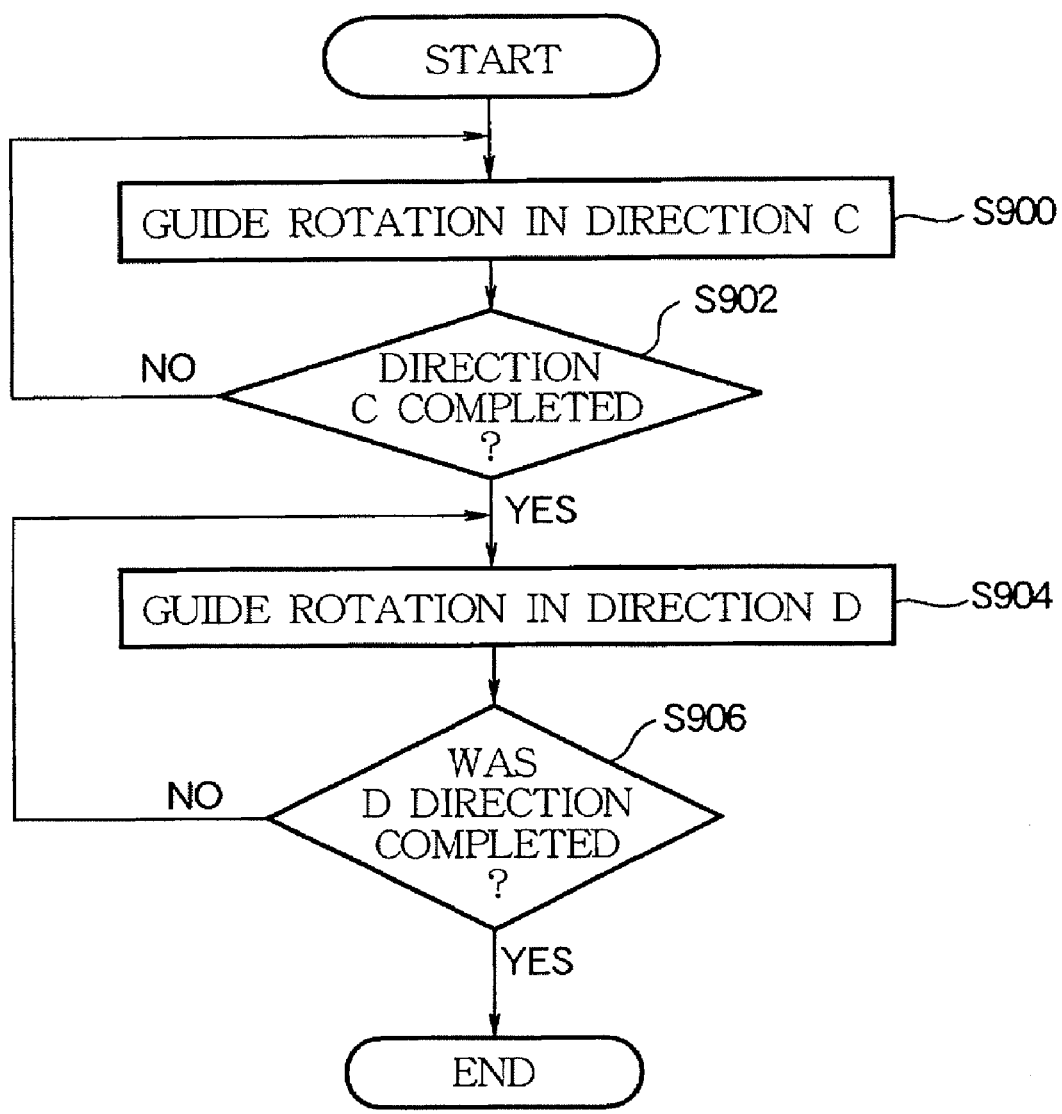
FIG. 30 is a flowchart showing a guidance method according to the ninth embodiment of the present invention.
Figure 31:
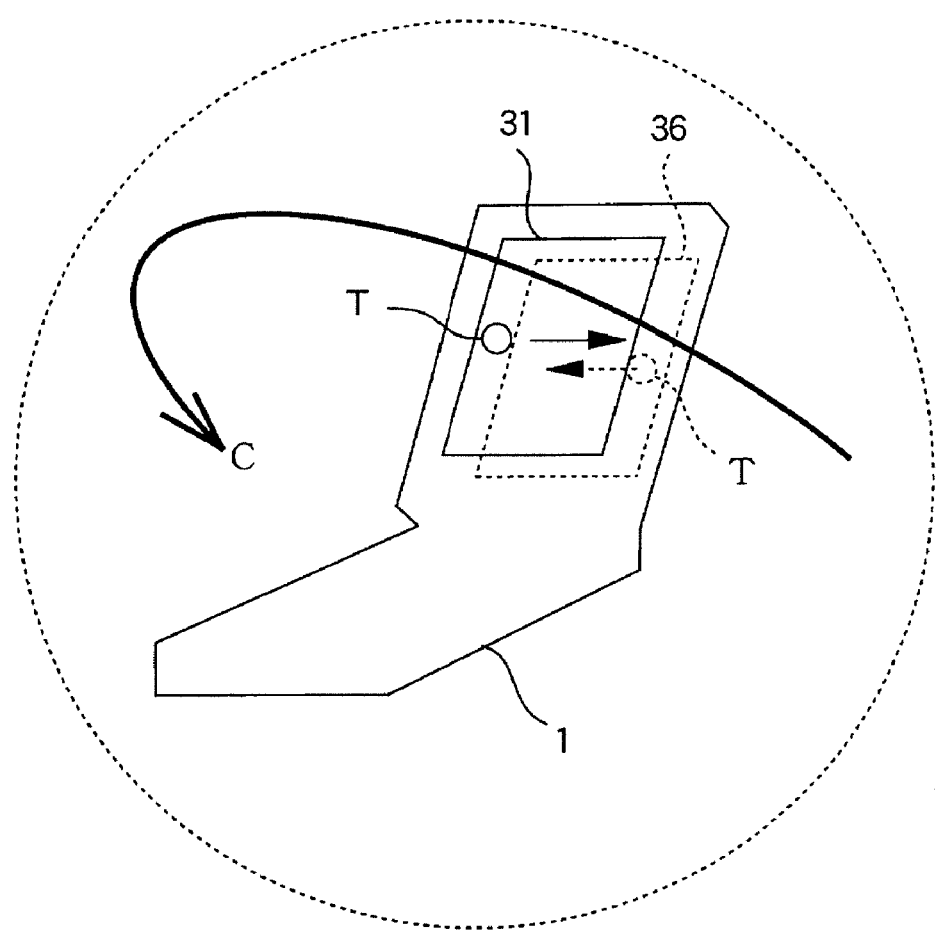
FIG. 31 is a schematic illustration according to the ninth embodiment of the present invention.
Figure 32:
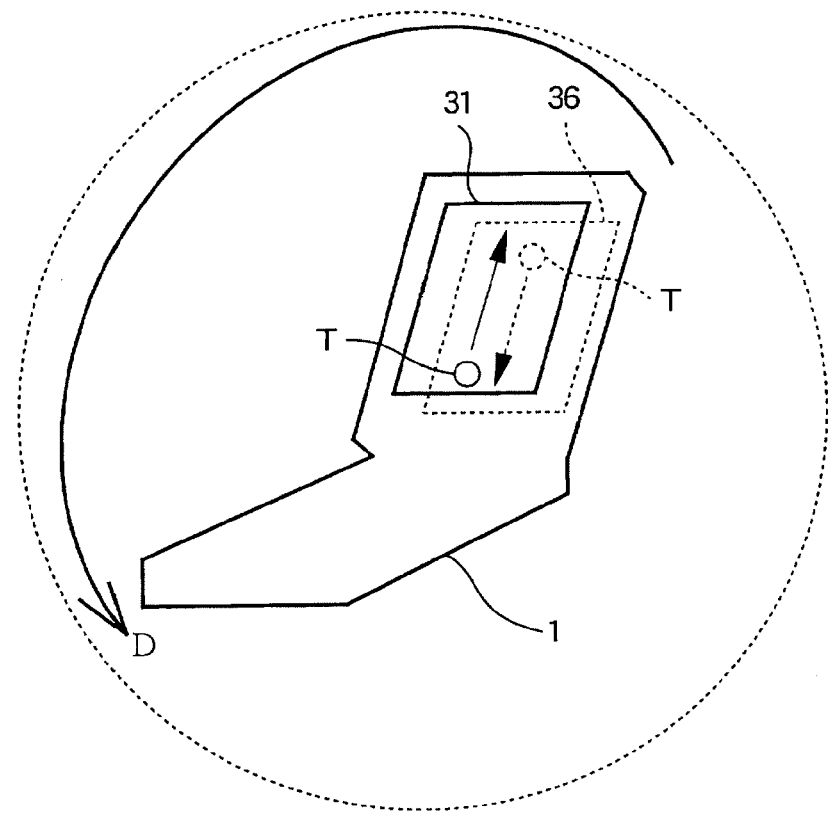
FIG. 32 is a schematic illustration according to the ninth embodiment of the present invention.

FIG. 30 is a flowchart showing the guidance processing performed in parallel with the azimuth offset updating processing. FIGS. 31 and 32 are schematic illustrations for explaining the trajectory of movement of the target displayed on the screen 31 and the screen 36. The controller 40 may start the guidance processing any time as long as the telephone 1 is on standby. For example, the controller 40 may start the guidance processing just after recharging. The target T may take any kind of form as long as it attracts the attention of the user. It may be a geometric form like a circle, an illustration of a face, or a letter string like a letter string indicating the current time. The controller 40 moves the display position of the target T with time during the guidance processing. It is desirable that the trajectory of movement of the target T should be set so that the positions of azimuth measurement data to be accumulated in the azimuth offset updating processing performed in parallel with the guidance processing will be distributed widely and uniformly. The following describes a specific example of the trajectory of movement of the target T.

At first, the controller 40 guides the user to rotate the telephone 1 in the direction of C in FIG. 31 (S900). Specifically, for example, the controller 40 displays the target T at the left end of the screen 31 (on the user's left), and moves the target T from the left end to the right end of the screen 31. When the target T is moved to the right end of the screen 31, the controller 40 causes the target T to gradually disappear from the screen 31 as if the target T is moving toward the outside of the screen 31. Then, the controller 40 displays the target T at the left end of the screen 36 (on the user's left), and moves the target T from the left end to the right end of the screen 36.

Then, the controller 40 determines whether to end the processing for guiding the user to rotate the telephone 1 in the direction of C in FIG. 31. The controller 40 may use as a judgment criterion the number of repetitions of step S900, or the range of distribution of the positions of azimuth measurement data accumulated in the azimuth offset updating processing.

After completion of guiding in the direction of C, the controller guides the user to rotate the telephone 1 in the direction of D in FIG. 32 (S904). Specifically, for example, the controller 40 displays the target T at the bottom of the screen 31 (at the end close to the operation unit 2), and moves the target T from the bottom to the top of the screen 31. When the target T is moved to the top of the screen 31, the controller 40 causes the target T to gradually disappear from the screen 31 as if the target T is moving toward the outside of the screen 31. Then, the controller 40 displays the target T at the top of the screen 36 (at the end far from the operation unit 2), and moves the target T from the top to the bottom of the screen 36.

Then, the controller 40 determines whether to end the processing for guiding the user to rotate the telephone 1 in the direction of D in FIG. 32 (S906). The controller 40 may use as a judgment criterion the number of repetitions of step S904, or the range of distribution of the positions of azimuth measurement data accumulated in the azimuth offset updating processing.

According to the above-mentioned ninth embodiment of the present invention, the controller 40 can accumulate azimuth measurement data necessary to update the azimuth offset data without making the user strongly aware of the calibration procedure.

Tenth Embodiment

In the telephone 1 according to a tenth embodiment of the present invention, the controller 40 as operation guiding control means accumulates azimuth measurement data necessary to update the azimuth offset data while controlling the display part 306 according to the newest azimuth measurement data to display an image for guiding the user across the screen 31.

Figure 33:
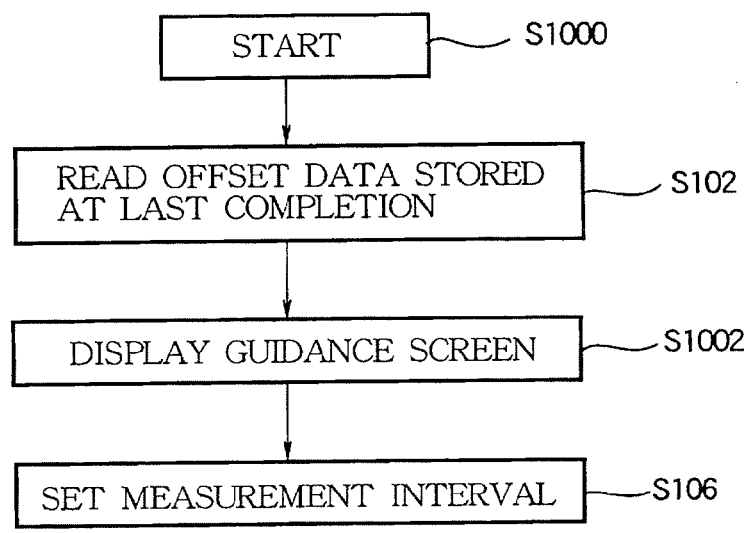
FIG. 33 is a flowchart showing an azimuth processing method according to a tenth embodiment of the present invention.
Figure 34:
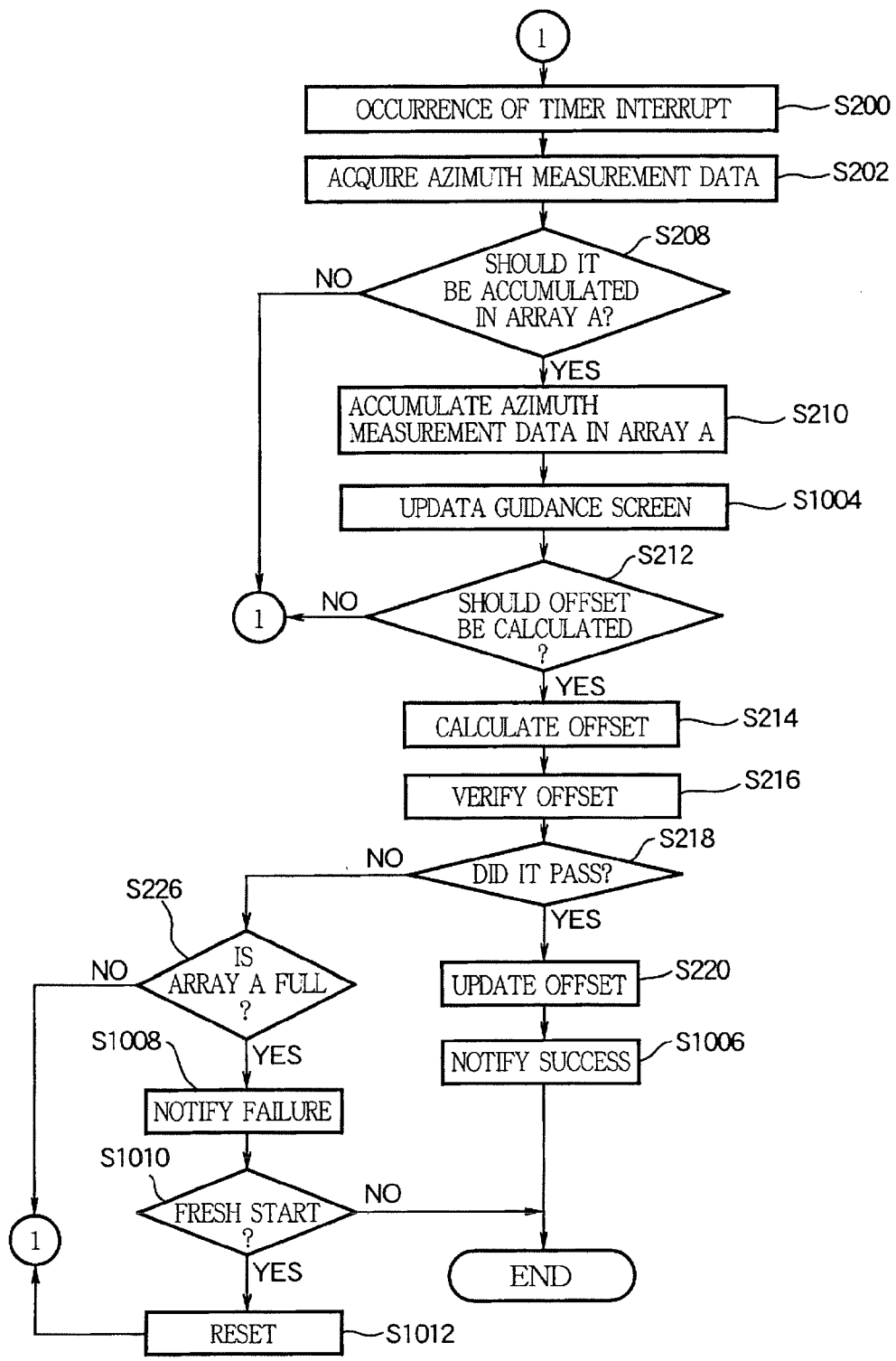
FIG. 34 is a flowchart showing the azimuth processing method according to the tenth embodiment of the present invention.

FIGS. 33 and 34 are flowcharts showing an azimuth processing method according to the tenth embodiment of the present invention. Substantially the same processing steps as those in the first embodiment are given the same numerals, and the description thereof is omitted.

When the main operating part 224 accepts a user instruction to update the azimuth offset data, the controller 40 runs an azimuth offset updating program to start initialization as shown in FIG. 33 (S 1000).

In step S1002, the controller 40 displays a guidance screen 31 which encourages the user to start calibration. The guidance screen may show any kind of content as long as it encourages the user to start calibration. For example, it may show a combination of a message and an illustration, or only either a message or an illustration.

After completion of the initialization, when the distance between the position of the newest azimuth measurement data output from the azimuth measuring part 66 and the position of the last accumulated azimuth measurement data is a reference value or larger, the newest azimuth measurement data is accumulated in the array A in step S210 in the manner mentioned above.

Figure 35:
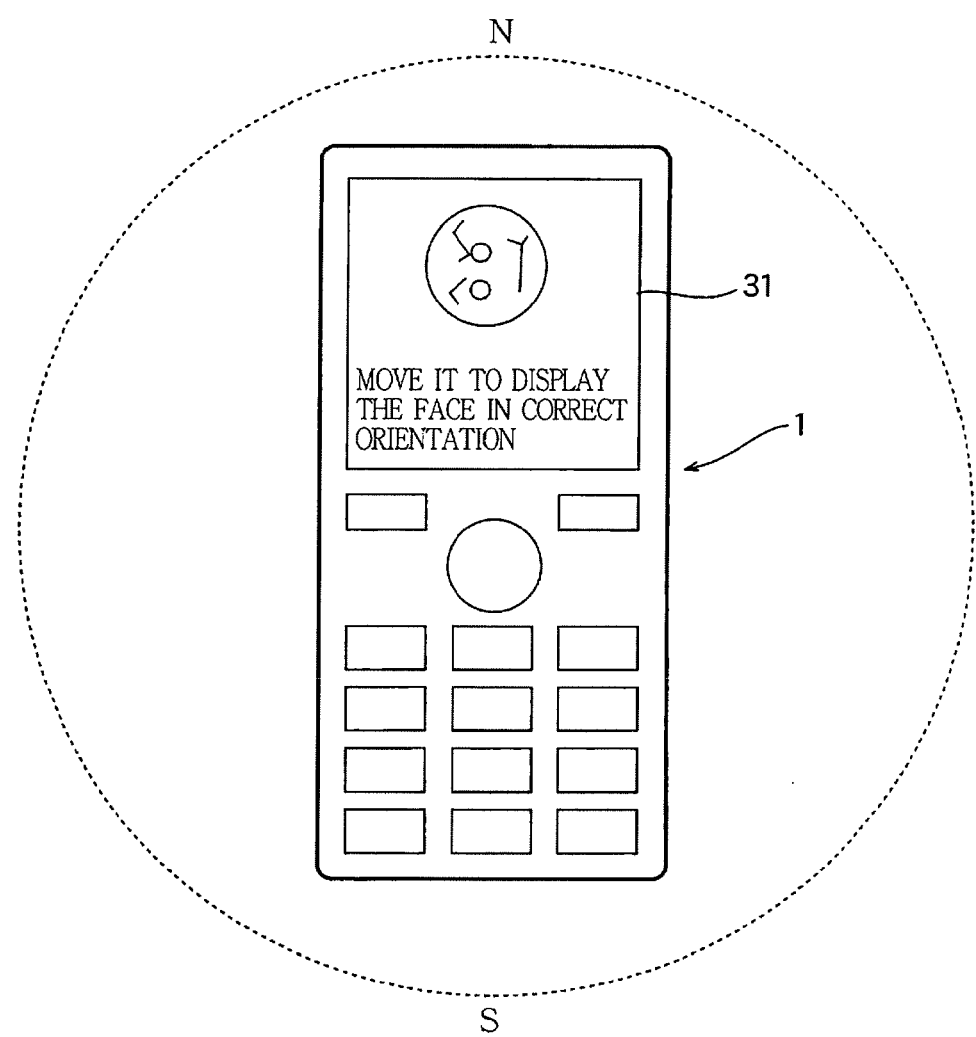
FIG. 35 is a schematic illustration according to the tenth embodiment of the present invention.
Figure 36:
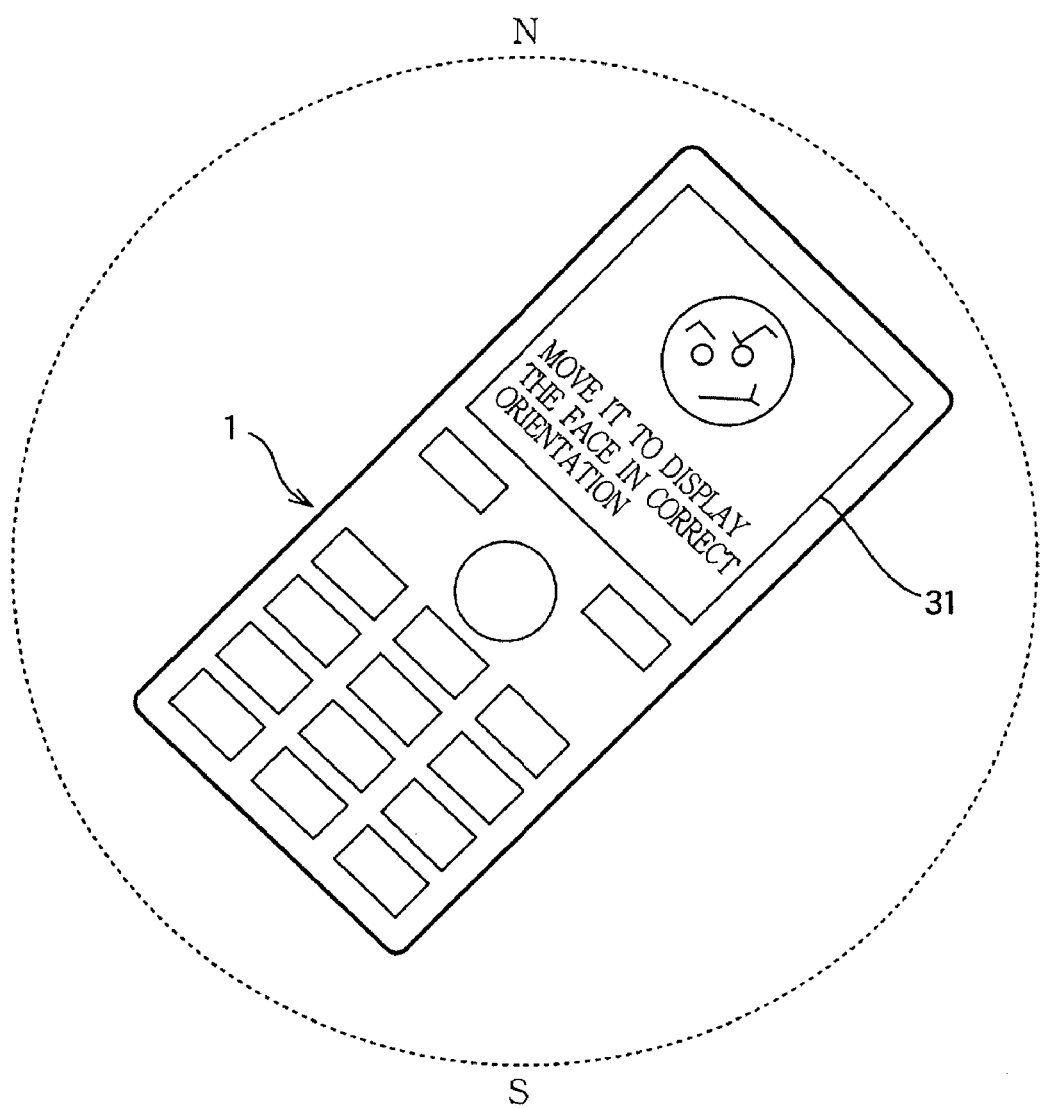
FIG. 36 is a schematic illustration according to the tenth embodiment of the present invention.
Figure 37:
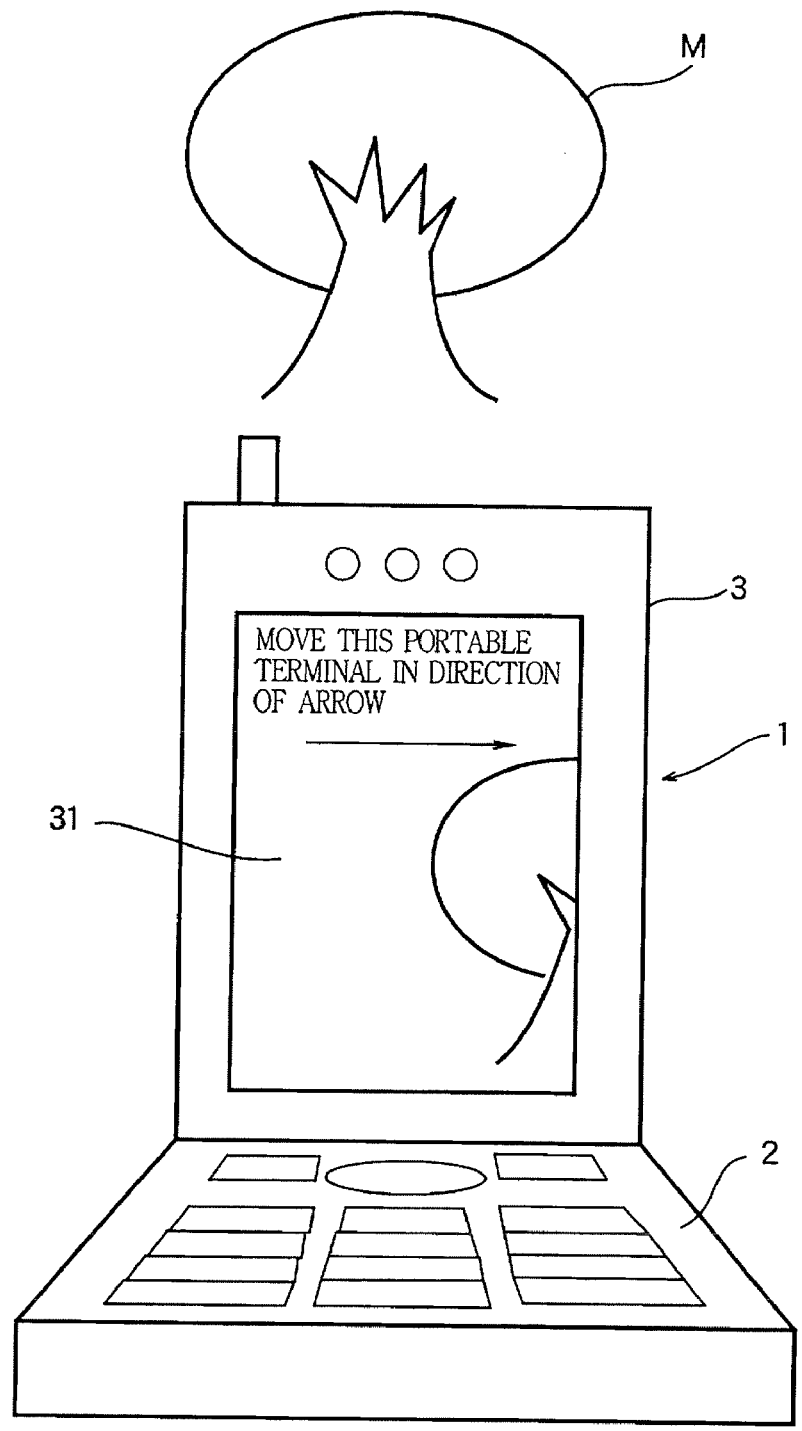
FIG. 37 is a schematic illustration according to the tenth embodiment of the present invention.

After the newest azimuth measurement data is stored in the array A, the controller 40 updates the guidance screen according to the newest azimuth measurement data stored (step S1004). The updated guidance screen may show any kind of content as long as it guides the direction of movement of the telephone 1. Specifically, for example, it may show a character's face, as shown in FIG. 36, which changes in directional orientation with changes in attitude of the telephone 1. FIG. 36 shows a state where the telephone 1 is rotated 45 degrees about a plumb line as the rotating axis from a state shown in FIG. 35. Further, for example, the controller 40 may edit a digital picture of a subject M created by the image pick-up part 304 (see FIG. 4) to show part of the edited digital picture of the subject M on the screen 31 together with an arrow and a message as shown in FIG. 37, or to show a tilted digital picture of the subject M on the screen 31 together with an arrow and a message. The direction in which the user should move the telephone 1 is decided according to the azimuth measurement data stored in the array A upon which the azimuth offset data is calculated. In other words, the direction in which the user should move the telephone 1 is the direction in which azimuth measurement data located out of the range of distribution of the positions of azimuth measurement data accumulated in the array A should be output from the azimuth measuring part 66. The guiding method for calibration may guide the user with synthetic voice produced by the sound generator part 312 (see FIG. 4) from the alarm speaker 310, rather than displaying the guidance screen on the screen 31, or in combination of the guidance screen and the synthetic voice. Further, during guiding the calibration, the sound generator part 312 may also produce a certain piece of music or sound effect from the alarm speaker 310 so that the user can recognize that the guidance is now in progress.

Figure 38:
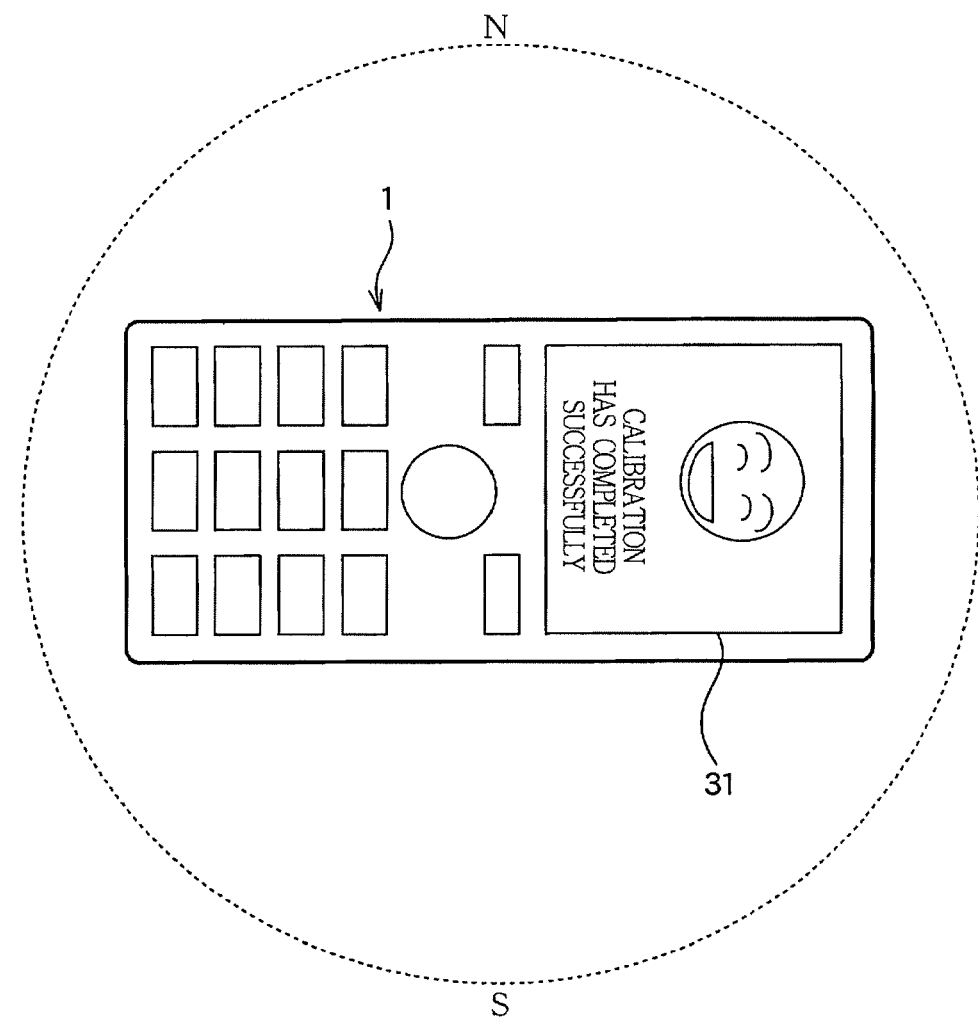
FIG. 38 is a schematic illustration according to the tenth embodiment of the present invention.

When the azimuth offset data is updated in step S220 in the manner mentioned above, the controller 40 notifies the user of the success of calibration. The controller 40 may display a message and an illustration on the screen 31 as shown in FIG. 38, or produce synthetic voice, or a piece of music or sound effect, which suggest the success of calibration, from the alarm speaker 310. FIG. 38 shows a state where the telephone 1 is rotated 90 degrees about the plumb line as the rotating axis from a state shown in FIG. 35.

Figure 39:
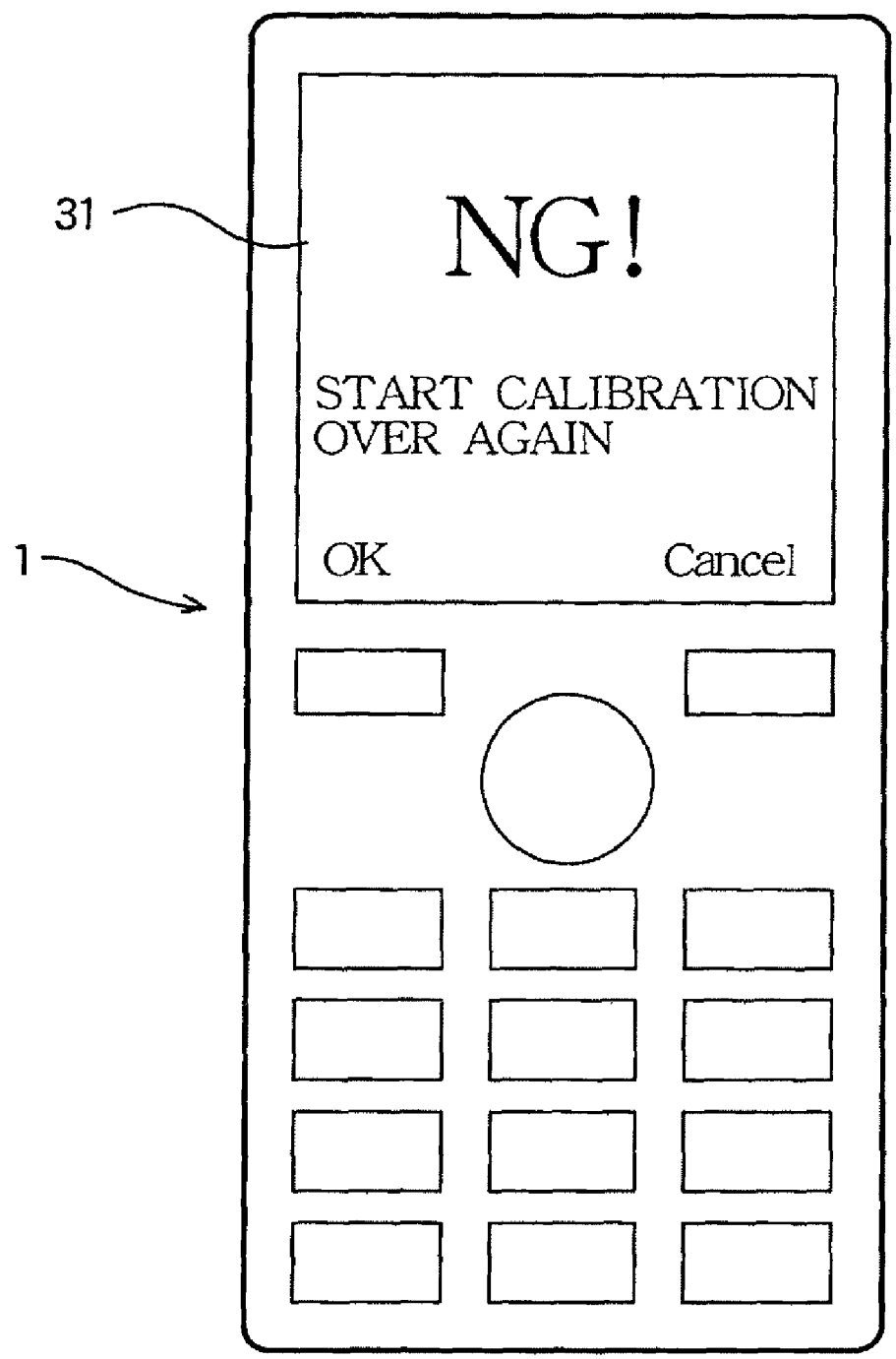
FIG. 39 is a schematic illustration according to the tenth embodiment of the present invention.

When rejecting the offset data and determining in step S226 that a predetermined number of azimuth measurement data are stored in the array A, the controller 40 notifies the user of the failure of calibration. To notify the user of the failure, the controller 40 may display a message on the screen 31 as shown in FIG. 38, display a message and an illustration, or produce synthetic voice, or a piece of music or sound effect, which suggest the failure of calibration, from the alarm speaker 310. The controller 40 may also display a menu on the screen 31 to encourage the user to select whether to start calibration over again (OK) or not (Cancel) as shown in FIG. 39.

When the user selects to start calibration over again, all the azimuth measurement data accumulated in the array A are deleted to restart accumulation of azimuth measurement data after execution of processing (step S1012) similar to the processing step S1002.

According to the above-mentioned tenth embodiment of the present invention, the guidance to guide the user into the calibration procedure is notified according to the newest azimuth measurement data during accumulation of azimuth measurement data necessary to update the azimuth offset data. It makes it easy for the user to perform calibration.

Eleventh Embodiment

Figure 40:
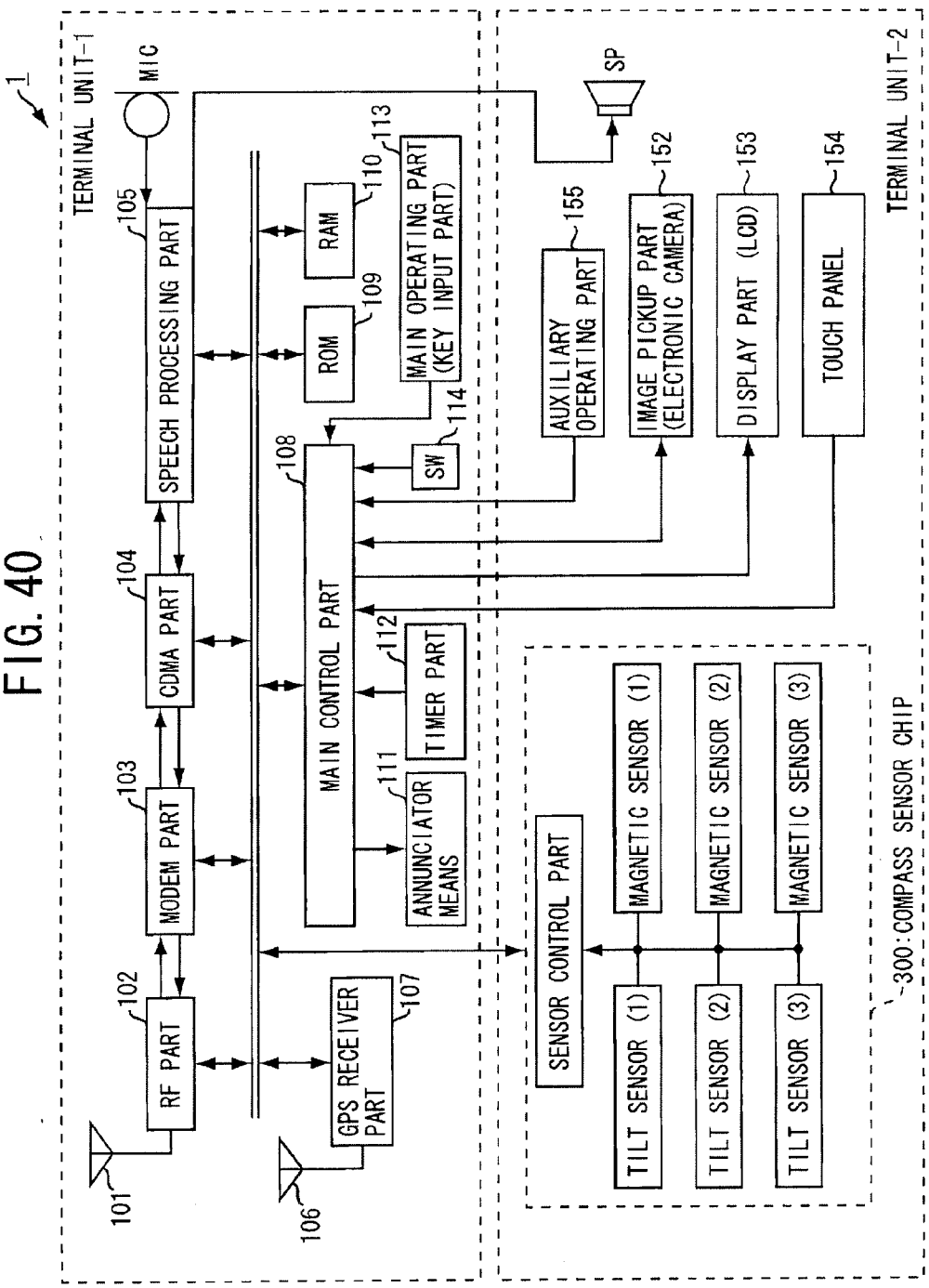
FIG. 40 is a block diagram of the structure of a portable electronic device (portable terminal) according to an eleventh embodiment of the present invention.

FIG. 40 is a block diagram showing the electrical structure of a portable electronic device according to a preferred form of the present invention by taking an example a CDMA (Code Division Multiple Access) portable communication terminal (hereinafter called the portable terminal).

Portions common to one another in the drawings are given the same reference numerals.

As shown in FIG. 40, a portable terminal 1 of this form includes antennas 101 and 106, an RF part 102, a modem part 103, a CDMA part 104, a speech processing part 105, a GPS receiver part 107, a main control part 108, a ROM 109, a RAM 110, annunciator means 111, a timer part 112, a main operating part 113, an SW 114, a compass sensor chip 300, an electronic image pickup part 152, a display part 153, a touch panel 154, and an auxiliary operating part 155.

As shown in FIG. 40, the antenna 101 exchanges radio waves with a radio base station, not shown. The RF part 102 performs processing related to sending and receiving signals. The RF part 102 is equipped with a local oscillator and the like. Upon reception, the RF part 102 mixes a local oscillator signal of a given frequency with a received signal from the antenna 101 to convert the received signal to a received IF signal of an intermediate frequency (IF), and output it to the modem part 103. Upon transmission, the RF part 102 mixes a local oscillator signal of a given frequency with a transmit IF signal of an intermediate frequency to convert the transmit IF signal to a transmit signal of a transmit frequency, and output it to the antenna 101.

The modem part 103 demodulates the received signal and modulates the transmit signal. The modem part 103 is equipped with a local oscillator and the like to convert the received IF signal from the RF part 102 into a baseband signal of a given frequency, convert the baseband signal to a digital signal, and output the digital signal to the CDMA part 104. On the other hand, the modem part 103 converts a digital baseband signal from the CDMA part 104 into an analog signal, converts it to a transmit IF signal of a given frequency, and outputs it to the RF part 102.

The CDMA part 104 encodes the transmit signal and decode the received signal. The CDMA part 104 decodes the baseband signal output from the modem part 103. On the other hand, the CDMA part 104 encodes the transmit signal and outputs the coded baseband signal to the modem part 103.

The speech processing part 105 performs speech processing during a call. The speech processing part 105 converts, to a digital signal, an analog speech signal output from a microphone (MIC) during the call, and outputs it to the CDMA part 104 as a transmit signal. On the other hand, the speech processing part 105 generates an analog driving signal for driving a speaker (SP) based on a signal representing speech data decoded by the CDMA part 104 during the call, and outputs it to the speaker (SP). The microphone (MIC) generates a speech signal based on voice input by the user, and outputs it to the speech processing part 105. The speaker (SP) sounds the voice of a calling partner based on a signal output from the speech processing part 105.

The GPS antenna 106 receives radio waves transmitted from GPS satellites, not shown, and outputs received signals based on the radio waves to the GPS receiver part 107. The GPS receiver part 107 demodulates the received signals, and acquires information based on the received signals, such as accurate time information and propagation time from each of the GPS satellites. The GPS receiver part 107 calculates distances to three or more GPS satellites based on the acquired information to calculate a position in three-dimensional space (latitude, longitude, altitude, etc) based on the triangulation principle.

The main control part 108 includes a CPU (Central Processing Unit) and the like to control each internal part of the portable terminal 1. The main control part 108 inputs and outputs control signals or data through a bus to and from the RF part 102☐ the modem part 103☐ the CDMA part 104☐ the speech processing part 105☐ the GPS receiver part 107, a compass sensor unit 200 to be described below, the ROM 109, and the RAM 110. The ROM 109 stores various programs to be executed by the main control part 108, and initial characteristic values and the like of a temperature sensor and a tilt sensor measured at the time of shipping inspection. The RAM 110 temporarily stores data and the like to be processed by the main control part 108.

The annunciator means 111 includes, for example, a speaker, a vibrator, and/or a light-emitting diode to inform the user of the arrival of a call or e-mail using sound, vibration, and/or light. The timer part 112 has a timer function for creating time information indicating year, month, day, day of the week, time, etc. The main operating part 113 includes input keys for entering characters, a conversion key for conversion to Chinese characters, numerals, etc., cursor keys, a power on/off key, a talk key, a redial key, etc. operated by the user; it outputs signals indicating the operation results to the main control part 108. The opening/closing switch (SW) 114 is a switch for detecting the beginning of opening or end of closing of a folding portable terminal.

The compass sensor chip 300 includes magnetic sensors (1) to (3) for detecting x-axis, y-axis, and z-axis magnetic fields orthogonal to one another, tilt sensors (1) to (3), and a block (sensor control part) for processing the detection results from the respective sensors. The details will be described later using FIG. 41.

The electronic image pickup part 152 includes an optical lens and an image pickup device such as a CCD (Charge Coupled Device). The image pickup device converts, into an analog signal, an image of a subject formed through the optical lens on an image pickup plane of the image pickup device, converts the analog signal to a digital signal, and outputs it to the main control part 108. The display part 153 includes a liquid crystal display or the like on which images or characters are displayed based on display signals output from the main control part 108. The touch panel 154 is incorporated on the surface of the liquid crystal display included in the display part 153 to output, to the main control part 108, a signal corresponding to a user's operation. The auxiliary operating part 155 includes a push switch and the like used for display switching.

Figure 41:
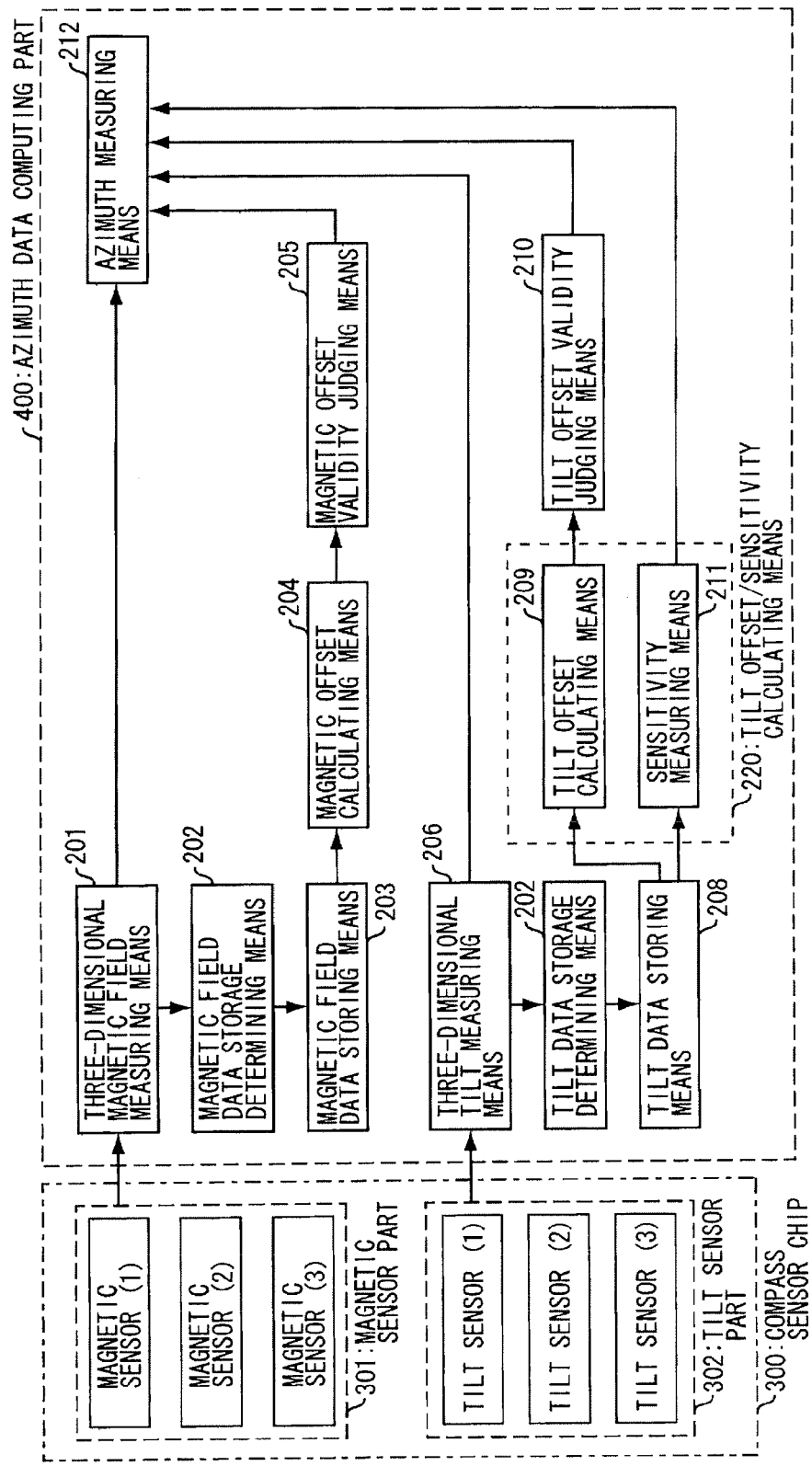
FIG. 41 is a block diagram of the structure of a compass sensor unit according to the eleventh embodiment of the present invention.

Referring next to FIG. 41, the details of the functional blocks for measuring an azimuth direction will be described.

As shown in FIG. 41, the functional blocks for measuring an azimuth direction includes the compass sensor chip 300 and an azimuth data computing part 400. The azimuth data computing part 400 corresponds to the main operating part 108 shown in FIG. 40. The azimuth data computing part 400 includes three-dimensional magnetic field measuring means 201, magnetic field data storage determining means 202, magnetic field data storing means 203, magnetic offset calculating means 204, magnetic offset validity judging means 205, three-dimensional tilt measuring means 206, tilt data storage determining means 207, tilt data storing means 208, tilt offset/sensitivity calculating means 220 composed of tilt offset calculating means 209 and sensitivity measuring means 211, tilt offset validity judging means 210, and azimuth measuring means 212.

A magnetic sensor part 301 includes magnetic sensors (1) to (3), and sensor initialization means (1) to (3), not shown, for initializing each magnetic sensor after power-on. When a ferromagnetic field is applied, the direction of the magnetization of each magnetic body of the magnetic sensors is changed or distorted. To avoid this, the sensor initialization means (1) to (3) are provided to reset each of the magnetic sensors (1) to (3) to its initial state. A tilt sensor part 302 includes three-axis tilt sensors (1) to (3).

The three-dimensional magnetic field measuring means 201 is activated in response to a measurement trigger to measure X-, Y-, and Z-axis magnetic field data based on input data from the magnetic sensor part 301 and supply them to the magnetic field data storage determining means 202 and the azimuth measuring means 212. The three-dimensional magnetic field measuring means 201 repeats measurements at trigger timings until the user exits from an application.

The magnetic field data storage determining means 202 performs processing related to data storage such as to determine whether to store measurement data, indicated by a digital signal corresponding to the output of a magnetic sensor, into the magnetic field data storing means 203. The magnetic field data storing means 203 captures data from the magnetic field data storage determining means 202 to store the data by a predetermined storage method. The magnetic offset calculating means 204 calculates offset based on the measurement data acquired during calibration (the details will be described later). The magnetic offset validity judging means 205 judges the validity of the offset calculated by the magnetic offset calculating means 204 (the details will be described later).

The three-dimensional tilt measuring means 206 is activated in response to the measurement trigger to measure X-, Y-, and Z-axis tilt data based on input data from the tilt sensor part 302 and supply them to the tilt data storage determining part 207 and the azimuth measuring means 212. The three-dimensional tilt measuring means 206 repeats measurements at trigger timings until the user exits from the application.

Upon calibration, the tilt data storage determining means 207 performs processing related to data storage such as to determine whether to store measurement data, indicated by a digital signal corresponding to the output of a tilt sensor, into the tilt data storing means 208. The tilt data storing means 208 captures data from the tilt data storage determining means 207 to store the data by a predetermined storage method. The tilt offset validity judging means 210 judges the validity of the offset calculated by the tilt offset calculating means 209 (the details will be described later).

In the tilt offset/sensitivity calculating means 220, the tilt offset calculating means 209 calculates offset based on the measurement data acquired during the calibration (to be described in detail later), while the sensitivity measuring means 211 measures the sensitivity of each tilt sensor.

The azimuth measuring means 212 removes, from the magnetic field data and the tilt data input from the three-dimensional magnetic field measuring means 201 and the three-dimensional tilt measuring means 206, the offset components input from the magnetic offset validity judging means 205 and the tilt offset validity judging means 210, respectively, and also in consideration of the sensitivity of each tilt sensor output from the sensitivity measuring means 211, it determines an azimuth direction.

Next, specific processing will be described using FIG. 42.

Figure 42:
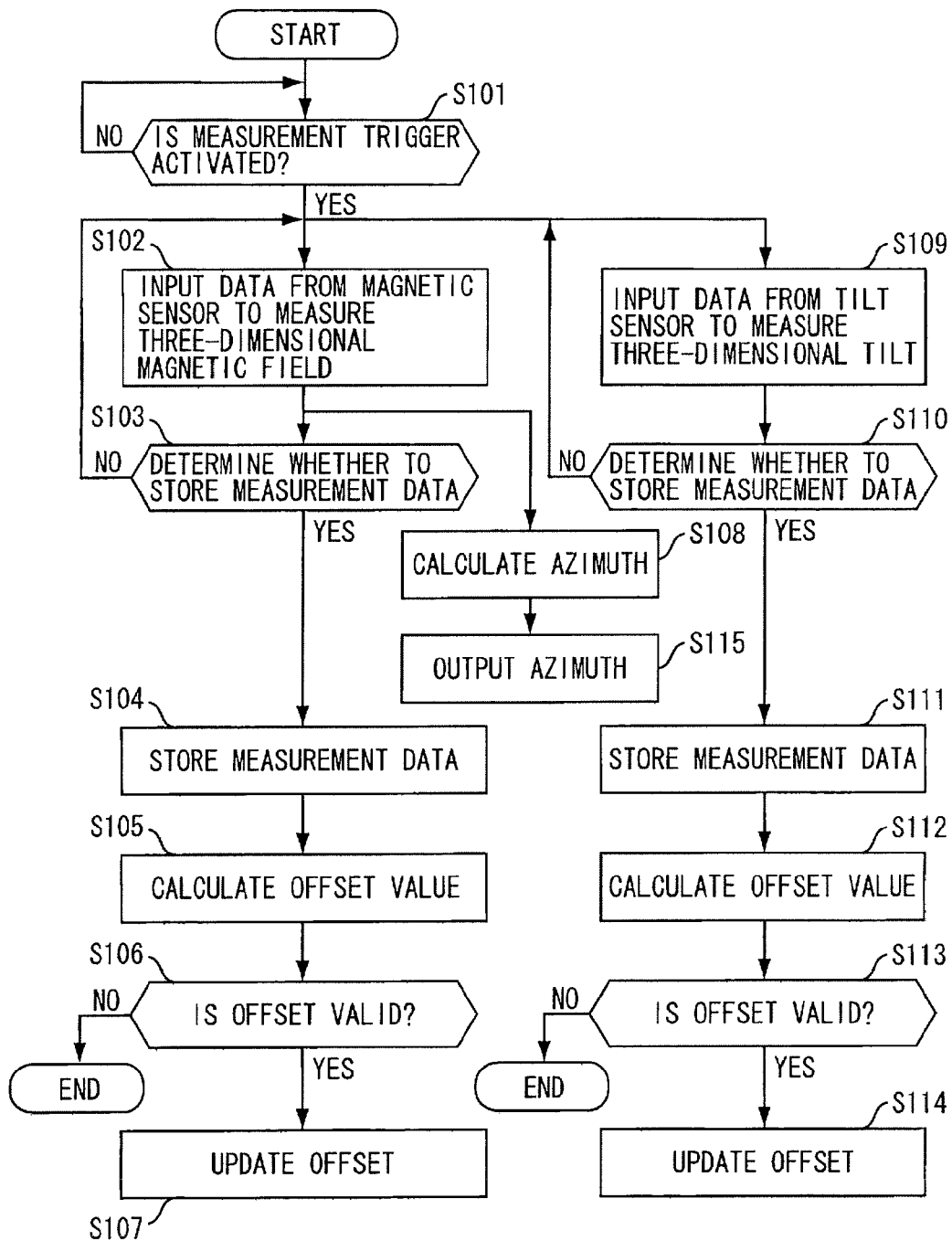
FIG. 42 is a flowchart of the processing of outputting an azimuth direction according to the eleventh embodiment.

As shown in FIG. 42, when an application or the like requiring azimuth measurement is activated, measurement trigger events occur to repeat measurements as required from the application or the like (step 101). The application means application software such as navigation software using the azimuth data. Specifically, other triggering methods are also considered, such as 1) a method of triggering at constant intervals, and 2) a method of triggering when it is conceivable that the azimuth direction could have changed as a result of monitoring another device in the portable terminal (for example, at the time when image data input in the electronic image pickup part 152 has slid).

The method of triggering in response to a request from the application has the advantage of minimizing the number of measurements. The method 1) performs data measurement periodically. Therefore, this method has the advantage of short response time because previously measured data have only to be output whenever the application makes a request to measure azimuth. The method 2) has the combined advantages of both methods 1) and 2) though it is a necessary condition that another device in the portable terminal is operating. Any method may be selected as appropriate according to the features of the device.

When the measurement trigger is activated, the three-dimensional magnetic field measuring means 201 measures three-dimensional magnetic field data from input data from the magnetic sensors, and outputs them to the magnetic field storage determining means 202 and the azimuth measuring means 212 (step 102). The magnetic field data storage determining means 202 performs processing for determining whether to store the data into the magnetic field data storing means 203 (step 103).

The determination is made by referring to data stored in the magnetic field data storing means 203 to determine whether to store the input data from the three-dimensional magnetic field measuring means 201 into the magnetic field data storing means 203. When it is determined that the input data should be stored, the data is stored in the magnetic field data storing means 203.

Methods of determining whether to store the data includes: 1) a method of storing all data, and 2) a method of storing the data when there is no data in the magnetic field data storing means 203, or if any data is already stored, storing the data only when it is spaced apart a given distance or more from the last stored data. In this case, it is preferable that the given distance be about 0.05 Oe for magnetic data and about 0.15 G for tilt data to be described later. According to the present invention, the distance between measurement values (Hx1, Hy1, Hz1) and (Hx2, Hy2, Hz2) is determined between the corresponding points in the azimuth space defined by the given coordinate system, and is represented by Equation 4 below. The methods also include 3) a method of storing the data when there is no data in the magnetic field data storing means 203, or if any data is already stored, storing the data only when it is spaced apart a given distance or more from all the data stored. In this case, it is preferable that the given distance be about 0.05 Oe for magnetic data and about 0.15 G for tilt data to be described later.

$$\text{Distance} = \sqrt{(Hx1-Hx2)^2 + (Hy1-Hy2)^2 + (Hz1-Hz2)^2}. \quad \text{[Equation 4]}$$

Since the method 1) can collect much of data in the shortest time and hence increase the frequency of calibration, it has the advantage of being able to correct offset in a short time even if an offset change occurs. The method 2) has the advantage of being able to prevent the data from being locally distributed in a compass sphere. The method 3) is the best at maintaining the uniformity of data, but it requires long time to accumulate data. Based on the above-mentioned matters, any method may be selected as appropriate according to the features of the device.

The magnetic field data storing means 203 captures data from the magnetic field data storage determining means 202 to store the data by a predetermined storage method to be described later (step 104), and inquires of offset calculation triggering means, not shown, as to whether the data should be output to the magnetic offset calculating means 204. The magnetic offset calculation triggering means replies as to whether the data should be output to the magnetic offset calculating means 204 based on a triggering method to be described later. When receiving an instruction to output the data to the magnetic offset calculating means 204, the stored data are output to the magnetic offset calculating means 204.

Methods of storing data include: 1) a method of accumulating data in order of capture, and upon completion of offset calculation processing in response to a trigger from the offset calculation triggering means, deleting all the data to start accumulation of data again; 2) a method of accumulating data in order of capture, and when a given amount of data are stored, deleting the oldest data to capture new data so that the given amount of data will be always held; 3) a method of accumulating data in order of capture, and upon completion of offset calculation processing in response to a trigger from the offset calculation triggering means, deleting part of data in order of storage to start accumulation of data; and 4) a method of accumulating data in order of value, and when a given amount of data are stored, replacing with the newest data the stored data that is most close to the newest data.

The method 1) has the advantage of low processing load. The method 2) has the advantage of being able to increase the frequency of calibration, and hence correct offset in the shortest time. The method 3) also has the advantage of being able to correct offset in a short time, but it requires high calculation load for calibration. However, compared with the method 2), it can reduce the number of offset calculations and hence the load of calculation processing. The method 4) has the advantage that when the magnitude of an offset change is small, it can keep the data density uniform, compared with the method 2), whereas when the magnitude of the offset change is larger than the radius of the compass sphere, it may keep unnecessary data for ever. Therefore, the choice of which method to select may be made as appropriate according to the features of the device.

On the other hand, methods of triggering offset calculation include: 1) a method of triggering when a given amount of data are accumulated; 2) a method of triggering when a given amount of data are accumulated or when a given amount of data are accumulated and a certain period of time has elapsed from the last offset calculation; and 3) a method of triggering at constant intervals as long as the number of pieces of data is four or more.

Since the number of data pieces is always constant in the method 1), the accuracy of calculation based on the number of data pieces is reliable. Since the method 2) can perform calibration in a shorter time than that in the method 1), it has the advantage of being able to correct an offset change in a shorter time. The method 3) has advantage of avoiding such a situation that calibration will not start for a long time. Therefore, based on the above-mentioned matters, any method may be selected as appropriate according to the features of the device.

Next, the magnetic offset calculating means calculates offset according to the following offset calculation algorithm (step 105).

In other words, if the measurement data is expressed by ($x_i$, $y_i$, $z_i$) where i=1, ..., N, the offset is (X0, Y0, X0), and the radius of the compass sphere is R, the following equation is given:

$$(x_i-X0)^2 + (y_i-Y0)^2 + (z_i-Z0)^2 = R^2.$$

In this case, the least square error $\epsilon$ is defined as follows:

$$\begin{aligned}\varepsilon &= \sum \{(x_i - X0)^2 + (y_i - Y0)^2 + (z_i - Z0)^2 - R^2\}^2 \quad \text{[Equation 5]}\\ &= \sum \{(x_i^2 + y_i^2 + z_i^2) - 2x_iX0 - 2y_iY0 - 2z_iZ0 + \\ &\quad (X0^2 + Y0^2 + Z0^2) - R^2\}^2\end{aligned}$$

If $a_i = x_i^2 + y_i^2 + z_i^2$, $b_i = -2x_i$, $c_i = -2y_i$, $d_i = -2z_i$, and $D = (X0^2+Y0^2+Z0^2) - R^2$ \hfill (1), $\epsilon$ is determined by the following equation:

$$\epsilon = \Sigma(a_i + b_iX0 + c_iY0 + d_iZ0 + D)^2. \quad \text{[Equation 6]}$$

In this case, the variables X0, Y0, Z0 and D are treated as an independent variable of $\epsilon$ in order to simplify the computation. The conditions for setting the least square error $\epsilon$ to the minimum are given by differentiating the square error $\epsilon$ by X0, Y0, Z0 and D shown in the following equations:

$$\begin{cases}\frac{\partial \varepsilon}{\partial X0} = 2\sum (a_i + b_iX0 + c_iY0 + d_iZ0 + D)b_i = 0 & \text{[Equation 7]}\\ \frac{\partial \varepsilon}{\partial Y0} = 2\sum (a_i + b_iX0 + c_iY0 + d_iZ0 + D)c_i = 0 \\ \frac{\partial \varepsilon}{\partial Z0} = 2\sum (a_i + b_iX0 + c_iY0 + d_iZ0 + D)d_i = 0 \\ \frac{\partial \varepsilon}{\partial D} = 2\sum (a_i + b_iX0 + c_iY0 + d_iZ0 + D) = 0\end{cases}$$

As a result, the following equation is given:

$$\begin{bmatrix} [bb] & [bc] & [bd] & [b] \\ [bc] & [cc] & [cd] & [c] \\ [bd] & [cd] & [dd] & [d] \\ [b] & [c] & [d] & N \end{bmatrix} \begin{bmatrix} X0 \\ Y0 \\ Z0 \\ D \end{bmatrix} = \begin{bmatrix} -[ab] \\ -[ac] \\ -[ad] \\ -[a] \end{bmatrix}$$ [Equation 8]

where $$[m] = \sum_{i=1}^{N} m_i, \ [mn] = \sum_{i=1}^{N} m_i n_i$$ [Equation 9]

By solving the above-mentioned simultaneous equations, X0, Y0, Z0, and D, which take the least square error $\epsilon$ as the minimum value, are determined. Further, R is determined from (1).

Next, the magnetic offset validity judging means 205 judges the offset to be valid on the following conditions: when X0, Y0, Z0, and R determined by the following Equation 10 are substituted, σ is a given value or less, and MAX(Hx)–MIN(Hx), MAX(Hy)–MIN(Hy), and MAX(Hz)–MIN(Hz) are all a given value or more (step 106), where $H_x^i$, $H_y^i$, and $H_z^i$ are data after calibration, and i=1 ... N.

$$\sigma = \frac{1}{R^2 N} \sum_{i=1}^{N} \left[ \sqrt{(H_x^i - XO)^2 + (H_y^i - YO)^2 + (H_z^i - ZO)^2} - R \right]^2$$ [Equation 10]

The offset judged to be valid by the magnetic offset validity judging means 205 is input into storage means, not shown, in the azimuth measuring means 212, and the offset value already stored is updated to the input offset value (step 107).

On the other hand, when an application or the like requiring azimuth measurement is activated, the tile sensors are also triggered to perform measurements (step 101). When the measurement trigger is activated, the three-dimensional tilt measuring means 206 measures three-dimensional tilt data from input data from the tilt sensors, and outputs them to the tilt data storage determining means 207 and the azimuth measuring means 212 (step 109). The tilt data storage determining means 207 determines whether to store the data into the tilt data storing means 208 (step 110). The determination is made in the same manner as for the magnetic data.

The tilt data storing means 208 captures the data from the tilt data storage determining means 207, stores it based on a given storage method (step 111), and inquires of tilt offset calculation triggering means, not shown, as to whether the data should be output to the tilt offset calculating means 209. The tilt offset calculation triggering means replies as to whether the data should be output to the tilt offset calculating means 209 based on a given triggering method. When receiving an instruction to output the data to the tilt offset calculating means 209, the tilt data storing means 208 outputs the stored data to the tilt offset calculating means 209. The method of storing data and the method of triggering are the same as those for the magnetic data.

The tilt offset calculating means 209 calculates offset according to the following offset calculation algorithm (step 112).

In other words, if the measurement data is expressed by $(x_i, y_i, \square_i)$ where i=1, ..., N, the offset is (X0s, Y0s, X0s), the radius of the compass sphere is Rs, and the ratios of the sensitivity of the Z sensor to those of the X and Y sensors are Ax and Ay, the following equation is given:

$$Ax^2(x-X0s)^2 + Ay^2(yi-Y0s)^2 + (zi-Z0s)^2 = Rs^2$$ (2)

In this case, the least square error $\epsilon$ is defined as follows:

$$\varepsilon = \sum \{A_x^2(x_i - X0s)^2 + A_y^2(y_i - Y0s)^2 + (z_i - Z0s)^2 - Rs^2\}^2$$

$$= \sum \{Zi^2 + A_x^2 x_i^2 + A_y^2 y_i^2 - 2A_x^2 x_i X0s - 2A_y^2 y_i Y0s - 2z_i Z0s + (A_z^2 X0s^2 + A_y^2 Y0s^2 + Z0s^2) - Rs^2\}^2$$ [Equation 11]

Here, if the conditions are shown in Equation 12, $\epsilon$ is given by the following Equation 13:

$a_i = z_i^2$ $b_i = x_i^2$ $c_i = y_i^2$ $d_i = -2x_i$ $e_i = -2y_i$ $f_i = -2z_i$ $B = A_x^2$ $C = A_y^2$ $D = A_x^2 X0s$ $E = A_y^2 Y0s, \ F = Z0s$ $G = (A_x^2 X0s^2 + A_y^2 Y0s^2 + Z0s^2) - Rs^2$ [Equation 12]

$\epsilon = \Sigma(a_i + b_i B + c_i C + d_i D + e_i E + f_i F + G)^2$ [Equation 13]

In this case, the variables B, C, D, E, F and G are treated as an independent variable of $\epsilon$ in order to simplify the computation. The conditions for setting the least square error $\epsilon$ to the minimum are given by differentiating the square error $\epsilon$ with B, C, D, E, F and G shown in the following equations:

$$\begin{cases} \frac{\partial \varepsilon}{\partial B} = 2\sum (a_i + b_i B + c_i C + d_i D + e_i E + f_i F + G)b_i = 0 \\ \frac{\partial \varepsilon}{\partial C} = 2\sum (a_i + b_i B + c_i C + d_i D + e_i E + f_i F + G)c_i = 0 \\ \frac{\partial \varepsilon}{\partial D} = 2\sum (a_i + b_i B + c_i C + d_i D + e_i E + f_i F + G)d_i = 0 \\ \frac{\partial \varepsilon}{\partial E} = 2\sum (a_i + b_i B + c_i C + d_i D + e_i E + f_i F + G)e_i = 0 \\ \frac{\partial \varepsilon}{\partial F} = 2\sum (a_i + b_i B + c_i C + d_i D + e_i E + f_i F + G)f_i = 0 \\ \frac{\partial \varepsilon}{\partial G} = 2\sum (a_i + b_i B + c_i C + d_i D + e_i E + f_i F + G) = 0 \end{cases}$$ [Equation 14]

As a result, the following is given:

$$\begin{bmatrix} [bb] & [bc] & [bd] & [be] & [bf] & [b] \\ [bc] & [cc] & [cd] & [ce] & [cf] & [c] \\ [bd] & [cd] & [dd] & [de] & [df] & [d] \\ [be] & [ce] & [de] & [ee] & [ef] & [e] \\ [bf] & [cf] & [df] & [ef] & [ff] & [f] \\ [b] & [c] & [d] & [e] & [f] & N \end{bmatrix} \begin{bmatrix} B \\ C \\ D \\ E \\ F \\ G \end{bmatrix} = \begin{bmatrix} -[ab] \\ -[ac] \\ -[ad] \\ -[ac] \\ -[af] \\ -[a] \end{bmatrix} \quad \text{[Equation 15]}$$

where $$[m] = \sum_{i=1}^{N} m_i, \quad [mn] = \sum_{i=1}^{N} m_i n_i \quad \text{[Equation 16]}$$

By solving the above-mentioned simultaneous equations, X0s, Y0s, Z0s, and G, which take the least square error ε as the minimum value, are determined. Further, Rs is determined from (2). Note that Rs/Az is the X-axis sensitivity, Rs/Ay is the Y-axis sensitivity, and Rs is the Z-axis sensitivity of the tilt sensors, respectively.

Next, the tilt offset validity judging means 210 judges the offset to be valid on the following conditions: when X0s, Y0s, Z0s, and Rs determined by the following equation 17 are substituted, σ is a given value or less, and MAX(Sx)−MIN(Sx), MAX(Sy)−MIN(Sy), and MAX(Sz)−MIN(Sz) are all a given value or more (step 113), where $S_x^i$, $S_y^i$, and $S_z^i$ are data after calibration, and i=1 . . . N. The determination of the validity of the tilt offset may be made from the validity of the last determined magnetic offset.

$$\sigma = \frac{1}{R_s^2 N} \sum_{i=1}^{N} \left[ \sqrt{A_x^2(S_x^i - XOs)^2 + A_y^2(S_y^i - YOs)^2 + (S_z^i - ZOs)^2} - R \right]^2 \quad \text{[Equation 17]}$$

When the tilt offset validity judging means 210 judges the offset to be valid, the offset value stored in storage means, not shown, in the azimuth measuring means 212 is updated to the input offset value and the sensitivity simultaneously determined (step 114).

The azimuth measuring means 212 determines horizontal components Hx and Hy of the geomagnetism from data obtained by removing the offset stored in the azimuth measuring means 212 from the magnetic data input from the three-dimensional magnetic measuring means 201, data obtained by removing the offset stored in the azimuth measuring means 212 from the tilt data input from the three-dimensional tilt measuring means 206, and the sensitivity data input from the sensitivity measuring means 211, and substitutes them into the following equation 18 to calculate an azimuth direction (step 115):

if $Abs(Hx) < Abs(Hy)$ and $Hy > 0$, then direction (deg)=−arctan($Hx/Hy$)*180/π, if $Abs(Hx) < Abs(Hy)$ and $Hy < 0$, then direction (deg)=180−arctan($Hx/Hy$)*180/π, if $Abs(Hx) > Abs(Hy)$ and $Hx > 0$, then direction (deg)=90+arctan($Hx/Hy$)*180/π, if $Abs(Hx) > Abs(Hy)$ and $Hx < 0$, then direction (deg)=270+arctan($Hx/Hy$)*180/π.

The details of the tilt correction will be described by taking as an example the case of the portable terminal 1.

Figure 43:
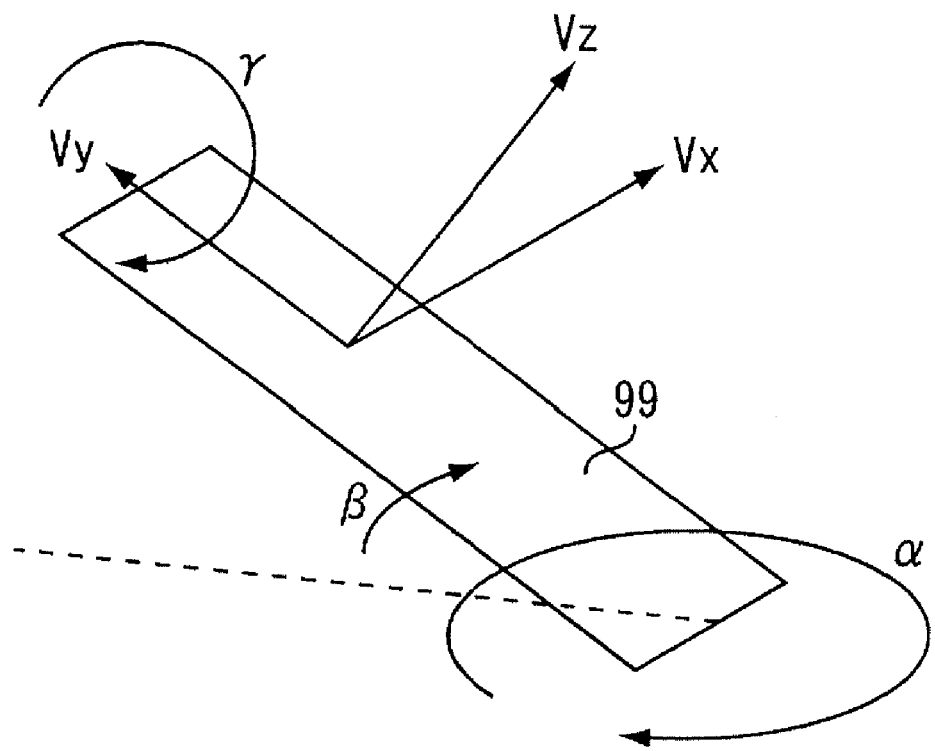
FIGS. 43(a) and 43(b) are a schematic diagram showing a coordinate system allocated to the eleventh embodiment.
Figure 43:
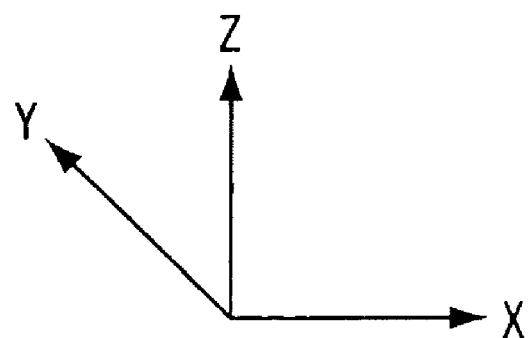

As shown in FIG. 43(a), the coordinate system of the portable terminal 1 is first defined. In other words, the azimuth of the antenna 101 of the portable terminal 1 is represented as α, the elevation as β, and the skew angle (rotating angle about the antenna axis) as γ. These symbols indicate positive in the direction of arrow. Further, a unit vector in the antenna direction is represented as Vy, a unit vector in a direction perpendicular to the surface (e.g., part 99 in FIG. 43) of a terminal unit-2 (the side on which the antenna 101 and the compass sensor ship 300 are arranged) is represented as Vz, and a unit vector orthogonal to both of Vy and Vz is represented as Vx. Note that the direction of arrow of each unit vector is positive. Then, as shown in FIG. 43(b), the coordinate system of the ground is represented by X, Y, and Z, with the Y axis heading north.

Here, gravity in the ground coordinate system is defined as G=(0, 0, Gz). Further, gravity in the portable-terminal coordinate system is defined as g=(gx, gy, gz). It is assumed here that the gravity in the portable-terminal coordinate system can be detected by the tilt sensor. It is needless to say that the gravity in the ground coordinate system is known.

Thus, the gravity g in the portable-terminal coordinate system and the gravity G in the ground coordinate system are represented by the following equation:

$(Gx, Gy, Gz)BC = (gx, gy, gz),$ where $$B = \begin{bmatrix} 1 & 0 & 0 \\ 0 & \cos\beta & \sin\beta \\ 0 & -\sin\beta & \cos\beta \end{bmatrix} \quad \text{[Equation 19]}$$

$$C = \begin{bmatrix} \cos\gamma & 0 & -\sin\gamma \\ 0 & 1 & 0 \\ \sin\gamma & 0 & \cos\gamma \end{bmatrix}$$

From these relations, BC is represented by the following equation:

$$BC = \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix}$$

Therefore, the gravity g in the portable-terminal coordinate system is represented by the following equation:

$$(gx, gy, gz) = (0, 0, Gz) \begin{bmatrix} \cos\gamma & 0 & -\sin\gamma \\ \sin\beta\sin\gamma & \cos\beta & \sin\beta\cos\gamma \\ \cos\beta\sin\gamma & -\sin\beta & \cos\beta\cos\gamma \end{bmatrix} = \quad \text{[Equation 20]}$$

$Gz(\cos\beta\sin\gamma, \; -\sin\beta, \; \cos\beta\cos\gamma)$

From this equation, the elevation β and the skew angle γ are determined as follows:

$$\beta = \arctan\left(-\frac{gy}{\sqrt{gx^2 + gz^2}}\right) \quad \text{[equation 21]}$$

-continued $$\gamma = \begin{cases} \arctan\left(\frac{gx}{gz}\right) & gz \geq 0 \\ 180(\deg) + \arctan\left(\frac{gx}{gz}\right) & gz < 0 \end{cases}$$

Thus the elevation β and the skew angle γ can be determined.

When receiving the elevation β and the skew angle γ, the azimuth measuring means 207 determines the azimuth α and geomagnetic elevation θ according to an algorithm to be described below.

If geomagnetism in the portable-terminal coordinate system is h=(hx, hy, hz) and geomagnetism in the ground coordinate system is H=(0, Hy, Hz), the following equation is given:

$$(0, Hy, Hz)ABC = (hx, hy, hz), \qquad \text{[Equation 22]}$$

where $$A = \begin{bmatrix} \cos\alpha & -\sin\alpha & 0 \\ \sin\alpha & \cos\alpha & 0 \\ 0 & 0 & 1 \end{bmatrix}$$

$$B = \begin{bmatrix} 1 & 0 & 0 \\ 0 & \cos\beta & \sin\beta \\ 0 & -\sin\beta & \cos\beta \end{bmatrix}$$

$$C = \begin{bmatrix} \cos\gamma & 0 & -\sin\gamma \\ 0 & 1 & 0 \\ \sin\gamma & 0 & \cos\gamma \end{bmatrix}$$

From these relations, the following equation is derived:

$$(0, Hy, Hz)A = (hx, hy, hz)C^{-1}B^{-1} \equiv (hx', hy', hz')$$

and hence
(hx', hy', hz')=(Hysinα, Hycosα, Hz). Therefore, (hx', hy', hz') can be defined based on the input elevation β, the input skew angle γ, and the measured geomagnetism h in the portable-terminal coordinate system. Here, since the geomagnetism H in the ground coordinate system is known, the azimuth α is determined. The geomagnetic elevation θ is also determined by the following equation:

$$\theta = \arctan\frac{hz'}{\sqrt{hx'^2 + hy'^2}} \qquad \text{[Equation 23]}$$

According to the eleventh embodiment, the sensitivity of the tilt sensor is corrected to measure an azimuth direction as well as calibration of the three-axis geomagnetic sensor and tilt sensor. This makes is possible to save the user from having to correct sensitivity, and hence measure a correct azimuth direction.

As described above, the embodiments of the present invention was described in detail with reference to the accompanying drawings, but the specific structure is not limited to that in the embodiment. It is needless to say that the present invention can include any other structures without departing from the scope of the present invention. For example, once a sensitivity correction is made, further correction may be determined unnecessary, so that more data points from the geomagnetic sensors are collected to increase the accuracy of correction.

Further, for example, the eleventh embodiment illustrates such an example where the main control part performs calculation of azimuth data, but it is not limited to such a structure. Instead, a compass sensor unit with the compass sensor chip and the azimuth data calculating function may be used.

The invention claimed is:

1. An azimuth processing device for outputting azimuth data based on measurement data sequentially output from a compass sensor, the device comprising:
    an accumulation section that selectively accumulates substantially new pieces of the measurement data;
    an offset data calculating section that calculates an offset data candidate of the compass sensor based on plural pieces of the measurement data accumulated by the accumulation section; and
    an offset data updating section that updates offset data stored in a memory with the offset data candidate calculated by the offset data calculating section,
    wherein a compass space defined for the compass sensor is divided into a plurality of segments, wherein the memory includes an array having array elements corresponding to the segments of the compass space, and wherein the accumulation section accumulates a plurality of the substantially new measurement data for respective segments of the compass space in the array elements, thereby updating the measurement data of respective segments.

2. The azimuth processing device according to claim 1 further comprising an azimuth data output section that outputs the azimuth data based on substantially newest measurement data and the offset data.

3. The azimuth processing device according to claim 1, wherein the accumulation section compares the substantially newest measurement data with last accumulated measurement data, and selectively accumulates the substantially newest measurement data according to the comparison result.

4. The azimuth processing device according to claim 3, wherein the accumulation section selectively accumulates the substantially newest measurement data according to a distance between a position of the substantially newest measurement data in the compass space defined for the compass sensor and another position of the last accumulated measurement data in the compass space.

5. The azimuth processing device according to claim 1, wherein the offset updating section updates the offset data stored in the memory with the offset data candidate from the offset calculating section when variations in distances between positions of the accumulated plural pieces of the measurement data in the compass space and a position of the offset data candidate in the compass space meet predetermined criteria, and when the variations do not meet the predetermined criteria, the accumulation section deletes at least part of the accumulated measurement data, and the offset data is not updated by the offset data candidate.

6. An azimuth processing device for outputting azimuth data based on measurement data sequentially output from a compass sensor, comprising:
    a first accumulation section that accumulates a predetermined number of the measurement data;
    an offset data calculating section that calculates an offset data candidate of the compass sensor based on the accumulated measurement data after the predetermined number of the measurement data was accumulated by the first accumulation section;
    a second accumulation section that accumulates new measurement data for a plurality of segments of a compass space defined for the compass sensor, wherein the new measurement data is stored in an array in a memory having array elements corresponding to the segments of the compass space, whereby the second accumulation section updates the measurement data of respective segments of the compass space after the offset data candidate has been calculated; and an offset data updating section that updates offset data stored in the memory, based on the measurement data accumulated by the second accumulation section after the offset data candidate has been calculated.

7. The azimuth processing device according to claim 6 further comprising an azimuth data output section that outputs the azimuth data based on substantially newest measurement data and the updated offset data.

8. The azimuth processing device according to claim 6, wherein when variations in distances between positions of plural pieces of the measurement data in the compass space accumulated by the second accumulation section and a position of the offset data candidate do not meet predetermined criteria, the second accumulation section deletes at least part of the measurement data accumulated by the second accumulation section.

9. The azimuth processing device according to claim 8, wherein when variations in distances between positions of plural pieces of the measurement data in the compass space accumulated by the first accumulation section and a position of the offset data candidate in the compass space calculated based on the measurement data accumulated by the first accumulation section do not meet predetermined criteria, the first accumulation section deletes at least part of the accumulated measurement data, and the offset data is not updated by the offset data candidate.

10. The azimuth processing device according to claim 6, wherein when variations in positions of plural pieces of the measurement data in the compass space accumulated by the first accumulation section do not meet predetermined criteria, the first accumulation section deletes at least part of the accumulated measurement data.

11. The azimuth processing device according to claim 6, wherein when variations in positions of plural pieces of the measurement data in the compass space accumulated by the second accumulation section do not meet predetermined criteria, the second accumulation section deletes at least part of the measurement data accumulated by the second accumulation section.

12. The azimuth processing device according to claim 6 further comprising a reset section that allows the first accumulation section to reaccumulate the measurement data until the offset data calculating section recalculates a new offset data candidate when a distance between a position of the substantially newest measurement data in the compass space and a position of the offset data candidate in the compass space exceeds a reference value.

13. An azimuth processing method for outputting azimuth data based on measurement data sequentially output from a compass sensor, comprising the acts of:
selectively accumulating substantially new pieces of the measurement data;
calculating an offset data candidate of the compass sensor based on plural pieces of the measurement data accumulated by the accumulating act; and
updating offset data stored in a memory with the calculated offset data candidate,
wherein a compass space defined for the compass sensor is divided into a plurality of segments, wherein the memory includes an array having array elements corresponding to the segments of the compass space, and
wherein the accumulation act accumulates a plurality of the substantially new measurement data for respective segments of the compass space in the array elements, thereby updating the measurement data of respective segments.

14. An azimuth processing program for outputting azimuth data based on measurement data sequentially output from a compass sensor, the program allowing a computer to perform the acts of:
selectively accumulating substantially new pieces of the measurement data;
calculating an offset data candidate of the compass sensor based on plural pieces of the measurement data accumulated by the accumulating act; and
updating offset data stored in a memory with the calculated offset data candidate, wherein a compass space defined for the compass sensor is divided into a plurality of segments, wherein the memory includes an array having array elements corresponding to the segments of the compass space, and wherein the accumulating act accumulates a plurality of the substantially new measurement data for respective segments of the compass space in the array elements, thereby updating the measurement data of respective segments.

15. A direction finding device comprising:
a compass sensor sequentially outputting measurement data;
an accumulation section that selectively accumulates substantially new pieces of the measurement data;
an offset data calculating section that calculates an offset data candidate of the compass sensor based on plural pieces of the measurement data accumulated by the accumulation section;
an offset data updating section that updates offset data stored in a memory with the offset data candidate calculated by the offset data calculating section, and
an azimuth data output section that outputs the azimuth data based on the substantially newest measurement data and the updated offset data,
wherein a compass space defined for the compass sensor is divided into a plurality of segments, wherein the memory includes an array having array elements corresponding to the segments of the compass space, and wherein the accumulation section accumulates a plurality of the substantially new measurement data for respective segments of the compass space in the array elements, thereby updating the measurement data of respective segments.

16. A portable electronic device comprising:
a screen;
a compass sensor sequentially outputting measurement data;
an accumulation section that selectively accumulates substantially new pieces of the measurement data;
an offset data calculating section that calculates an offset data candidate of the compass sensor based on plural pieces of the measurement data accumulated by the accumulation section;
an offset data updating section that updates offset data stored in a memory with the offset data candidate calculated by the offset data calculating section;
an azimuth data output section that outputs azimuth data based on the substantially newest measurement data and the updated offset data; and
a display control section that displays geographic information on the screen based on the azimuth data, wherein a compass space defined for the compass sensor is divided into a plurality of segments, wherein the memory includes an array having array elements corresponding to the segments of the compass space, and wherein the accumulation section accumulates a plurality of the substantially new measurement data for respective segments of the compass space in the array elements, thereby updating the measurement data of respective segments.

17. An azimuth processing method for outputting azimuth data based on measurement data sequentially output from a compass sensor, comprising:
   a selective accumulation act of selectively accumulating a predetermined number of the measurement data;
   an offset data creating act of creating offset data of the compass sensor based on the accumulated measurement data after the predetermined number of the measurement data was accumulated by the selective accumulation act;
   a segment accumulation act of accumulating new measurement data for respective segments of a compass space defined for the compass sensor, wherein the new measurement data is stored in an array in a memory having array elements corresponding to the segments of the compass space, and wherein the accumulating act updates the measurement data in a First In First Out (FIFO) manner for respective segments of the compass space in the array elements after creation of the offset data;
   an offset data updating act of updating the created offset data based on the measurement data accumulated by the segment accumulation act after creation of the offset data; and
   an azimuth data outputting act of outputting the azimuth data based on substantially newest measurement data and the updated offset data.

18. An azimuth processing program for outputting azimuth data based on measurement data sequentially output from a compass sensor, the program allowing a computer to perform the acts of:
   a first accumulation act of accumulating a predetermined number of the measurement data;
   an offset data calculating act of calculating an offset data candidate of the compass sensor based on the accumulated measurement data after the predetermined number of the measurement data were accumulated by the first accumulation act;
   a second accumulation act of accumulating new measurement data for a plurality of segments of a compass space defined for the compass sensor, wherein the new measurement data is stored in an array in a memory having array elements corresponding to the segments of the compass space, wherein the second accumulation act updates the measurement data in a First In First Out (FIFO) manner for respective segments of the compass space in the array elements after the offset data candidate has been calculated;
   an offset data updating act of updating offset data stored in the memory after the offset data candidate has been calculated; and
   an azimuth data output act of outputting the azimuth data based on substantially newest measurement data and the updated offset data.

19. A direction finding device comprising:
   a compass sensor sequentially outputting measurement data;
   a first accumulation section that accumulates a predetermined number of the measurement data;
   an offset data calculating section that calculates an offset data candidate of the compass sensor based on the accumulated measurement data after the predetermined number of the measurement data were accumulated by the first accumulation section;
   a second accumulation section that accumulates new measurement data for a plurality of segments of a compass space defined for the compass sensor, wherein the new measurement data is stored in an array in a memory having array elements corresponding to the segments of the compass space, wherein the second accumulation section updates the measurement data in a First In First Out (FIFO) manner for respective segments of the compass space in the array elements after the offset data candidate has been calculated;
   an offset data updating section that updates offset data stored in the memory based on the measurement data accumulated by the second accumulation section after the offset data candidate has been calculated; and
   an azimuth data output section that outputs azimuth data based on substantially newest measurement data and the updated offset data.

20. A portable electronic device comprising:
   a screen;
   a compass sensor sequentially outputting measurement data;
   a first accumulation section that accumulates a predetermined number of the measurement data;
   an offset data calculating section that calculates an offset data candidate of the compass sensor based on the accumulated measurement data after the predetermined number of the measurement data were accumulated by the first accumulation section;
   a second accumulation section that accumulates new measurement data for a plurality of segments of a compass space defined for the compass sensor, wherein the new measurement data is stored in an array in a memory having array elements corresponding to the segments of the compass space, wherein the second accumulation section updates the measurement data in a First In First Out (FIFO) manner for respective segments of the compass space in the array elements after the offset data candidate has been calculated;
   an offset data updating section that updates offset data stored in the memory based on the measurement data accumulated by the second accumulation section after the offset data candidate has been calculated;
   an azimuth data output section that outputs azimuth data based on substantially newest measurement data and the updated offset data; and
   a display control section that displays azimuth information on the screen based on the azimuth data.

* * * * *

UNITED STATES PATENT AND TRADEMARK OFFICE
CERTIFICATE OF CORRECTION

| | |
|---|---|
| PATENT NO. | : 8,090,535 B2 |
| APPLICATION NO. | : 12/870726 |
| DATED | : January 3, 2012 |
| INVENTOR(S) | : Hideki Sato et al. |

It is certified that error appears in the above-identified patent and that said Letters Patent is hereby corrected as shown below:

Title Page should read

(75) Inventors: Tetsuya Mabuchi, Iwata (JP)

Signed and Sealed this
Fifteenth Day of May, 2012

David J. Kappos
*Director of the United States Patent and Trademark Office*